United States Patent
Kwak et al.

(10) Patent No.: US 11,678,346 B2
(45) Date of Patent: *Jun. 13, 2023

(54) METHOD FOR TRANSMITTING BROADCAST SIGNALS, APPARATUS FOR TRANSMITTING BROADCAST SIGNALS, METHOD FOR RECEIVING BROADCAST SIGNALS AND APPARATUS FOR RECEIVING BROADCAST SIGNALS

(71) Applicant: LG ELECTRONICS INC., Seoul (KR)

(72) Inventors: Minsung Kwak, Seoul (KR); Sejin Oh, Seoul (KR); Kyoungsoo Moon, Seoul (KR); Jangwon Lee, Seoul (KR); Woosuk Ko, Seoul (KR); Sungryong Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/523,562

(22) Filed: Nov. 10, 2021

(65) Prior Publication Data

US 2022/0078750 A1 Mar. 10, 2022

Related U.S. Application Data

(63) Continuation of application No. 16/829,474, filed on Mar. 25, 2020, now Pat. No. 11,212,772, which is a (Continued)

(51) Int. Cl.
*H04W 72/00* (2023.01)
*H04W 72/30* (2023.01)
(Continued)

(52) U.S. Cl.
CPC ........... *H04W 72/30* (2023.01); *H04L 1/0009* (2013.01); *H04L 1/0042* (2013.01);
(Continued)

(58) Field of Classification Search
None
See application file for complete search history.

(56) References Cited

U.S. PATENT DOCUMENTS 8,250,619 B2    8/2012    Song et al.
8,498,272 B2    7/2013    Väre et al.
(Continued)

FOREIGN PATENT DOCUMENTS

CN    102484694 A    5/2012
CN    103283219 A    9/2013
(Continued)

OTHER PUBLICATIONS

Luby et al., RFC 3451 Layered Coding Transport (LCT) Building Block, Dec. 2002, Network Working Group, pp. 13-16 and Fig. 1 (Year:2002).

*Primary Examiner* — Gerald A Smarth
(74) *Attorney, Agent, or Firm* — Birch, Stewart, Kolasch & Birch, LLP

(57) ABSTRACT

A method for transmitting a broadcast signal in a digital broadcast transmitter, the method including generating components of a service; generating first signaling information including session instance description information for at least one Real-Time Object Delivery over Unidirectional Transport (ROUTE) session and at least one Layered Coding Transport (LCT) channel in which the components of the service are delivered, wherein the session instance description information includes first source Internet Protocol (IP) address information of the at least one ROUTE session, first (Continued)

destination IP address information of the at least one ROUTE session, first destination port information of the at least one ROUTE session, and transport session identification information for the at least one LCT channel; generating second signaling information which is used for acquiring the first signaling information, wherein the second signaling information includes information for indicating a channel number of the service, wherein the second signaling information further includes bootstrap information and signaling transport mode information for indicating a type of delivery protocol of the first signaling information, and further the bootstrap information changes depending on the signaling transport mode information, and wherein the bootstrap information included in the second signaling information includes second source IP address information, second destination IP address information, and second destination port information for the first signaling information, wherein the at least one LCT channel is acquired based on the bootstrap information included in the second signaling information; and transmitting the broadcast signal including the components of the service, the first signaling information, and the second signaling information based on at least one Physical Layer Pipe (PLP).

16 Claims, 91 Drawing Sheets

Related U.S. Application Data continuation of application No. 14/913,639, filed as application No. PCT/KR2015/008773 on Aug. 21, 2015, now Pat. No. 10,645,674.

(60) Provisional application No. 62/040,419, filed on Aug. 22, 2014.

(51) Int. Cl.
| | |
|---|---|
| *H04W 4/06* | (2009.01) |
| *H04L 1/00* | (2006.01) |
| *H04N 21/00* | (2011.01) |
| *H04L 5/00* | (2006.01) |
| *H04L 69/22* | (2022.01) |
| *H04L 27/26* | (2006.01) |
| *H04L 69/164* | (2022.01) |
| *H04L 1/08* | (2006.01) |
| *H04L 69/16* | (2022.01) |

(52) U.S. Cl.
CPC .......... *H04L 1/0057* (2013.01); *H04L 1/0071* (2013.01); *H04L 5/0007* (2013.01); *H04L 27/2601* (2013.01); *H04L 69/164* (2013.01); *H04L 69/22* (2013.01); *H04N 21/00* (2013.01); *H04W 4/06* (2013.01); *H04L 1/08* (2013.01); *H04L 5/0091* (2013.01); *H04L 69/16* (2013.01); *H04L 2001/0093* (2013.01)

(56) References Cited

U.S. PATENT DOCUMENTS

| | | | |
|---|---|---|---|
| 10,171,849 B1* | 1/2019 | Hwang | H04N 21/2662 |
| 10,645,674 B2 | 5/2020 | Kwak et al. | |
| 2002/0063150 A1 | 5/2002 | Nygren et al. | |
| 2008/0056196 A1 | 3/2008 | Ito et al. | |
| 2009/0257391 A1 | 10/2009 | Song et al. | |
| 2010/0242067 A1 | 9/2010 | Song et al. | |
| 2011/0228865 A1 | 9/2011 | Park et al. | |
| 2012/0110629 A1 | 5/2012 | Ruiz Alonzo et al. | |
| 2013/0034032 A1 | 2/2013 | Väre et al. | |
| 2013/0036234 A1 | 2/2013 | Pazos et al. | |
| 2013/0201399 A1 | 8/2013 | Kitazato et al. | |
| 2013/0219431 A1 | 8/2013 | Hong et al. | |
| 2013/0230036 A1 | 9/2013 | Reznik et al. | |
| 2013/0235865 A1 | 9/2013 | Eum et al. | |
| 2013/0291046 A1 | 10/2013 | Ko et al. | |
| 2013/0343468 A1 | 12/2013 | Ko et al. | |
| 2014/0006564 A1 | 1/2014 | Thang et al. | |
| 2014/0380135 A1 | 12/2014 | Hong et al. | |
| 2016/0011923 A1 | 1/2016 | Walker et al. | |
| 2016/0134927 A1 | 5/2016 | Kitazato et al. | |
| 2016/0360241 A1 | 12/2016 | Hong et al. | |
| 2017/0099517 A1 | 4/2017 | Kitahara et al. | |
| 2017/0134824 A1 | 5/2017 | Kitazato et al. | |

FOREIGN PATENT DOCUMENTS

| | | | | |
|---|---|---|---|---|
| CN | 103283220 A | 9/2013 | | |
| CN | 103493499 A | 1/2014 | | |
| CN | 103535013 A | 1/2014 | | |
| CN | 103535046 A | 1/2014 | | |
| KR | 10-2009-0021120 A | 2/2009 | | |
| KR | 10-2009-0021125 A | 2/2009 | | |
| KR | 10-2009-0108677 A | 10/2009 | | |
| KR | 10-2009-0124959 A | 12/2009 | | |
| KR | 10-2010-0059293 A | 6/2010 | | |
| KR | 10-2012-0103511 A | 9/2012 | | |
| KR | 10-2013-0056829 A | 5/2013 | | |
| KR | 10-2013-0087584 A | 8/2013 | | |
| KR | 10-2013-0102984 A | 9/2013 | | |
| WO | WO-2009005264 A1 * | 1/2009 | ........ | H03M 13/2912 |
| WO | WO-2010107167 A1 * | 9/2010 | ............ | H04H 20/67 |
| WO | WO 2011/105803 A2 | 9/2011 | | |
| WO | WO 2012/036429 A2 | 3/2012 | | |
| WO | WO 2015/102381 A1 | 7/2015 | | |

* cited by examiner

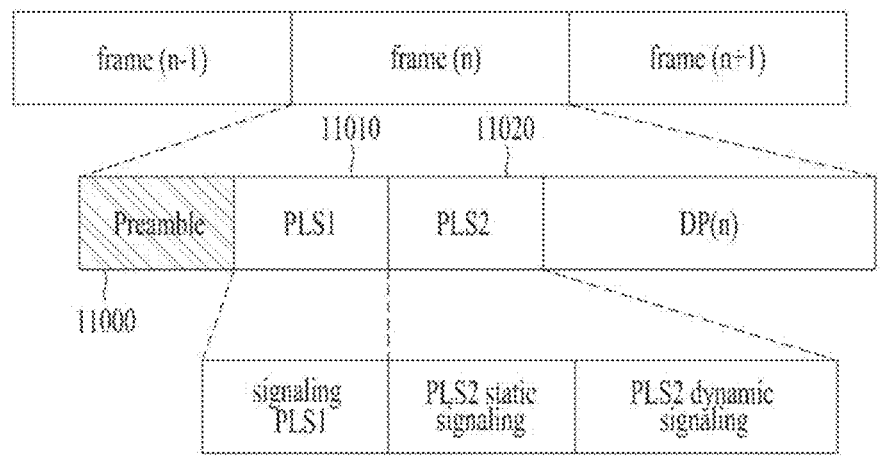

FIG. 12

| Content | Bits |
|---|---|
| PREAMBLE_DATA | 20 |
| NUM_FRAME_FRU | 2 |
| PAYLOAD_TYPE | 3 |
| NUM_FSS | 2 |
| SYSTEM_VERSION | 8 |
| CELL_ID | 16 |
| NETWORK_ID | 16 |
| SYSTEM_ID | 16 |
| for i = 0:3 | |
|     FRU_PHY_PROFILE | 3 |
|     FRU_FRAME_LENGTH | 2 |
|     FRU_GI_FRACTION | 3 |
|     RESERVED | 4 |
| end | |
| PLS2_FEC_TYPE | 2 |
| PLS2_MOD | 3 |
| PLS2_SIZE_CELL | 15 |
| PLS2_STAT_SIZE_BIT | 14 |
| PLS2_SYN_SIZE_BIT | 14 |
| PLS2_REP_FLAG | 1 |
| PLS2_REP_SIZE_CELL | 15 |
| PLS2_NEXT_FEC_TYPE | 2 |
| PLS2_NEXT_MODE | 3 |
| PLS2_NEXT_REP_FLAG | 1 |
| PLS2_NEXT_REP_SIZE_CELL | 15 |
| PLS2_NEXT_REP_STAT_SIZE_BIT | 14 |
| PLS2_NEXT_REP_DYN_SIZE_BIT | 14 |
| PLS2_AP_MODE | 2 |
| PLS2_AP_SIZE_CELL | 15 |
| PLS2_NEXT_AP_MODE | 2 |
| PLS2_NEXT_AP_SIZE_CELL | 15 |
| RESERVED | 32 |
| CRC 32 | 32 |

FIG. 13

| Content | Bits |
|---|---|
| FIC_FLAG | 1 |
| AUX_FLAG | 1 |
| NUM_DP | 6 |
| for i = 1: NUM_DP | |
|     DP_ID | 6 |
|     DP_TYPE | 3 |
|     DP_GROUP_ID | 8 |
|     BASE_DP_ID | 6 |
|     DP_FEC_TYPE | 2 |
|     DP_COD | 4 |
|     DP_MOD | 4 |
|     DP_SSD_FLAG | 1 |
|     if PHY_PROFILE = '010' | |
|         DP_MIMO | 3 |
|     end | |
|     DP_TI_TYPE | 1 |
|     DP_TI_LENGTH | 2 |
|     DP_TI_BYPASS | 1 |
|     DP_FRAME_INTERVAL | 2 |
|     DP_FIRST_FRAME_IDX | 5 |
|     DP_NUM_BLOCK_MAX | 10 |
|     DP_PAYLOAD_TYPE | 2 |
|     DP_INBAND_MODE | 2 |
|     DP_PROTOCOL_TYPE | 2 |
|     DP_CRC_MODE | 2 |
|     if DP_PAYLOAD_TYPE == TS('00') | |
|         DNP_MODE | 2 |
|         ISSY_MODE | 2 |
|         HC_MODE_TS | 2 |
|         if HC_MODE_TS == '01' or '10' | |
|             PID | 13 |
|         end | |
|     if DP_PAYLOAD_TYPE == IP('01') | |
|         HC_MODE_IP | 2 |
|     end | |
|     RESERVED | 8 |
| end | |
| if FIC_FLAG == 1 | |
|     FIC_VERSION | 8 |
|     FIC_LENGTH_BYTE | 13 |
|     RESERVED | 8 |
| end | |
| if AUX_FLAG == 1 | |
|     NUM_AUX | 4 |
|     AUX_CONFIG_RFU | 8 |
|     for - 1: NUM_AUX | |
|         AUX_STREAM_TYPE | 4 |
|         AUX_PRIVATE_CONF | 28 |
|     end | |
| end | |

| Content | Bit |
|---|---|
| FRAME_INDEX | 5 |
| PLS_CHANGE_COUNTER | 4 |
| FIC_CHANGE_COUNTER | 4 |
| RESERVED | 16 |
| for i = 1:NUM_DP | |
|     DP_ID | 6 |
|     DP_START | 15 (or13) |
|     DP_NUM_BLOCK | 10 |
|     RESERVED | 8 |
| end | |
| EAC_FLAG | 1 |
| EAS_WAKE_UP_VERSION_NUM | 8 |
| if EAC_FLAG == 1 | |
|     EAC_LENGTH_BYTE | 12 |
| else | |
|     EAC_COUNTER | 12 |
| end | |
| for i=1:NUM_AUX | |
|     AUX_PRIVATE_DYN | 48 |
| end | |
| CRC_32 | 32 |

FIG. 20
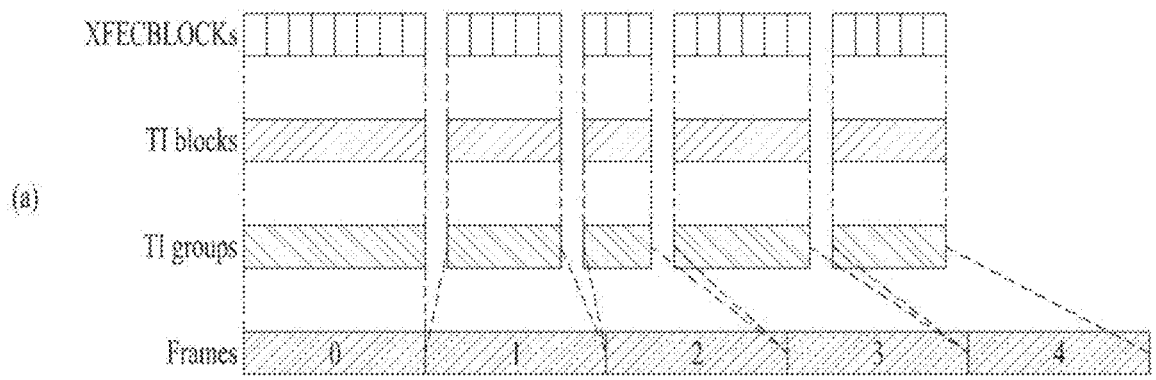
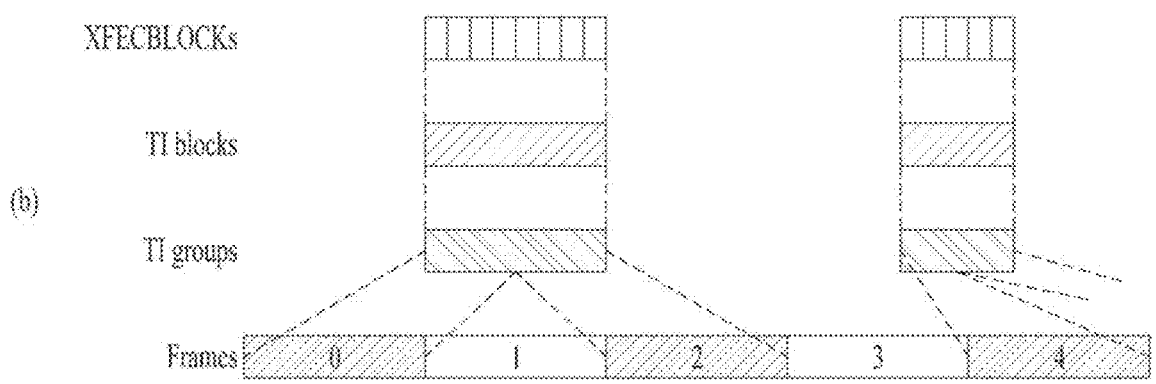
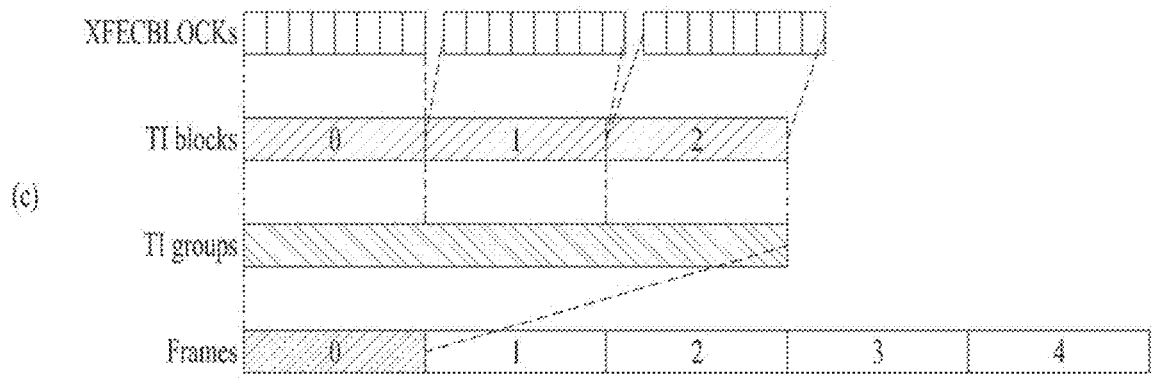

FIG. 25
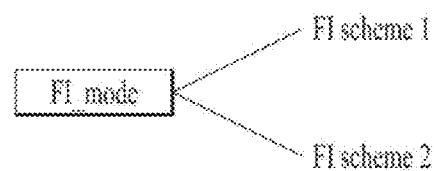
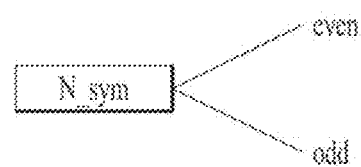
FIG. 26
| | | FI_mode | |
|---|---|---|---|
| | | 0 | 1 |
| N_sym | even | FI scheme #1 | FI scheme #1 |
| | odd | FI scheme #1 | FI scheme #2 |

FIG. 27

| | | FI_mode | |
|---|---|---|---|
| | | 0 | 1 |
| N_sym | even | off | off |
| | odd | on | off |

FIG. 28 i50010 ~ $O_{m,l} = [x_{m,l,0}, ..., x_{m,l,p}, ..., x_{m,l,N_{data}-1}]$   $l = 0, ..., N_{sym}-1$ i50020 ~ $P_{m,l} = [v_{m,l,0}, ..., v_{m,l,N_{data}-1}]$   $l = 0, ..., N_{sym}-1$

FIG. 29 i51010 ~ $v_{m,l,\Pi_l(p)} = x_{m,l,p}$   $l = 0, 1, ..., N_{sym}-1$   $p = 0, 1, ..., N_{data}-1$ i51020 ~ $v_{m,l,p} = x_{m,l,\Pi_l(p)}$   $l = 0, 1, ..., N_{sym}-1$   $p = 0, 1, ..., N_{data}-1$

FIG. 37 for $0 \leq k \leq N_{cells} N'_{BLOCK\_TI} - 1$
  $r_k = \mathrm{mod}(k, N_{cells})$,
  $t_k = \mathrm{mod}(S_T \times r_k, N'_{BLOCK\_TI})$,
  $c_k = \mathrm{mod}(t_{j,k} + \left\lfloor \dfrac{k}{N_{cells}} \right\rfloor, N'_{BLOCK\_TI})$,
  $\pi(k) = N_{cells} c_k + r_k$
end
where $S_T$ is defined as
$$S_T = \dfrac{N'_{BLOCK\_TI} - 1}{2} + 1 \quad for \begin{cases} N'_{BLOCK\_TI} = N_{BLOCK\_TI} + 1, & if\ N_{BLOCK\_TI} \bmod 2 = 0 \\ N'_{BLOCK\_TI} = N_{BLOCK\_TI}, & if\ N_{BLOCK\_TI} \bmod 2 = 1 \end{cases}$$

$\pi(k)$: the k-th address for reading memory data
$S_T$: shift value for use in interleaving (constant value)

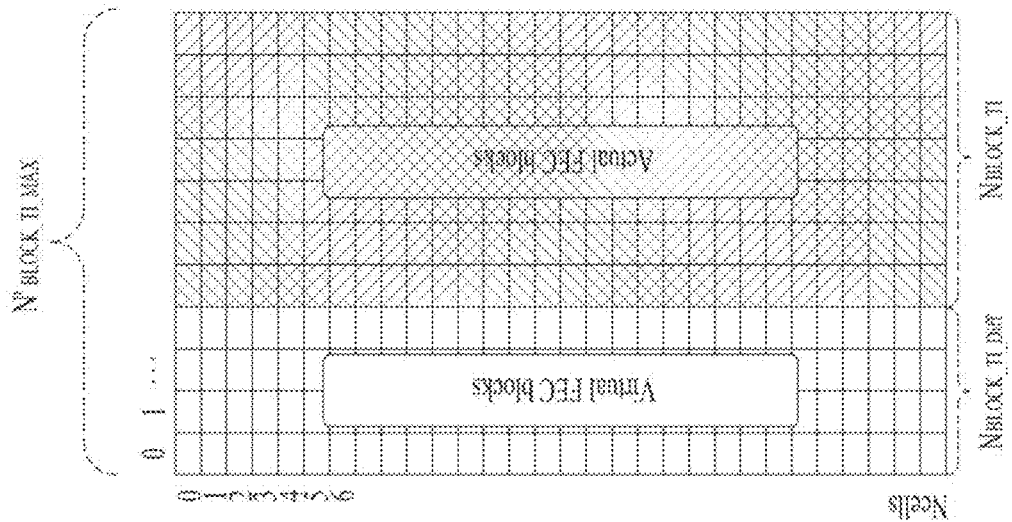

FIG. 38

$N^t_{BLOCK\_TI\_MAX}$ : Maximum number of FEC blocks in a TI group $N_{BLOCK\_TI}$ : The actual number of FEC blocks in a TI group $N_{BLOCK\_TI\_Diff} = N^t_{BLOCK\_TI\_MAX} - N_{BLOCK\_TI}$ $\begin{cases} N^t_{BLOCK\_TI\_MAX} = N_{BLOCK\_TI\_MAX} + 1, & \text{if } N_{BLOCK\_TI\_MAX} \bmod 2 = 0 \\ N^t_{BLOCK\_TI\_MAX} = N_{BLOCK\_TI\_MAX}, & \text{if } N_{BLOCK\_TI\_MAX} \bmod 2 = 1 \end{cases}$ $N_{BLOCK\_TI\_Diff,j} = N^t_{BLOCK\_TI\_MAX} - N_{BLOCK\_TI,j}$

FIG. 39 for $0 \leq k \leq N_{cells} N'_{BLOCK\_TI\_MAX} - 1$ $r_h = \text{mod}(k, N_{cells})$, $t_h = \text{mod}(S_T \times r_h, N'_{BLOCK\_TI\_MAX})$, $c_h = \text{mod}(t_h + \left\lfloor \dfrac{k}{N_{cells}} \right\rfloor, N'_{BLOCK\_TI\_MAX})$, $V(k) = N_{cells} c_h + r_h$ if $V(k) \geq N_{cells} N_{BLOCK\_TI\_Diff}$  ⎫
$\pi(C_{out}) = \theta(k),$                 ⎬ Skip virtual FEC blocks
$C_{out} = C_{out} + 1,$                    ⎭
end end where
$C_{out} = 0$, $S_T = \dfrac{N'_{BLOCK\_TI\_MAX} - 1}{2} + 1$ for $\begin{cases} N'_{BLOCK\_TI\_MAX} = N_{BLOCK\_TI\_MAX} + 1, & \text{if } N_{BLOCK\_TI\_MAX} \bmod 2 = 0 \\ N'_{BLOCK\_TI\_MAX} = N_{BLOCK\_TI\_MAX}, & \text{if } N_{BLOCK\_TI\_MAX} \bmod 2 = 1 \end{cases}$ $N_{BLOCK\_TI\_Diff} = N'_{BLOCK\_TI\_MAX} - N_{BLOCK\_TI}$

FIG. 42

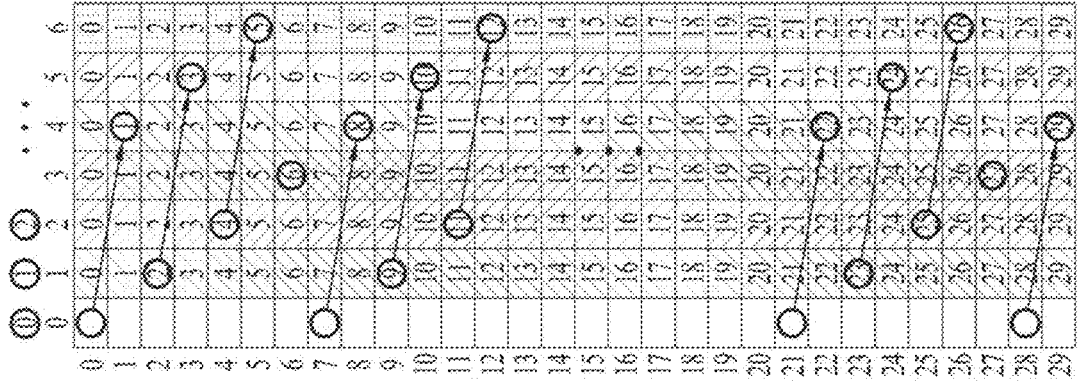
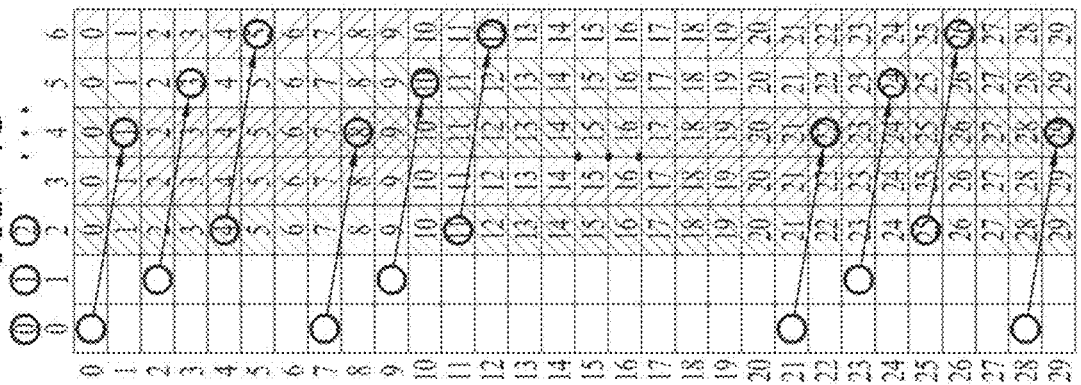
FIG. 43

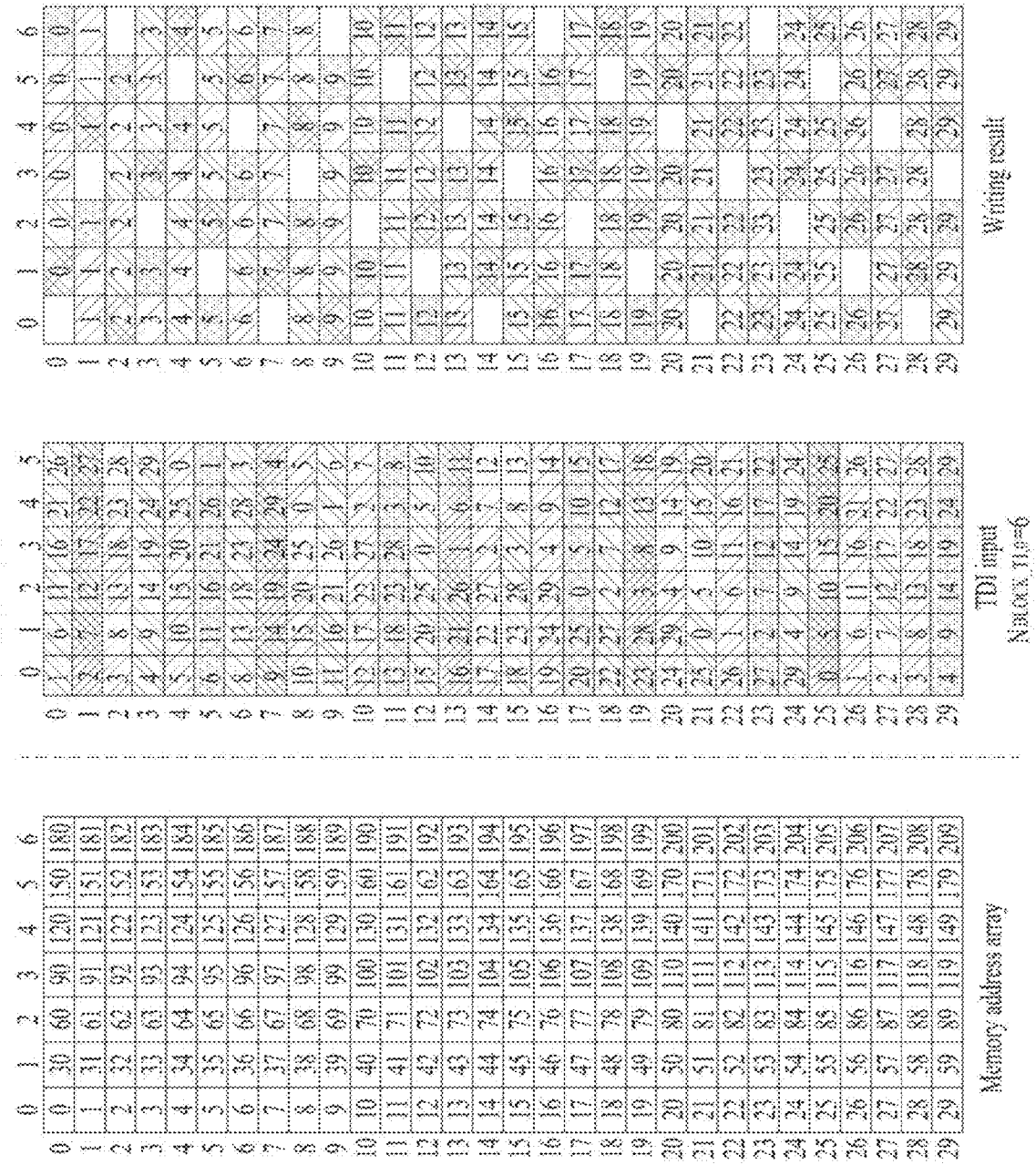

FIG. 47

$for\ 0 \leq k \leq N_{cells}N'_{BLOCK\_TI\_MAX}-1$ $\quad r_k = \mathrm{mod}(k, N_{cells})$, $\quad t_k = \mathrm{mod}(S_R \times r_k, N'_{BLOCK\_TI\_MAX})$, $\quad c_k = \mathrm{mod}(t_k + \left\lfloor \dfrac{k}{N_{cells}} \right\rfloor, N'_{BLOCK\_TI\_MAX})$, $\quad V(k) = N_{cells} c_k + r_k$, ⎧ $if\ V(k) \geq N_{cells} N_{BLOCK\_TI\_Diff}$  
⎪ $\quad \pi(C_{cnt}) = \theta(k)$,  
⎪ $\quad C_{cnt} = C_{cnt} + 1$,  
⎩ $\quad end$ — Skip virtual FEC blocks end where $C_{cnt} = 0$, $S_R = N'_{BLOCK\_TI\_MAX} - S_T$, $N_{BLOCK\_TI\_Diff} = N'_{BLOCK\_TI\_MAX} - N_{BLOCK\_TI}$

FIG. 60

| Signaling message header | Signaling message (binary or XML formatted) |
|---|---|

| Syntax | No. Bits | Format |
|---|---|---|
| signaling_message_header{ | | |
|   signaling_id | 8 | uimsbf |
|   signaling_length | 12 | uimsbf |
|   reserved | 4 | '1111' |
|   signaling_id_extension { | | |
|     protocol_version | 8 | uimsbf |
|     reserved | 8 | uimsbf |
|   } | | |
|   reserved | 2 | '11' |
|   version_number | 5 | uimsbf |
|   current_next_indicator | 1 | uimsbf |
|   fragment_number | 8 | uimsbf |
|   last_fragment_number | 8 | uimsbf |
| } | | |

FIG. 61

| Signaling message header | Signaling message (binary or XML formatted) |
|---|---|

| Syntax | No. Bits | Format |
|---|---|---|
| signaling_message_header     { | | |
|     signaling_id | 8 | uimsbf |
|     signaling_length | 12 | uimsbf |
|     reserved | 4 | '1111' |
|     signaling_id_extension     { | | |
|         protocol_version | 8 | uimsbf |
|         reserved | 8 | uimsbf |
|     } | | |
|     reserved | 2 | '11' |
|     version_number | 5 | uimsbf |
|     current_next_indicator | 1 | uimsbf |
|     payload_format | 2 | uimsbf |
|     expiration | 32 | uimsbf |
|     fragment_number | 8 | uimsbf |
|     last_fragment_number | 8 | uimsbf |
| } | | |

FIG. 62

| | Signaling message header | Service map signaling message or portion thereof |
|---|---|---|

| Syntax | No. of Bits | Format |
|---|---|---|
| service_map_signaling_message { | | |
| ... | | |
| num_services | 8 | uimsbf |
| for (i=0; i<num_services; i++) | | |
| { | | |
|   service_id | 16 | uimsbf |
|   service_type | 8 | uimsbf |
|   short_service_name_length /* m */ | 3 | uimsbf |
|   short_service_name | 16*m | bslbf |
|   channel_number | 16 | uimsbf |
|   ... | | |
|   timebase_transport_mode | 8 | uimsbf |
|   bootstrap_data(timebase_transport_mode) | var | |
|   signaling_transport_mode | 8 | |
|   bootstrap_data(signaling_transport_mode) | var | |
|   ... | | |
|   num_service_level_descriptors | 8 | uimsbf |
|   for (m=0; m<num_service_level_descriptors; m++) | | |
|   { | | |
|     service_level_descriptor() | var | |
|   } | | |
| } | | |
| } | | |

FIG. 63

| Timebase_transport_mode or signaling_transport_mode value | Designation |
|---|---|
| 0x00 | IPv4/IPv6 flows through same broadcast or over the cellular network |
| 0x01 | IPv4/IPv6 flows through different broadcast |
| 0x02 | Session-based flows (e.g., ALC/LCT, FLUTE sessions) through same broadcast |
| 0x03 | Session-based flows (e.g., ALC/LCT, FLUTE sessions) through different broadcast |
| 0x04 | packet-based flows through same broadcast |
| 0x05 | packet-based flows through different broadcast |
| 0x06 | URL |
| 0x07-0xFF | Reserved |

FIG. 64

| Syntax | No. of Bits | Format |
|---|---|---|
| bootstrap_data() { | | |
|    IP_version_flag | 1 | bslbf |
|    source_IP_address_flag | 1 | bslbf |
|    destination_IP_address_flag | 1 | bslbf |
|    reserved | 5 | '11111' |
|    if(source_IP_address_flag) | | |
|       source_IP_address | 32 or 128 | uimsbf |
|    if(destination_IP_address_flag) | | |
|       destination_IP_address | 32 or 128 | uimsbf |
|    port_num_count | 8 | |
|    if(port_num_count > 0) | | |
|       destination_UDP_port_num | 16 | uimsbf |
| } | | |

FIG. 65

| Syntax | No. of Bits | Format |
|---|---|---|
| bootstrap_data() { | | |
|    broadcast_id | 16 | uimsbf |
|    IP_version_flag | 1 | bslbf |
|    source_IP_address_flag | 1 | bslbf |
|    destination_IP_address_flag | 1 | bslbf |
|    reserved | 5 | '11111' |
|    if(source_IP_address_flag) | | |
|       source_IP_address | 32 or 128 | uimsbf |
|    if(destination_IP_address_flag) | | |
|       destination_IP_address | 32 or 128 | uimsbf |
|    port_num_count | 8 | |
|    if(port_num_count > 0) | | |
|       destination_UDP_port_num | 16 | uimsbf |
| } | | |

FIG. 66

| Syntax | No. of Bits | Format |
|---|---|---|
| bootstrap_data( ) { | | |
|    IP_version_flag | 1 | bslbf |
|    source_IP_address_flag | 1 | bslbf |
|    destination_IP_address_flag | 1 | bslbf |
|    reserved | 5 | '11111' |
|    if(source_IP_address_flag) | | |
|       source_IP_address | 32 or 128 | uimsbf |
|    if(destination_IP_address_flag) | | |
|       destination_IP_address | 32 or 128 | uimsbf |
|    destination_UDP_port_num | 16 | uimsbf |
|    tsi | 16 | uimsbf |
| } | | |

FIG. 67

| Syntax | No. of Bits | Format |
|---|---|---|
| bootstrap_data( ) { | | |
|    broadcast_id | 16 | uimsbf |
|    IP_version_flag | 1 | bslbf |
|    source_IP_address_flag | 1 | bslbf |
|    destination_IP_address_flag | 1 | bslbf |
|    reserved | 5 | '11111' |
|    if(source_IP_address_flag) | | |
|       source_IP_address | 32 or 128 | uimsbf |
|    if(destination_IP_address_flag) | | |
|       destination_IP_address | 32 or 128 | uimsbf |
|    destination_UDP_port_num | 16 | uimsbf |
|    tsi | 16 | uimsbf |
| } | | |

FIG. 68

| Syntax | No. of Bits | Format |
|---|---|---|
| bootstrap_data() { | | |
|    IP_version_flag | 1 | bslbf |
|    source_IP_address_flag | 1 | bslbf |
|    destination_IP_address_flag | 1 | bslbf |
|    reserved | 5 | '11111' |
|    if(source_IP_address_flag) | | |
|       source_IP_address | 32 or 128 | uimsbf |
|    if(destination_IP_address_flag) | | |
|       destination_IP_address | 32 or 128 | uimsbf |
|    destination_UDP_port_num | 16 | uimsbf |
|    packet_id | 16 | uimsbf |
| } | | |

FIG. 69

| Syntax | No. of Bits | Format |
|---|---|---|
| bootstrap_data() { | | |
|    broadcast_id | 16 | uimsbf |
|    IP_version_flag | 1 | bslbf |
|    source_IP_address_flag | 1 | bslbf |
|    destination_IP_address_flag | 1 | bslbf |
|    reserved | 5 | '11111' |
|    if(source_IP_address_flag) | | |
|       source_IP_address | 32 or 128 | uimsbf |
|    if(destination_IP_address_flag) | | |
|       destination_IP_address | 32 or 128 | uimsbf |
|    destination_UDP_port_num | 16 | uimsbf |
|    packet_id | 16 | uimsbf |
| } | | |

FIG. 70

| Syntax | No. of Bits | Format |
|---|---|---|
| bootstrap_data() { | | |
|   URL_length | 8 | |
|   for (i = 0; i < URL_length; i++){ | | |
|     URL_char | 8 | bslbf |
|   } | | |
| } | | |

FIG. 72

| Signaling message header | Service map signaling message or portion thereof |
|---|---|

| Syntax | No. of Bits | Format |
|---|---|---|
| service_map_signaling_message { | | |
| ... | | |
| num_services | 8 | uimsbf |
| for (i=0; i<num_services; i++) | | |
| { | | |
| service_id | 16 | uimsbf |
| service_type | 8 | uimsbf |
| short_service_name_length /* m */ | 3 | uimsbf |
| short_service_name | 16*m | bslbf |
| channel_number | 16 | uimsbf |
| ... | | |
| timebase_transport_flag | 1 | bslbf |
| if(timebase_transport_flag) | | |
| timebase_transport_mode | 8 | uimsbf |
| bootstrap_data(timebase_transport_mode) | var | |
| } | | |
| signaling_transport_mode | 8 | |
| bootstrap_data(signaling_transport_mode) | var | |
| ... | | |
| num_service_level_descriptors | 8 | uimsbf |
| for (m=0; m<num_service_level_descriptors; m++) | | |
| { | | |
| service_level_descriptor() | var | |
| } | | |
| } | | |
| } | | |

FIG. 73

| Signaling message header | service map signaling message or portion thereof |
|---|---|

Service map signaling message is as follows.
(represented in other formats such as XML)

| Syntax | No. of Bits | Format |
|---|---|---|
| service_map_signaling_message { | | |
| ... | | |
|   num_services | 8 | uimsbf |
|   for (i=0; i<num_services; i++) | | |
|   { | | |
|     service_id | 16 | uimsbf |
|     service_type | 8 | uimsbf |
|     ... | | |
|     timebase_transport_flag | 1 | bslbf |
|     MPD_transport_flag | 1 | bslbf |
|     component_location_transport_flag | 1 | bslbf |
|     app_signaling_transport_flag | 1 | bslbf |
|     signaling_transport_flag | 1 | bslbf |
|     reserved | 3 | '111' |
|     if(timebase_transport_flag) | | |
|       timebase_transport_mode | 8 | uimsbf |
|       bootstrap_data(timebase_transport_mode) | var | |
|     } | | |
|     if(MPD_transport_flag) | | |
|       MPD_transport_mode | 8 | |
|       bootstrap_data(MPD_transport_mode) | var | |
|     } | | |
|     if(component_location_transport_flag) | | |
|       component_location_transport_mode | 8 | uimsbf |
|       bootstrap_data(component_location_transport_mode) | var | |
|     } | | |
|     if(app_signaling_transport_flag) | | |
|       app_signaling_transport_mode | 8 | |
|       bootstrap_data(app_signaling_transport_mode) | var | |
|     } | | |
|     if(signaling_transport_flag) | | |
|       signaling_transport_mode | 8 | |
|       bootstrap_data(signaling_transport_mode) | var | |
|     } | | |
|     ... | | |
|     num_service_level_descriptors | 8 | uimsbf |
|     for (m=0; m<num_service_level_descriptors; m++) | | |
|     { | | |
|       service_level_descriptor() | var | |
|     } | | |
|   } | | |
| } | | |

FIG. 74

| X_transport_mode value | Designation |
|---|---|
| 0x00 | IPv4/IPv6 flows through same broadcast or over the cellular network |
| 0x01 | IPv4/IPv6 flows through different broadcast |
| 0x02 | Session-based flows (e.g., ALC/LCT, FLUTE sessions) through same broadcast |
| 0x03 | Session-based flows (e.g., ALC/LCT, FLUTE sessions) through different broadcast |
| 0x04 | packet-based flows through same broadcast |
| 0x05 | packet-based flows through different broadcast |
| 0x06 | URL |
| 0x07-0xFF | Reserved |

FIG. 75

| Syntax | No. Bits | Format |
|---|---|---|
| component_location_signaling_message { | | |
|    signaling_id | 8 | uimsbf |
|    signaling_length | 12 | uimsbf |
|    reserved | 4 | '1111' |
|    signaling_id_extension { | | |
|      protocol_version | 8 | uimsbf |
|      reserved | 8 | uimsbf |
|    } | | |
|    reserved | 2 | '11' |
|    version_number | 5 | uimsbf |
|    current_next_indicator | 1 | uimsbf |
|    fragment_number | 8 | uimsbf |
|    last_fragment_number | 8 | uimsbf |
|    service_id | 16 | uimsbf |
|    num_components | 8 | uimsbf |
|    for (i=0; i<num_components; i++) | | |
|    { | | |
|      component_id_length /*L*/ | 8 | uimsbf |
|      component_id | 8*L | uimsbf |
|      frequency_number | 16 | uimsbf |
|      broadcast_id | 16 | uimsbf |
|      data_pipe_id | 8 | uimsbf |
|      IP_version_flag | 1 | bslbf |
|      source_IP_address_flag | 1 | bslbf |
|      destination_IP_address_flag | 1 | bslbf |
|      reserved | 5 | '11111' |
|      if(source_IP_address_flag) | | |
|        source_IP_address | 32 or 128 | uimsbf |
|      if(destination_IP_address_flag) | | |
|        destination_IP_address | 32 or 128 | uimsbf |
|      UDP_port_num | 16 | uimsbf |
|      tsi | 16 | uimsbf |
|    } | | |
|    num_app_signalings | 8 | uimsbf |
|    for (k=0; k<num_app_signalings; k++) | | |
|    { | | |
|      app_signaling_id_length /*M*/ | 8 | uimsbf |
|      app_signaling_id | 8*M | uimsbf |
|      app_delivery_info() | var | |
|    } | | |
| } | | |

FIG. 76

| Syntax | No. of Bits | Format |
|---|---|---|
| app_delivery_info() { | | |
|    broadcast_flag | 1 | bslbf |
|    IP_version_flag | 1 | bslbf |
|    source_IP_address_flag | 1 | bslbf |
|    destination_IP_address_flag | 1 | bslbf |
|    reserved | 4 | '1111' |
|    if(broadcast_flag) | | |
|       broadcast_id | 16 | uimsbf |
|    if(source_IP_address_flag) | | |
|       source_IP_address | 32 or 128 | uimsbf |
|    if(destination_IP_address_flag) | | |
|       destination_IP_address | 32 or 128 | uimsbf |
|    destination_UDP_port_num | 16 | uimsbf |
|    tsi | 16 | uimsbf |
| } | | |

FIG. 77

| Syntax | No. of Bits | Format |
|---|---|---|
| app_delivery_info() { | | |
|    broadcast_flag | 1 | bslbf |
|    IP_version_flag | 1 | bslbf |
|    source_IP_address_flag | 1 | bslbf |
|    destination_IP_address_flag | 1 | bslbf |
|    reserved | 4 | '1111' |
|    if(broadcast_flag) | | |
|       broadcast_id | 16 | uimsbf |
|    if(source_IP_address_flag) | | |
|       source_IP_address | 32 or 128 | uimsbf |
|    if(destination_IP_address_flag) | | |
|       destination_IP_address | 32 or 128 | uimsbf |
|    destination_UDP_port_num | 16 | uimsbf |
|    packet_id | 16 | uimsbf |
| } | | |

FIG. 78

```
<?xml version="1.0" encoding="UTF-8"?>
<xs:schema xmlns:xs="http://www.w3.org/2001/XMLSchema">
<xs:element name="CompLocTable" type="CompLocTableType"/>
<xs:complexType name="CompLocTableType">
    <xs:sequence>
        <xs:element name="MPDCompLocs" maxOccurs="unbounded">
        <xs:complexType>
            <xs:sequence>
                <xs:element name="PeriodCompLocs" maxOccurs="unbounded">
                    <xs:complexType>
                        <xs:sequence>
                            <xs:element name="ReptnLoc" type="ReptnLocType" maxOccurs="unbounded"/>
                        </xs:sequence>
                        <xs:attribute name="periodId" type="xs:string"/>
                    </xs:complexType>
                </xs:element>
            </xs:sequence>
            <xs:attribute name="mpdId"/>
        </xs:complexType>
        </xs:element>
    </xs:sequence>
</xs:complexType>
<xs:complexType name="ReptnLocType">
    <xs:attribute name="ReptnID" type="StringNoWhitespaceType" use="required"/>
    <xs:attribute name="RFChan" type="xs:unsignedByte" use="required"/>
    <xs:attribute name="BroadcastId " type="xs:unsignedByte" use="required"/>
    <xs:attribute name="DataPipeId " type="xs:unsignedByte" use="required"/>
    <xs:attribute name="IPAddr" type="xs:unsignedInt" use="required"/>
    <xs:attribute name="UDPPort" type="xs:unsignedShort" use="required"/>
    <xs:attribute name="TSI" type="xs:unsignedInt" use="required"/>
</xs:complexType>
<!-- String without white spaces -->
<xs:simpleType name="StringNoWhitespaceType">
    <xs:restriction base="xs:string">
        <xs:pattern value="[^\r\n\t \p{Z}]*"/>
    </xs:restriction>
</xs:simpleType>
</xs:schema>
```

FIG. 80

| Element or Attribute Name | Use | Description |
|---|---|---|
| Service | | |
| @id | M | Service identifier |
| @serviceType | M | service type |
| @serviceName | O | service name |
| @channelNumber | M | channel number associated with this service |
| … | | |
| | | |
| TimebaseLocation | 0…1 | The location where a time base, a metadata to establish a time line for synchronizing the components of this service, can be acquired |
| @deliveryMode | M | The delivery mode of this time base. |
| BootstrapInfo | 1 | Bootstrap information of this time base according to the delivery mode |
| MPD | 0…1 | DASH media presentation description (MPD) including components of this service |
| MPDSignalingLocation | 0…1 | The location where MPD or MPD URL can be acquired |
| @deliveryMode | O | The delivery mode of this MPD location signalling |
| BootstrapInfo | 1 | Bootstrap information of MPD or MPD URL according to the delivery mode |
| ComponentSignalingLocation | 1…N | Component location signalling |
| @deliveryMode | O | The delivery mode of this component location signalling |
| BootstrapInfo | 1 | Bootstrap information of this component location signalling according to the delivery mode |
| AppSignalingLocation | 0…N | The location where application signalling can be acquired |
| @deliveryMode | O | The delivery mode of this application signalling |
| BootstrapInfo | 1 | Bootstrap information of the application signalling according to the delivery mode |
| ObjectFlow | 1…N | associated object flow delivering components of this service |

Legend:
For attributes: M=Mandatory, O=Optional, OD=Optional with Default Value, CM=Conditionally Mandatory.
For elements: <minOccurs>…<maxOccurs> (N=unbounded)
Note that the conditions only holds without using xlink:href. If linking is used, then all attributes are "option" and <minOccurs=0>
Elements are bold; attributes are non-bold and preceded with an @.

FIG. 81

| @ deliveryMode value | Designation |
|---|---|
| 0x00 | IPv4/IPv6 flows through same broadcast or over the cellular network |
| 0x01 | IPv4/IPv6 flows through different broadcast |
| 0x02 | Session - based flows (e.g., ALC/LCT, FLUTE sessions) through same broadcast |
| 0x03 | Session - based flows (e.g., ALC/LCT, FLUTE sessions) through different broadcast |
| 0x04 | packet - based flows through same broadcast |
| 0x05 | packet - based flows through different broadcast |
| 0x06 | URL |
| 0x07-0xFF | Reserved |

FIG. 82

| Element or Attribute Name | Use | Description |
|---|---|---|
| BootstrapInfo | | |
| @ RFchannel | O | RF channel carrying broadcast stream |
| @ broadcastID | O | the identifier of broadcaster transmitting the broadcast stream |
| @ datapipeID | O | the physical layer data pipe identifier carrying IP datagrams |
| @ sourceIP | O | the source address of the IP datagrams carrying associated data |
| @ destinationIP | O | the destination address of the IP datagrams carrying associated data |
| @ destinationPort | O | the destination port number of the IP datagrams carrying associated data |
| @ tsi | O | the identifier of transport session delivering transport packets carrying associated data |
| @ URL | O | URL where associated data can be acquired |
| @ packetid | O | The identifier of transport packets carrying the associated data |
| Legend | | |

For attributes: M=Mandatory, O=Optional, OD=Optional with Default Value, CM=Conditionally Mandatory.
For elements: <minOccurs>...<maxOccurs> (N=unbounded)
Note that the conditions only holds without using xlink:href. If linking is used, then all attributes are "optional" and <min Occurs>=0

Elements are bold, attributes are non-bold and preceded with an @.

FIG. 83

| Element or Attribute Name | Use | Description |
|---|---|---|
| ObjectFlow | | specifies the object flow |
| @id | M | the object flow identifier. When DASH segments are delivered via this object flow, it can be equal to combination of MPD identifier, period identifier, and DASH representation identifier |
| @objectFormat | M | The format of objects in this object flow. |
| @contentType | O | the media content component type for this object flow |
| @contentEncoding | O | the encoding of delivered objects via this object flow (e.g., gzip, etc) |
| File | 0..N | file information |
| @contentLocation | M | location where this file can be acquired. When DASH segments are delivered via this object flow, it can be equal to DASH segment URL. |
| @TOI | M | transport object identifier (TOI) |
| FileTemplate | 0..1 | file template information. |
| @contentLocTemplate | M | Template to create location where a file can be acquired. |
| @startTOI | O | the first TOI that is delivered in this object flow |
| @endTOI | O | the end TOI that is delivered in this object flow |
| @scale | OD (default = 1) | the scale between TOI values in this object flow. |
| ObjectGroup | 0..N | the group of transport objects delivered via this object flow. |
| @contentLocation | M | content Location associated to this object group |
| @startTOI | O | the first TOI of packets delivering this object group |
| @endTOI | O | the last TOI of packets delivering this object group |
| BootstrapInfo | 0..N | bootstrap information of this object flow |

Legend :
For attributes: M=Mandatory, O=Optional, OD=Optional with Default Value, CM=Conditionally Mandatory.
For elements: <minOccurs>...<maxOccurs> (N=unbounded)
Note that the conditions only holds without using xlink:href. If linking is used, then all attributes are "optional" and <minOccurs> are <0> Elements are bold; attributes are non-bold and preceded with an @.

FIG. 84

| $<Identifier>$ | Substitution parameter | Format |
|---|---|---|
| $$ | Is an escape sequence, i.e. "$$" is replaced with a single "$" | not applicable |
| $RepresentationID$ | This identifier is substituted with the value of the attribute Representation@id of the containing Representation. | The format tag shall not be present. |
| $Number$ | This identifier is substituted with the number of the corresponding Segment. | The format tag may be present. If no format tag is present, a default format tag with width=1 shall be used. |

FIG. 85

| Element or Attribute Name | Use | Description |
|---|---|---|
| ObjectFlow | | specifies the object flow |
| @id | M | the object flow identifier. When DASH segments are delivered via this object flow, it can be equal to combination of MPD identifier, period identifier, and DASH representation identifier |
| @objectFormat | M | The format of objects in this object flow. |
| @contentType | O | the media content component type for this object flow |
| @contentEncoding | O | the encoding of delivered objects via this object flow (e.g., gzip, a nd so on) |
| @isDefault | OD (default=true) | Specifies whether objects delivered in this object flow include the component data used as default |
| File | 0..N | file information |
| @contentLocation | M | location where this file can be acquired. When DASH segments are delivered via this object flow, it can be equal to DASH segment URL |
| @TOI | M | transport object identifier (TOI) |
| FileTemplate | 0..1 | file template information. |
| @startTOI | O | the first TOI that is delivered in this object flow |
| @endTOI | O | the end TOI that is delivered in this object flow |
| @scale | OD (default = 1) | the scale between TOI values in this object flow. |
| ObjectGroup | 0..N | the group of transport objects delivered via this object flow . |
| @contentLocation | M | content location associated to this object group |
| @startTOI | O | the first TOI of packets delivering this object group |
| @endTOI | O | the last TOI of packets delivering this object group |
| BootstrapInfo | 0..N | bootstrap information of this object flow |

Legend :
For attributes: M=Mandatory, O=Optional, OD=Optional with Default Value, CM=Conditionally Mandatory.
For elements: <minOccurs>...<maxOccurs> (N=unbounded)
Note that the conditions only holds without using xlink:href. If linking is used, then all attributes are "optional" and <min Occurs=0>
Elements are bold; attributes are non-bold and preceded with an @.

FIG. 86

| Element or Attribute Name | Use | Description |
|---|---|---|
| FDTInstance | | specifies the static File Delivery Descriptor |
| @id | M | specifies the identifier of the FDT instance |
| @Expires | M | expiry time of the FDT Instance. |
| @Complete | O | when TRUE, signals that no new data will be provided in future FDT Instances within this session (i.e., that either FDT Instances with higher ID numbers will not be used or if they are used, will only provide identical file parameters to those already given in this and previous FDT Instances) |
| File | 1..N | |
| @Content-Location | M | Can be assigned a valid URI |
| @TOI | M | MUST be assigned a valid TOI value |
| @Content-Length | O | The actual length of this file content |
| @Transfer-Length | O | The transfer length of this file content |
| @Content-Encoding | O | The encoding of this file content |
| @Content-Type | O | The type of this file content |

Legend:
For attributes: M=Mandatory, O=Optional, OD=Optional with Default Value, CM=Conditionally Mandatory.
For elements: <minOccurs>...<maxOccurs> (N=unbounded)
Note that the conditions only holds without using xlink:href. If linking is used, then all attributes are "optional" and <minOccurs=0>
Elements are bold; attributes are non-bold and preceded with an @.

FIG. 87

| Element or Attribute Name | Use | Description |
|---|---|---|
| TSID | | Transport Session Instance Descriptor |
| TransportSession | 1..N | |
| @tsi | M | specifies the transport session identifier |
| PayloadFormat | 1..N | |
| @codePoint | OD default=0 | defines what CodePoint value is used for this payload. This is the value of the CP field in the LCT header. |
| @protocol | M | specifies the protocol for this payload. <br> 0: ALC <br> 1: ROUTE |
| @deliveryObjectFormat | M | specifies the payload format of the delivery object. For details see below. |
| @realtime | OD | if not present it is false. If present and set to true, LCT packets contain extension headers including NTP timestamps that express the presentation time of the included delivery object. |
| @ isobmff | OD default=0 | expresses if the delivery objects are ISO BMFF structures and if specific fragmentation is applied <br> 0: arbitrary data <br> 1: delivery object is a sequence of complete ISO BMFF boxes <br> 2: each delivery object is a DASH object, i.e. a segment or any other object that is referenced in the MPD. <br> 3: delivery object is a is a sequence of complete ISO BMFF boxes fragmented according to the rules in MMT MPU mode |
| @packetheadersize | OD default=1 | The size the route packet header in multiple of 4 octets. The value space shall 0, 1 or 2. If set to 0, the ROUTE packet is of zero size and the packet itself contains an entire delivery object. |
| EFID | 0 .. 1 | provides details of the file delivered data. This is the extended FDT instance descriptor. Either embedded or as reference. |
| ApplicationIdentifier | 0 .. 1 | may provide additional information that can be mapped to the application that is carried in this transport session, e.g. Representation ID of a DASH content. |
| RepairFlow | 0 .. N | Reference a repair flow. This may be added directly or referenced as a separate fragment |
| Legend: <br> For attributes: M=Mandatory, O=Optional, OD=Optional with Default Value, CM=Conditionally Mandatory. <br> For elements: <minOccurs>..<maxOccurs> (N=unbounded) <br> Note that the conditions only holds without using xlink:href. If linking is used, then all attributes are "optional" and <minOccurs=0> <br> Elements are bold; attributes are non-bold and preceded with an @. | | |

FIG. 88

| Element or Attribute Name | Use | Description |
|---|---|---|
| TSID | | Transport Session Instance Descriptor |
| TransportSession | 1..N | |
| @tsi | M | specifies the transport session identifier |
| @protocol | M | specifies the protocol for this payload.<br>0: ALC<br>1: ROUTE |
| PayloadFormat | 1..N | |
| @codePoint | OD<br>default=0 | defines what CodePoint value is used for this payload. This is the value of the CP field in the LCT header. |
| @deliveryObjectFormat | M | specifies the payload format of the delivery object. For details see below. |
| @realtime | OD | If not present it is false. If present and set to true, LCT packets contain extension headers including NTP timestamps that express the presentation time of the included delivery object. |
| @isobmff | OD<br>default=0 | expresses if the delivery objects are ISO BMFF structures and if specific fragmentation is applied<br>0: arbitrary data<br>1: delivery object is a sequence of complete ISO BMFF boxes<br>2: each delivery object is a DASH object, i.e. a segment or any other object that is referenced in the MPD.<br>3: delivery object is a is a sequence of complete ISO BMFF boxes fragmented according to the rules in MMT MPU mode |
| @packetheadersize | OD<br>default=1 | The size the route packet header in multiple of 4 octets. The value space shall 0, 1 or 2. If set to 0, the ROUTE packet is of zero size and the packet itself contains an entire delivery object. |
| EFID | 0..1 | provides details of the file delivered data. This is the extended FDT instance descriptor. Either embedded or as reference. |
| ApplicationIdentifier | 0..1 | may provide additional information that can be mapped to the application that is carried in this transport session, e.g. Representation ID of a DASH content. |
| RepairFlow | 0..N | Reference a repair flow. This may be added directly or referenced as a separate fragment |

Legend:
For attributes: M=Mandatory, O=Optional, OD=Optional with Default Value, CM=Conditionally Mandatory.
For elements: <minOccurs>...<maxOccurs> (N=unbounded)
Note that the conditions only holds without using xlink:href. If linking is used, then all attributes are "optional" and <minOccurs=0>
Elements are bold; attributes are non-bold and preceded with an @.

FIG. 89

| Element or Attribute Name | Use | Description |
|---|---|---|
| Service | 1..N | specifies the service |
| @id | M | service identifier |
| @serviceType | M | service type |
| @serviceName | O | service name |
| @channelNumber | M | channel number associated with this service |
| TimebaseLocation | 0..N | The location where a time base, a metadata to establish a time line for synchronizing the components of this service, can be acquired |
| @deliveryMode | M | delivery mode of this time base |
| BootstrapInfo | 1..N | Bootstrap information of this time base according to the delivery mode |
| MPD | 0..1 | DASH media presentation description (MPD) associated with this service |
| SignalingLocation | 0..N | The location where MPD or MPD URL related signalling can be acquired |
| @deliveryMode | M | The delivery mode of this MPD location signalling |
| BootstrapInfo | 1..N | Bootstrap information of MPD or MPD URL according to the delivery mode |

Legend:
For attributes: M=Mandatory, O=Optional, OD=Optional with Default Value, CM=Conditionally Mandatory.
For elements: <minOccurs>..<maxOccurs> (N=unbounded)
Note that the conditions only holds without using xlink-href. If linking is used, then all attributes are "optional" and < minOccurs=0>

Elements are bold, attributes are non-bold and preceded with an @.

FIG. 90

| Element or Attribute Name | Use | Description |
|---|---|---|
| FDT-Instance | | specifies the static File Delivery Descriptor |
| @id | M | specifies the identifier of the FDT instance |
| @version | O | Version information of this FDT instance |
| @Expires | M | expiry time of the FDT Instance. |
| @Complete | O | when TRUE, signals that no new data will be provided in future FDT Instances within this session (i.e., that either FDT Instances with higher ID numbers will not be used or if they are used, will only provide identical file parameters to those already given in this and previous FDT Instances) |
| File | 1..N | |
| @Content-Location | M | Can be assigned a valid URI |
| @TOI | M | MUST be assigned a valid TOI value |
| @Content-Length | O | The actual length of this file content |
| @Transfer-Length | O | The transfer length of this file content |
| @Content-Encoding | O | The encoding of this file content |
| @Content-Type | O | The type of this file content |
| Legend: | | |

For attributes: M=Mandatory, O=Optional, OD=Optional with Default Value, CM=Conditionally Mandatory.
For elements: <minOccurs>...<maxOccurs> (N=unbounded)
Note that the conditions only holds without using xlink:href. If linking is used, then all attributes are "option al" and <minOccurs=0>
Elements are bold, attributes are non-bold and preceded with an @.

FIG. 91

| Syntax | No. of Bits | Format |
|---|---|---|
| Service_Mapping_Table { | | |
|     signaling_id | 8 | TBD |
|     signaling_length | 16 | |
|     protocol_version | 8 | |
|     broadcast_id | 16 | |
|     version_number | 8 | |
|     IP_version_flag | 1 | |
|     signaling_data_type | 7 | |
|     expiration | 8 | |
|     fragment_number | 8 | |
|     last_fragment_number | 8 | |
|     num_services | 8 | |
|     for(i=0;i<num_services;i++){ | | |
|         service_id | 16 | |
|         service_name_length | 8 | |
|         service_name | 8*N | |
|         channel_number | 8 | |
|         service_category | 8 | |
|         service_status | 2 | |
|         sp_indicator | 1 | |
|         reserved | 1 | |
|         num_route_sessions | 4 | |
|         for(j=0;j<num_route_sessions;j++){ | | |
|             source_ip | 32 or 128 | |
|             destination_ip | 32 or 128 | |
|             port | 16 | |
|             num_lsid_tsi | 8 | |
|             for(k=0;k<num_lsid_tsi;k++){ | | |
|                 lsid_delivery_tsi | 16 | |
|             } | | |
|         } | | |
|     } | | |
| } | | |

FIG. 92

```xml
<?xml version = "1.0" encoding = "UTF-8"?>
<schema
    xmlns = "http://www.w3.org/2001/XMLSchema"
    elementFormDefault = "qualified"
    version = "1.0">
    <!-- GLOBAL ELEMENTS -->
    <element name = "SMT" type = "SmtType" />
    <!-- TYPE DEFINITIONS -->
    <complexType name = "SmtType">
        <sequence>
            <element name = "Service" type = "ServiceType" maxOccurs = "unbounded" />
        </sequence>
    </complexType>

<complexType name = "ServiceType">
        <sequence>
            <element name = "Name" type = "string" minOccurs = "1" />
            <element name = "Category" type = "string" minOccurs = "1" maxOccurs = "unbounded" />
            <element name = "RouteSessionInfo" type = "RouteSessionInfoType" minOccurs = "1"
                     maxOccurs = "unbounded" />
        </sequence>
        <attribute name = "serviceID" type = "unsignedShort" use = "required" />
        <attribute name = "RFChan" type = "unsignedByte" use = "required" />
        <attribute name = "serviceStatus" type = "unsignedByte" use = "optional" />
        <attribute name = "SPindicator" type = "boolean" use = "optional" default = "false" />
    </complexType>

<complexType name = "RouteSessionInfoType">
        <sequence>
            <element name = "sourceIPAddr" type = "IPAddrType" minOccurs = "1" />
            <element name = "destinationIPAddr" type = "IPAddrType" minOccurs = "1" />
            <element name = "Port" type = "unsignedShort" minOccurs = "1" />
            <element name = "tsid_delivery_tsi" type = "unsignedLong" minOccurs = "0"
                     maxOccurs = "unbounded" default = "0" />
        </sequence>
    </complexType>

<simpleType name = "IPAddrValueType">
        <restriction base = "string" />
    </simpleType>
    <complexType name = "IPAddrType">
        <simpleContent>
            <extension base = "IPAddrValueType">
                <attribute name = "version" type = "unsignedByte" />
            </extension>
        </simpleContent>
    </complexType>
</schema>
```

FIG. 94

| Element or Attribute Name | Use | Description |
|---|---|---|
| Service | 1..N | specifies the service |
| @id | M | service identifier |
| @serviceType | M | service type |
| @serviceName | O | service name |
| @channelNumber | M | channel number associated with this service |
| ROUTESessionInfo | 0..N | |
| @id | M | Identifier of ROUTE session |
| @version | M | Version of ROUTE session |
| @sourceIP | M | Source IP address of ROUTE session for transmitting media component |
| @destinationIP | M | Destination IP address of ROUTE session for transmitting media component |
| @port | M | Destination port number of ROUTE session for transmitting media component |
| @DP_ID | M | ID of DATA pipeline via which ROUTE session is transmitted |
| LSIDInfo | 0..N | |
| TimebaseLocation | 0..1 | The location where a time base, a metadata to establish a time line for synchronizing the components of this service, can be acquired |
| @deliveryMode | M | The delivery mode of this time base |
| BootstrapInfo | 1 | Bootstrap information of this time base according to the delivery mode |

| Element or Attribute Name | Use | Description |
|---|---|---|
| LSIDInfo | | |
| @deliveryMode | M | The delivery mode of the LSID |
| DeliveryInfo | 1 | Bootstrap information of this time base according to the delivery mode |
| LSID | 0..1 | Actual LSID embedded (only in case of @deliveryMode == embedded) |
| Legend: | | |
| For attributes: M=Mandatory, O=Optional, OD=Optional with Default Value, CM=Conditionally Mandatory For elements: <minOccurs>...<maxOccurs> (N=unbounded) Note that the conditions only holds without using xlink:href. If linking is used, then all attributes are "optional" and <minOccurs=0> Elements are bold; attributes are non-bold and proceeded with an @ | | |

L95020

| Element or Attribute Name | Use | Description |
|---|---|---|
| DeliveryInfo | | |
| @ROUTE_session_id | O | If this value is 0, this indicates the LSID transmitted via the session such as high-level ROUTE session |
| @sourceIP | O | the source address of the IP datagrams carrying associated data |
| @destinationIP | O | the destination address of the IP datagrams carrying associated data |
| @destinationPort | O | the destination port number of the IP datagrams carrying associated data |
| @tsi | O | the transport session identifier of session-based transport packets carrying associated data |
| @URL | O | URL where associated data can be acquired |
| @DP_ID | O | The Data pipeline ID of the physical layer carrying the associated data |
| Legend: | | |
| For attributes: M=Mandatory, O=Optional, OD=Optional with Default Value, CM=Conditionally Mandatory For elements: <minOccurs>...<maxOccurs> (N=unbounded) Note that the conditions only holds without using xlink:href. If linking is used, then all attributes are "optional" and <minOccurs=0> Elements are bold; attributes are non-bold and proceeded with an @ | | |

FIG. 96

| Element or Attribute Name | Use | Description |
|---|---|---|
| Service | 1..N | specifies the service |
| @id | M | service identifier |
| @serviceType | M | service type |
| @serviceName | O | service name |
| @channelNumber | M | channel number associated with this service |
| ROUTESessionInfo | 0..N | |
| @id | M | Identifier of route SESSION |
| @version | M | Version of ROUTE session |
| @sourceIP | M | Source IP address of ROUTE session for transmitting media component |
| @destinationIP | M | Destination IP address of ROUTE session for transmitting media component |
| @port | M | Destination port number of ROUTE session for transmitting media component |
| LSIDInfo | 0..N | |
| TimebaseLocation | 0..1 | The location where a time base, a metadata to establish a time line for synchronizing the components of this service, can be acquired |
| @deliveryMode | M | The delivery mode of this time base |
| BootstrapInfo | 1 | Bootstrap information of this time base according to the delivery mode |

FIG. 97

| Element or Attribute Name | Use | Description |
|---|---|---|
| LSID | | LCT Session Instance Description |
| @version | O | Version of this LCT Session Instance Description. The version is increased by one when the descriptor is updated. The received LSID with highest version number is the currently valid version |
| @validFrom | O | The date and time from which the LSID is valid. The validFrom attribute may or may not be present. If not present, the receiver should assume the LSID version is valid immediately |
| @expiration | O | The date and time when the LSID expires. The expiration attribute may or may not be present. If not present the receiver should assume the LSID is valid for all time, or until it receives a newer LSID with an associated expiration value |
| TransportSession | 1..N | Provides information about LCT transport sessions |
| @tsi | M | Specifies the transport session identifier. The session identifiers must not be 0 |
| @DP_ID | M | DP_ID via which transport session is transmitted |
| SourceFlow | 0..1 | Provides information of a source flow carried on this tsi |
| RepairFlow | 0..1 | Provides information of a repair flow carried on this tsi. For more details refer to Section 7 |

Legend:
For attributes: M=Mandatory, O=Optional, OD=Optional with Default Value, CM=Conditionally Mandatory.
For elements: <minOccurs>..<maxOccurs> (N=unbounded)
Note that the conditions only holds without using xlink:href. If linking is used, then all attributes are "optional." and <minOccurs=0>
Elements are bold, attributes are non-bold and preceded with an @

METHOD FOR TRANSMITTING BROADCAST SIGNALS, APPARATUS FOR TRANSMITTING BROADCAST SIGNALS, METHOD FOR RECEIVING BROADCAST SIGNALS AND APPARATUS FOR RECEIVING BROADCAST SIGNALS

CROSS-REFERENCE TO RELATED APPLICATIONS

This application is a Continuation of U.S. patent application Ser. No. 16/829,474 filed on Mar. 25, 2020, know U.S. Pat. No. 11,212,772 issued on Dec. 28, 2021), which is a Continuation of U.S. patent application Ser. No. 14/913,639 filed on Feb. 22, 2016 (now U.S. Pat. No. 10,645,674 issued on May 5, 2020), which is the National Phase of PCT International Application No. PCT/KR2015/008773, filed on Aug. 21, 2015, which claims priority under 35 U.S.C. 119(e) to U.S. Provisional Application No. 62/040,419, filed on Aug. 22, 2014, all of these applications are hereby expressly incorporated by reference into the present application.

BACKGROUND OF THE INVENTION

Field of the Invention

The present invention relates to a method and apparatus for transmitting and receiving broadcast signals.

Discussion of the Related Art

As analog broadcast signal transmission comes to an end, various technologies for transmitting/receiving digital broadcast signals are being developed. A digital broadcast signal may include a larger amount of video/audio data than an analog broadcast signal and may further include various types of additional data.

That is, a digital broadcast system can provide HD (high definition) images, multi-channel audio and various additional services. However, data transmission efficiency for transmission of large amounts of data, robustness of transmission/reception networks and network flexibility in consideration of mobile reception equipment need to be improved for digital broadcast.

SUMMARY OF THE INVENTION

The object of the present invention can be achieved by providing a method for transmitting a broadcast signal including encoding a broadcast service and signaling information of the broadcast service, generating the broadcast signal including the encoded broadcast service and signaling information, and transmitting the generated broadcast signal.

The signaling information may include service identification information for identifying the broadcast service, information indicating the name of the broadcast service and/or information indicating whether the broadcast service is active or inactive.

The signaling information may include information for identifying information on a transport session for transmitting the broadcast service.

The signaling information may include information indicating a channel number of the broadcast service.

The signaling information may include information indicating whether the format of the signaling information is binary or extensible markup language (XML).

The signaling information may include information on a transport session for transmitting the broadcast service, and the information on the transport session may include source IP address information of the transport session, destination IP address information of the transport session and/or destination port number information of the transport session.

In another aspect of the present invention, provided herein is a method for receiving a broadcast signal including receiving a broadcast signal including a broadcast service and signaling information of the broadcast service, parsing the broadcast service and signaling information from the received broadcast signal, and decoding the parsed broadcast service and signaling information.

The signaling information may include service identification information for identifying the broadcast service, information indicating the name of the broadcast service and/or information indicating whether the broadcast service is active or inactive.

The signaling information may include information for identifying information on a transport session for transmitting the broadcast service.

The signaling information may include information indicating a channel number of the broadcast service.

The signaling information may include information indicating whether the format of the signaling information is binary or extensible markup language (XML).

The signaling information may include information on a transport session for transmitting the broadcast service, and the information on the transport session may include source IP address information of the transport session, destination IP address information of the transport session and/or destination port number information of the transport session.

In another aspect of the present invention, provided herein is an apparatus for transmitting a broadcast signal including an encoder configured to encode a broadcast service and signaling information of the broadcast service, a broadcast signal generator configured to generate the broadcast signal including the encoded broadcast service and signaling information, and a transmitter configured to transmit the generated broadcast signal.

The signaling information may include service identification information for identifying the broadcast service, information indicating the name of the broadcast service and/or information indicating whether the broadcast service is active or inactive.

In another aspect of the present invention, provided herein is an apparatus for receiving a broadcast signal including a receiver configured to receive a broadcast signal including a broadcast service and signaling information of the broadcast service, a parser configured to parse the broadcast service and signaling information from the received broadcast signal, and a decoder configured to decode the parsed broadcast service and signaling information.

An embodiment of the present invention provides a broadcast service by controlling QoS (Quality of Service) of each service or service component and by processing data according to features of each service.

An embodiment of the present invention provides a transmission flexibility by transmitting various broadcast services through the same RF (radio frequency) signal bandwidth.

An embodiment of the present invention enhances Robustness of a broadcast signal and an efficiency of a data transmission by using MIMO (Multiple Input Multiple Output) system.

An embodiment of the present invention provides a broadcast transmission apparatus, an operation method of the broadcast transmission apparatus, a broadcast reception apparatus, and an operation method of the broadcast reception apparatus that are capable of acquiring digital broadcast signals without errors although we are using mobile receiving apparatus or we are in door.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 10 illustrates a signaling hierarchy structure of the frame according to an embodiment of the present invention.

FIG. 11 illustrates preamble signaling data according to an embodiment of the present invention.

FIG. 12 illustrates PLS1 data according to an embodiment of the present invention.

FIG. 13 illustrates PLS2 data according to an embodiment of the present invention.

FIG. 20 illustrates a time interleaving according to an embodiment of the present invention.

FIG. 25 illustrates signaling for single-memory deinterleaving irrespective of the number of symbols in a frame according to an embodiment of the present invention.

FIG. 26 illustrates FI schemes of FSS in signaling for single-memory deinterleaving irrespective of the number of symbols in a frame according to an embodiment of the present invention.

FIG. 27 illustrates operation of a reset mode in signaling for single-memory deinterleaving irrespective of the number of symbols in a frame according to an embodiment of the present invention.

FIG. 28 illustrates equations indicating input and output of the frequency interleaver in signaling for single-memory deinterleaving irrespective of the number of symbols in a frame according to an embodiment of the present invention.

FIG. 29 illustrates equations of a logical operation mechanism of frequency interleaving based on FI scheme #1 and FI scheme #2 in signaling for single-memory deinterleaving irrespective of the number of symbols in a frame according to an embodiment of the present invention.

FIG. 37 shows equations representing block interleaving according to an embodiment of the present invention.

FIG. 38 illustrates virtual FEC blocks according to an embodiment of the present invention.

FIG. 39 shows equations representing reading operation after insertion of virtual FEC blocks according to an embodiment of the present invention.

FIG. 42 illustrates writing operation according to an embodiment of the present invention.

FIG. 43 illustrates reading operation according to an embodiment of the present invention.

FIG. 44 illustrates a result of skip operation in reading operation according to an embodiment of the present invention.

FIG. 45 shows a writing process of time deinterleaving according to an embodiment of the present invention.

FIG. 46 illustrates a writing process of time deinterleaving according to another embodiment of the present invention.

FIG. 47 shows equations representing reading operation of time deinterleaving according to another embodiment of the present invention.

FIG. 60 is a diagram showing the configuration of a service signaling message according to one embodiment of the present invention.

FIG. 61 is a diagram showing the configuration of a service signaling message according to one embodiment of the present invention.

FIG. 62 is a diagram showing the configuration of a broadcast service signaling message in a next generation broadcast system according to one embodiment of the present invention.

FIG. 63 is a diagram showing the meaning of the value of a timebase_transport_mode field and a signaling_transport_mode field in a service signaling message according to one embodiment of the present invention.

FIGS. 64 to 70 are diagrams showing the syntax of a bootstrap( ) field according to the values of the timebase_transport_mode field and the signaling_transport_mode field in one embodiment of the present invention.

FIG. 72 is a diagram showing the configuration of a broadcast service signaling message in a next generation broadcast system according to one embodiment of the present invention.

FIG. 73 is a diagram showing the configuration of a broadcast service signaling message in a next generation broadcast system according to one embodiment of the present invention.

FIG. 74 is a diagram showing the meaning of the value of each transport mode described in FIG. 73.

FIG. 75 is a diagram showing the configuration of a signaling message for signaling a component data acquisition path of a broadcast service in a next generation broadcast system.

FIG. 76 is a diagram showing the syntax of an app_delevery_info( ) field according to one embodiment of the present invention.

FIG. 77 is a diagram showing the syntax of an app_delevery_info( ) field according to another embodiment of the present invention.

FIG. 78 is a diagram showing component location signaling including path information capable of acquiring one or more component data configuring a broadcast service.

FIG. 80 is a diagram showing other information included in signaling of a broadcast service in a next generation broadcast system in one embodiment of the present invention.

FIG. 81 is a diagram showing a transport mode included in service signaling of a next generation broadcast system according to one embodiment of the present invention.

FIG. 82 is a diagram showing information on a bootstrap included in service signaling of a next generation broadcast system according to one embodiment of the present invention.

FIG. 83 is a diagram showing other information included in signaling for an object flow.

FIG. 84 is a diagram showing a combination of information for representing a file template in one embodiment of the present invention.

FIG. 85 is a diagram showing an object flow included in service signaling according to one embodiment of the present invention.

FIG. 86 is a diagram showing other information included in signaling of a broadcast service in a next generation broadcast system in one embodiment of the present invention.

FIG. 87 is a diagram showing signaling information for transport session information of a session level according to one embodiment of the present invention.

FIG. 88 is a diagram showing signaling information for transport session information of a session level according to another embodiment of the present invention.

FIG. 89 is a diagram showing signaling information of a broadcast service according to another embodiment of the present invention.

FIG. 90 is a diagram showing FDT related information included in signaling information of a broadcast service according to another embodiment of the present invention.

FIG. 91 is a diagram showing the configuration of the binary format of a Service_Mapping_Table according to one embodiment of the present invention.

FIG. 92 is a diagram showing the configuration of the XML format of a Service_Mapping_Table according to one embodiment of the present invention.

FIG. 94 is a diagram showing the configuration of service signaling according to one embodiment of the present invention.

FIG. 95 is a diagram showing the configuration of LSID-Info information and DeliveryInfo information according to one embodiment of the present invention.

FIG. 96 is a diagram showing the configuration of service signaling according to another embodiment of the present invention.

FIG. 97 is a diagram showing the configuration of an LSID according to one embodiment of the present invention.

DETAILED DESCRIPTION OF THE EMBODIMENTS

Figure 1:
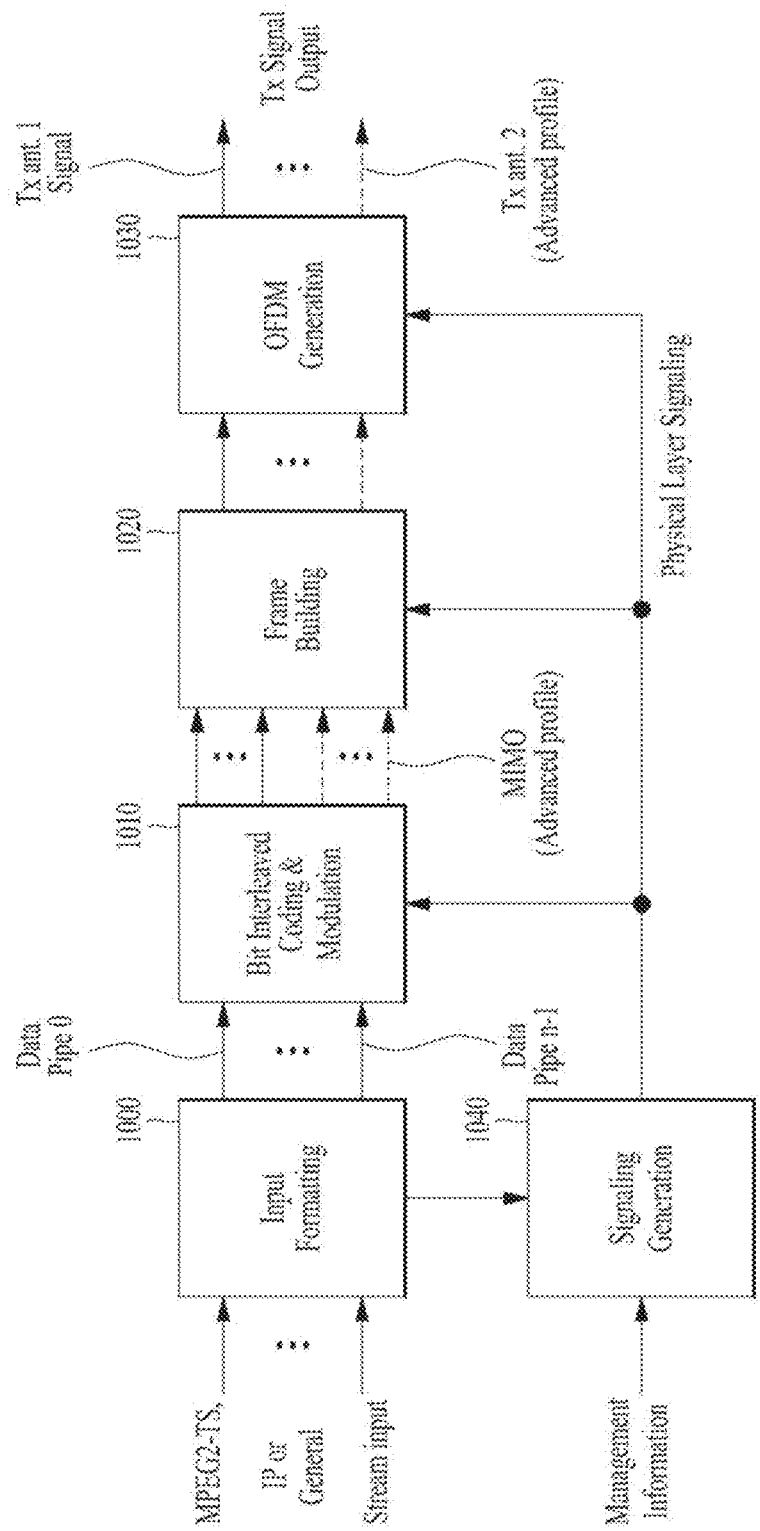
FIG. 1 illustrates a structure of an apparatus for transmitting broadcast signals for future broadcast services according to an embodiment of the present invention.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although most terms used in the present invention have been selected from general ones widely used in the art, some terms have been arbitrarily selected by the applicant and their meanings are explained in detail in the following description as needed. Thus, the present invention should be understood based upon the intended meanings of the terms rather than their simple names or meanings.

'Signaling' in this specification indicates transmitting service information provided in a broadcast system.

'Broadcast signal' in this specification indicates signals and data that are provided in terrestrial, cable, satellite, mobile, internet, broadband, communication, data and/or VOD broadcast.

'PLP' in this specification indicates a kind of unit transmitting data belong to physical layers. And, it may be called 'data unit' or 'data pipe'.

Various contents may be provided by transmitting A/V contents and relevant enhanced data through a terrestrial channel and/or internet channel in real time.

The present invention provides apparatuses and methods for transmitting and receiving broadcast signals for future broadcast services. Future broadcast services according to an embodiment of the present invention include a terrestrial broadcast service, a mobile broadcast service, a UHDTV service, etc. The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

While MISO or MIMO uses two antennas in the following for convenience of description, the present invention is applicable to systems using two or more antennas. The present invention may defines three physical layer (PL) profiles—base, handheld and advanced profiles—each optimized to minimize receiver complexity while attaining the performance required for a particular use case. The physical layer (PHY) profiles are subsets of all configurations that a corresponding receiver should implement.

The three PHY profiles share most of the functional blocks but differ slightly in specific blocks and/or parameters. Additional PHY profiles can be defined in the future. For the system evolution, future profiles can also be multiplexed with the existing profiles in a single RF channel through a future extension frame (FEF). The details of each PHY profile are described below.

1. Base Profile

The base profile represents a main use case for fixed receiving devices that are usually connected to a roof-top antenna. The base profile also includes portable devices that could be transported to a place but belong to a relatively stationary reception category. Use of the base profile could be extended to handheld devices or even vehicular by some improved implementations, but those use cases are not expected for the base profile receiver operation.

Target SNR range of reception is from approximately 10 to 20 dB, which includes the 15 dB SNR reception capability of the existing broadcast system (e.g. ATSC A/53). The receiver complexity and power consumption is not as critical as in the battery-operated handheld devices, which will use the handheld profile. Key system parameters for the base profile are listed in below table 1.

TABLE 1

| | |
|---|---|
| LDPC codeword length | 16K, 64K bits |
| Constellation size | 4~10 bpcu (bits per channel use) |
| Time de-interleaving memory size | ≤219 data cells |
| Pilot patterns | Pilot pattern for fixed reception |
| FFT size | 16K, 32K points |

2. Handheld Profile

The handheld profile is designed for use in handheld and vehicular devices that operate with battery power. The devices can be moving with pedestrian or vehicle speed. The power consumption as well as the receiver complexity is very important for the implementation of the devices of the handheld profile. The target SNR range of the handheld profile is approximately 0 to 10 dB, but can be configured to reach below 0 dB when intended for deeper indoor reception.

In addition to low SNR capability, resilience to the Doppler Effect caused by receiver mobility is the most important performance attribute of the handheld profile. Key system parameters for the handheld profile are listed in the below table 2.

TABLE 2

| | |
|---|---|
| LDPC codeword length | 16K bits |
| Constellation size | 2~8 bpcu |
| Time de-interleaving memory size | ≤2^18 data cells |
| Pilot patterns | Pilot patterns for mobile and indoor reception |
| FFT size | 8K, 16K points |

3. Advanced Profile

The advanced profile provides highest channel capacity at the cost of more implementation complexity. This profile requires using MIMO transmission and reception, and UHDTV service is a target use case for which this profile is specifically designed. The increased capacity can also be used to allow an increased number of services in a given bandwidth, e.g., multiple SDTV or HDTV services.

The target SNR range of the advanced profile is approximately 20 to 30 dB. MIMO transmission may initially use existing elliptically-polarized transmission equipment, with extension to full-power cross-polarized transmission in the future. Key system parameters for the advanced profile are listed in below table 3.

TABLE 3

| | |
|---|---|
| LDPC codeword length | 16K, 64K bits |
| Constellation size | 8~12 bpcu |
| Time de-interleaving memory size | ≤2^19 data cells |
| Pilot patterns | Pilot pattern for fixed reception |
| FFT size | 16K, 32K points |

In this case, the base profile can be used as a profile for both the terrestrial broadcast service and the mobile broadcast service. That is, the base profile can be used to define a concept of a profile which includes the mobile profile. Also, the advanced profile can be divided advanced profile for a base profile with MIMO and advanced profile for a handheld profile with MIMO. Moreover, the three profiles can be changed according to intention of the designer.

The following terms and definitions may apply to the present invention. The following terms and definitions can be changed according to design.

auxiliary stream: sequence of cells carrying data of as yet undefined modulation and coding, which may be used for future extensions or as required by broadcasters or network operators base data pipe: data pipe that carries service signaling data baseband frame (or BBFRAME): set of Kbch bits which form the input to one FEC encoding process (BCH and LDPC encoding)

cell: modulation value that is carried by one carrier of the OFDM transmission coded block: LDPC-encoded block of PLS1 data or one of the LDPC-encoded blocks of PLS2 data data pipe: logical channel in the physical layer that carries service data or related metadata, which may carry one or multiple service(s) or service component(s).

data pipe unit: a basic unit for allocating data cells to a DP in a frame.

data symbol: OFDM symbol in a frame which is not a preamble symbol (the frame signaling symbol and frame edge symbol is included in the data symbol)

DP_ID: this 8-bit field identifies uniquely a DP within the system identified by the SYSTEM_ID dummy cell: cell carrying a pseudo-random value used to fill the remaining capacity not used for PLS signaling, DPs or auxiliary streams emergency alert channel: part of a frame that carries EAS information data frame: physical layer time slot that starts with a preamble and ends with a frame edge symbol frame repetition unit: a set of frames belonging to same or different physical layer profile including a FEF, which is repeated eight times in a super-frame fast information channel: a logical channel in a frame that carries the mapping information between a service and the corresponding base DP FECBLOCK: set of LDPC-encoded bits of a DP data FFT size: nominal FFT size used for a particular mode, equal to the active symbol period Ts expressed in cycles of the elementary period T frame signaling symbol: OFDM symbol with higher pilot density used at the start of a frame in certain combinations of FFT size, guard interval and scattered pilot pattern, which carries a part of the PLS data frame edge symbol: OFDM symbol with higher pilot density used at the end of a frame in certain combinations of FFT size, guard interval and scattered pilot pattern frame-group: the set of all the frames having the same PHY profile type in a super-frame.

future extension frame: physical layer time slot within the super-frame that could be used for future extension, which starts with a preamble Futurecast UTB system: proposed physical layer broadcasting system, of which the input is one or more MPEG2-TS or IP or general stream(s) and of which the output is an RF signal input stream: A stream of data for an ensemble of services delivered to the end users by the system.

normal data symbol: data symbol excluding the frame signaling symbol and the frame edge symbol PHY profile: subset of all configurations that a corresponding receiver should implement PLS: physical layer signaling data consisting of PLS1 and PLS2

PLS1: a first set of PLS data carried in the FSS symbols having a fixed size, coding and modulation, which carries basic information about the system as well as the parameters needed to decode the PLS2

NOTE: PLS1 data remains constant for the duration of a frame-group.

PLS2: a second set of PLS data transmitted in the FSS symbol, which carries more detailed PLS data about the system and the DPs PLS2 dynamic data: PLS2 data that may dynamically change frame-by-frame PLS2 static data: PLS2 data that remains static for the duration of a frame-group preamble signaling data: signaling data carried by the preamble symbol and used to identify the basic mode of the system preamble symbol: fixed-length pilot symbol that carries basic PLS data and is located in the beginning of a frame NOTE: The preamble symbol is mainly used for fast initial band scan to detect the system signal, its timing, frequency offset, and FFT-size.

reserved for future use: not defined by the present document but may be defined in future super-frame: set of eight frame repetition units time interleaving block (TI block): set of cells within which time interleaving is carried out, corresponding to one use of the time interleaver memory TI group: unit over which dynamic capacity allocation for a particular DP is carried out, made up of an integer, dynamically varying number of XFECBLOCKs NOTE: The TI group may be mapped directly to one frame or may be mapped to multiple frames. It may contain one or more TI blocks.

Type 1 DP: DP of a frame where all DPs are mapped into the frame in TDM fashion

Type 2 DP: DP of a frame where all DPs are mapped into the frame in FDM fashion

XFECBLOCK: set of Ncells cells carrying all the bits of one LDPC FECBLOCK

FIG. 1 illustrates a structure of an apparatus for transmitting broadcast signals for future broadcast services according to an embodiment of the present invention.

The apparatus for transmitting broadcast signals for future broadcast services according to an embodiment of the present invention can include an input formatting block 1000, a BICM (Bit interleaved coding & modulation) block 1010, a frame building block 1020, an OFDM (Orthogonal Frequency Division Multiplexing) generation block 1030 and a signaling generation block 1040. A description will be given of the operation of each module of the apparatus for transmitting broadcast signals.

IP stream/packets and MPEG2-TS are the main input formats, other stream types are handled as General Streams. In addition to these data inputs, Management Information is input to control the scheduling and allocation of the corresponding bandwidth for each input stream. One or multiple TS stream(s), IP stream(s) and/or General Stream(s) inputs are simultaneously allowed.

The input formatting block 1000 can demultiplex each input stream into one or multiple data pipe(s), to each of which an independent coding and modulation is applied. The data pipe (DP) is the basic unit for robustness control, thereby affecting quality-of-service (QoS). One or multiple service(s) or service component(s) can be carried by a single DP. Details of operations of the input formatting block 1000 will be described later.

The data pipe is a logical channel in the physical layer that carries service data or related metadata, which may carry one or multiple service(s) or service component(s).

Also, the data pipe unit: a basic unit for allocating data cells to a DP in a frame.

In the BICM block 1010, parity data is added for error correction and the encoded bit streams are mapped to complex-value constellation symbols. The symbols are interleaved across a specific interleaving depth that is used for the corresponding DP. For the advanced profile, MIMO encoding is performed in the BICM block 1010 and the additional data path is added at the output for MIMO transmission. Details of operations of the BICM block 1010 will be described later.

The Frame Building block 1020 can map the data cells of the input DPs into the OFDM symbols within a frame. After mapping, the frequency interleaving is used for frequency-domain diversity, especially to combat frequency-selective fading channels. Details of operations of the Frame Building block 1020 will be described later.

After inserting a preamble at the beginning of each frame, the OFDM Generation block 1030 can apply conventional OFDM modulation having a cyclic prefix as guard interval. For antenna space diversity, a distributed MISO scheme is applied across the transmitters. In addition, a Peak-to-Average Power Reduction (PAPR) scheme is performed in the time domain. For flexible network planning, this proposal provides a set of various FFT sizes, guard interval lengths and corresponding pilot patterns. Details of operations of the OFDM Generation block 1030 will be described later.

The Signaling Generation block 1040 can create physical layer signaling information used for the operation of each functional block. This signaling information is also transmitted so that the services of interest are properly recovered at the receiver side. Details of operations of the Signaling Generation block 1040 will be described later.

Figure 2:
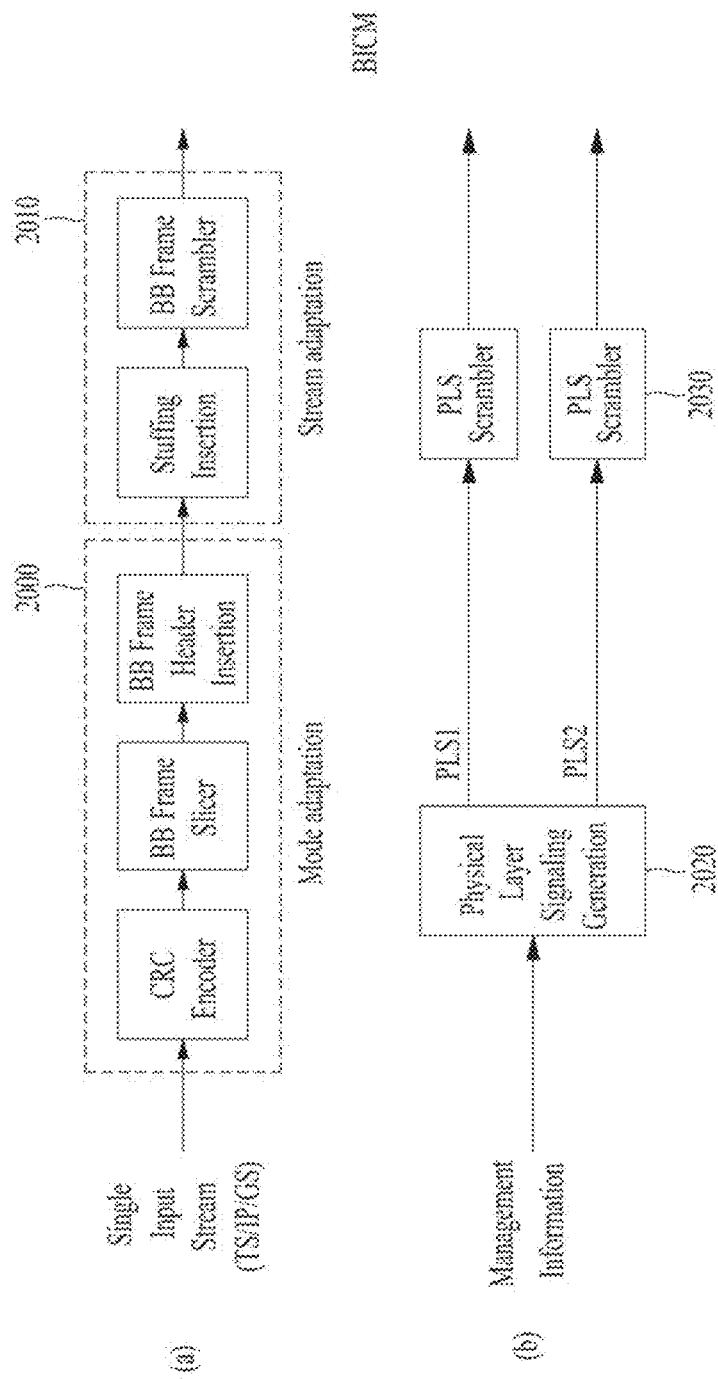
FIG. 2 illustrates an input formatting block according to one embodiment of the present invention.
Figure 3:
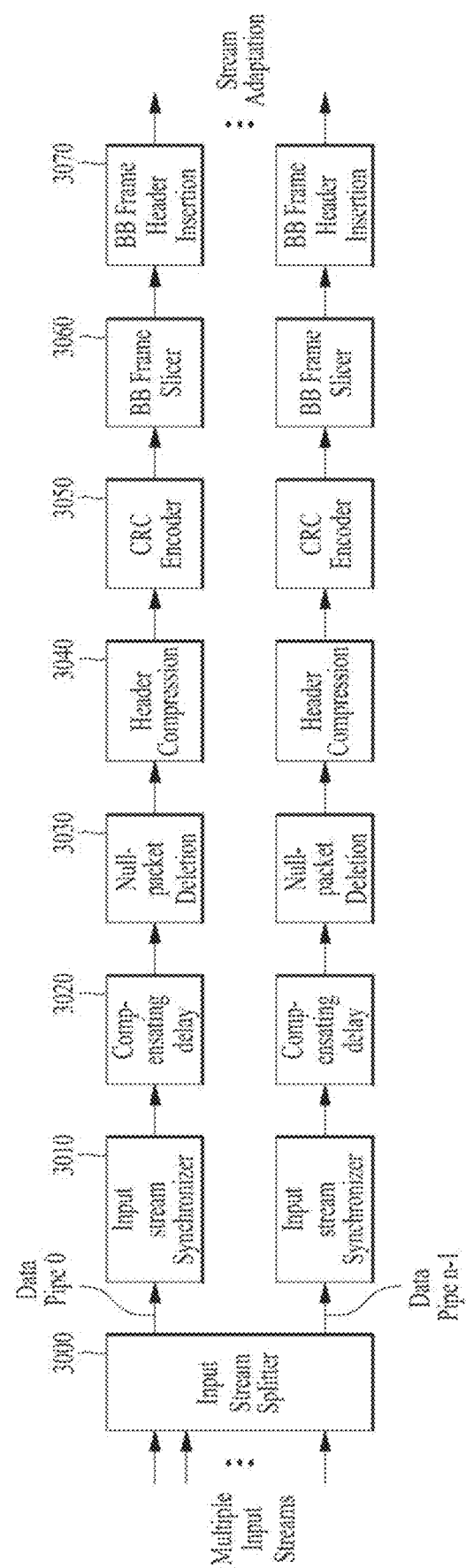
FIG. 3 illustrates an input formatting block according to another embodiment of the present invention.
Figure 4:
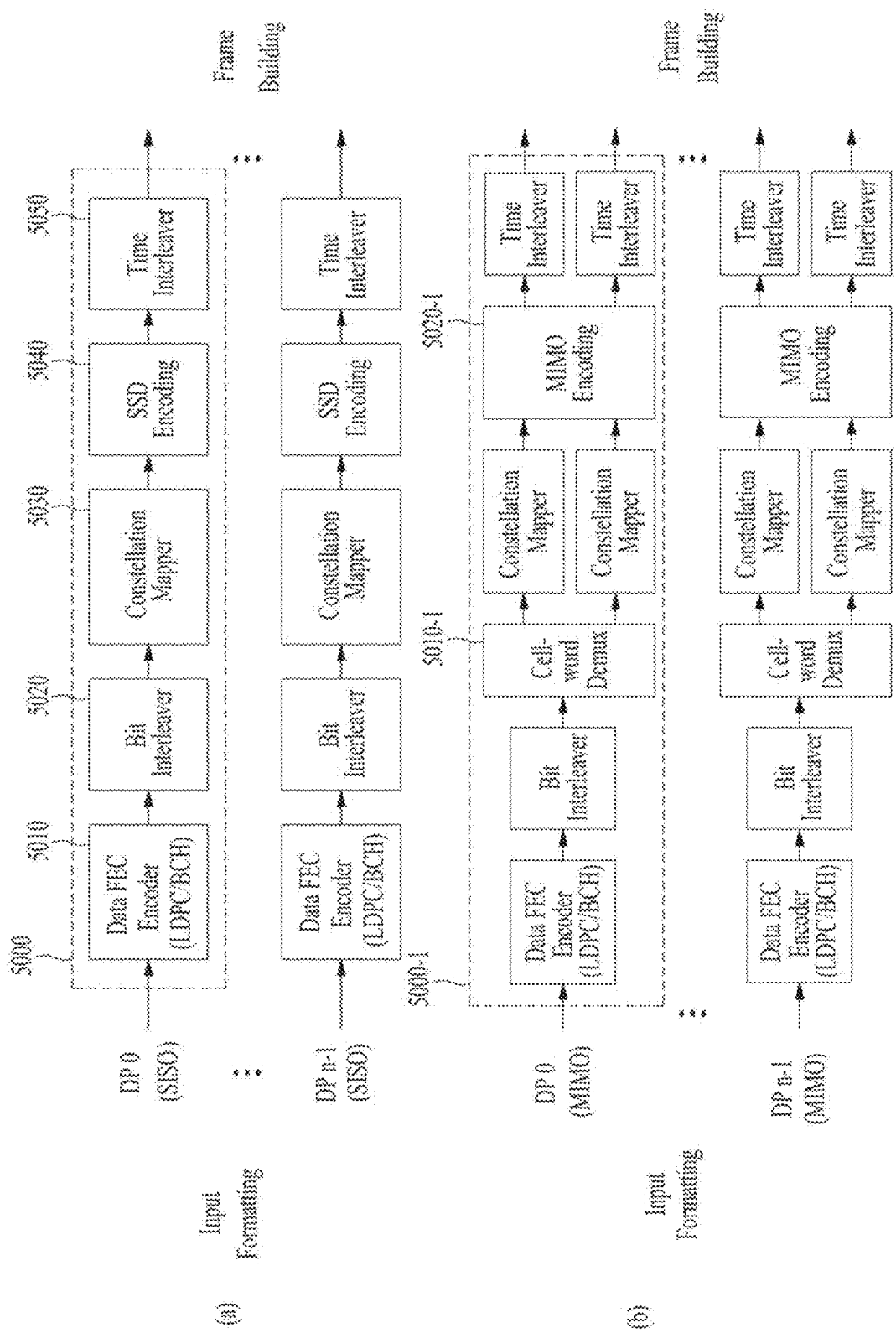
FIG. 4 illustrates a BICM block according to an embodiment of the present invention.

FIGS. 2, 3 and 4 illustrate the input formatting block 1000 according to embodiments of the present invention. A description will be given of each figure.

FIG. 2 illustrates an input formatting block according to one embodiment of the present invention. FIG. 2 shows an input formatting module when the input signal is a single input stream.

The input formatting block illustrated in FIG. 2 corresponds to an embodiment of the input formatting block 1000 described with reference to FIG. 1.

The input to the physical layer may be composed of one or multiple data streams. Each data stream is carried by one DP. The mode adaptation modules slice the incoming data stream into data fields of the baseband frame (BBF). The system supports three types of input data streams: MPEG2-TS, Internet protocol (IP) and Generic stream (GS). MPEG2-TS is characterized by fixed length (188 byte) packets with the first byte being a sync-byte (0x47). An IP stream is composed of variable length IP datagram packets, as signaled within IP packet headers. The system supports both IPv4 and IPv6 for the IP stream. GS may be composed of variable length packets or constant length packets, signaled within encapsulation packet headers.

(a) shows a mode adaptation block 2000 and a stream adaptation 2010 for signal DP and (b) shows a PLS generation block 2020 and a PLS scrambler 2030 for generating and processing PLS data. A description will be given of the operation of each block.

The Input Stream Splitter splits the input TS, IP, GS streams into multiple service or service component (audio, video, etc.) streams. The mode adaptation module 2010 is comprised of a CRC Encoder, BB (baseband) Frame Slicer, and BB Frame Header Insertion block.

The CRC Encoder provides three kinds of CRC encoding for error detection at the user packet (UP) level, i.e., CRC-8, CRC-16, and CRC-32. The computed CRC bytes are appended after the UP. CRC-8 is used for TS stream and CRC-32 for IP stream. If the GS stream doesn't provide the CRC encoding, the proposed CRC encoding should be applied.

BB Frame Slicer maps the input into an internal logical-bit format. The first received bit is defined to be the MSB. The BB Frame Slicer allocates a number of input bits equal to the available data field capacity. To allocate a number of input bits equal to the BBF payload, the UP packet stream is sliced to fit the data field of BBF.

BB Frame Header Insertion block can insert fixed length BBF header of 2 bytes is inserted in front of the BB Frame. The BBF header is composed of STUFFI (1 bit), SYNCD (13 bits), and RFU (2 bits). In addition to the fixed 2-Byte BBF header, BBF can have an extension field (1 or 3 bytes) at the end of the 2-byte BBF header.

The stream adaptation 2010 is comprised of stuffing insertion block and BB scrambler. The stuffing insertion block can insert stuffing field into a payload of a BB frame. If the input data to the stream adaptation is sufficient to fill a BB-Frame, STUFFI is set to '0' and the BBF has no stuffing field. Otherwise STUFFI is set to '1' and the stuffing field is inserted immediately after the BBF header. The stuffing field comprises two bytes of the stuffing field header and a variable size of stuffing data.

The BB scrambler scrambles complete BBF for energy dispersal. The scrambling sequence is synchronous with the BBF. The scrambling sequence is generated by the feedback shift register.

The PLS generation block 2020 can generate physical layer signaling (PLS) data. The PLS provides the receiver with a means to access physical layer DPs. The PLS data consists of PLS1 data and PLS2 data.

The PLS1 data is a first set of PLS data carried in the FSS symbols in the frame having a fixed size, coding and modulation, which carries basic information about the system as well as the parameters needed to decode the PLS2 data. The PLS1 data provides basic transmission parameters including parameters required to enable the reception and decoding of the PLS2 data. Also, the PLS1 data remains constant for the duration of a frame-group.

The PLS2 data is a second set of PLS data transmitted in the FSS symbol, which carries more detailed PLS data about the system and the DPs. The PLS2 contains parameters that provide sufficient information for the receiver to decode the desired DP. The PLS2 signaling further consists of two types of parameters, PLS2 Static data (PLS2-STAT data) and PLS2 dynamic data (PLS2-DYN data). The PLS2 Static data is PLS2 data that remains static for the duration of a frame-group and the PLS2 dynamic data is PLS2 data that may dynamically change frame-by-frame.

Details of the PLS data will be described later.

The PLS scrambler 2030 can scramble the generated PLS data for energy dispersal.

The above-described blocks may be omitted or replaced by blocks having similar or identical functions.

FIG. 3 illustrates an input formatting block according to another embodiment of the present invention.

The input formatting block illustrated in FIG. 3 corresponds to an embodiment of the input formatting block 1000 described with reference to FIG. 1.

FIG. 3 shows a mode adaptation block of the input formatting block when the input signal corresponds to multiple input streams.

The mode adaptation block of the input formatting block for processing the multiple input streams can independently process the multiple input streams.

Referring to FIG. 3, the mode adaptation block for respectively processing the multiple input streams can include an input stream splitter 3000, an input stream synchronizer 3010, a compensating delay block 3020, a null packet deletion block 3030, a head compression block 3040, a CRC encoder 3050, a BB frame slicer 3060 and a BB header insertion block 3070. Description will be given of each block of the mode adaptation block.

Operations of the CRC encoder 3050, BB frame slicer 3060 and BB header insertion block 3070 correspond to those of the CRC encoder, BB frame slicer and BB header insertion block described with reference to FIG. 2 and thus description thereof is omitted.

The input stream splitter 3000 can split the input TS, IP, GS streams into multiple service or service component (audio, video, etc.) streams.

The input stream synchronizer 3010 may be referred as ISSY. The ISSY can provide suitable means to guarantee Constant Bit Rate (CBR) and constant end-to-end transmission delay for any input data format. The ISSY is always used for the case of multiple DPs carrying TS, and optionally used for multiple DPs carrying GS streams.

The compensating delay block 3020 can delay the split TS packet stream following the insertion of ISSY information to allow a TS packet recombining mechanism without requiring additional memory in the receiver.

The null packet deletion block 3030, is used only for the TS input stream case. Some TS input streams or split TS streams may have a large number of null-packets present in order to accommodate VBR (variable bit-rate) services in a CBR TS stream. In this case, in order to avoid unnecessary transmission overhead, null-packets can be identified and not transmitted. In the receiver, removed null-packets can be re-inserted in the exact place where they were originally by reference to a deleted null-packet (DNP) counter that is inserted in the transmission, thus guaranteeing constant bit-rate and avoiding the need for time-stamp (PCR) updating.

The head compression block 3040 can provide packet header compression to increase transmission efficiency for TS or IP input streams. Because the receiver can have a priori information on certain parts of the header, this known information can be deleted in the transmitter.

For Transport Stream, the receiver has a-priori information about the sync-byte configuration (0x47) and the packet length (188 Byte). If the input TS stream carries content that has only one PID, i.e., for only one service component (video, audio, etc.) or service sub-component (SVC base layer, SVC enhancement layer, MVC base view or MVC dependent views), TS packet header compression can be applied (optionally) to the Transport Stream. IP packet header compression is used optionally if the input steam is an IP stream. The above-described blocks may be omitted or replaced by blocks having similar or identical functions.

FIG. 4 illustrates a BICM block according to an embodiment of the present invention.

The BICM block illustrated in FIG. 4 corresponds to an embodiment of the BICM block 1010 described with reference to FIG. 1.

As described above, the apparatus for transmitting broadcast signals for future broadcast services according to an embodiment of the present invention can provide a terrestrial broadcast service, mobile broadcast service, UHDTV service, etc.

Since QoS (quality of service) depends on characteristics of a service provided by the apparatus for transmitting broadcast signals for future broadcast services according to an embodiment of the present invention, data corresponding to respective services needs to be processed through different schemes. Accordingly, the a BICM block according to an embodiment of the present invention can independently process DPs input thereto by independently applying SISO, MISO and MIMO schemes to the data pipes respectively corresponding to data paths. Consequently, the apparatus for transmitting broadcast signals for future broadcast services according to an embodiment of the present invention can control QoS for each service or service component transmitted through each DP.

(a) shows the BICM block shared by the base profile and the handheld profile and (b) shows the BICM block of the advanced profile.

The BICM block shared by the base profile and the handheld profile and the BICM block of the advanced profile can include plural processing blocks for processing each DP.

A description will be given of each processing block of the BICM block for the base profile and the handheld profile and the BICM block for the advanced profile.

A processing block 5000 of the BICM block for the base profile and the handheld profile can include a Data FEC encoder 5010, a bit interleaver 5020, a constellation mapper 5030, an SSD (Signal Space Diversity) encoding block 5040 and a time interleaver 5050.

The Data FEC encoder 5010 can perform the FEC encoding on the input BBF to generate FECBLOCK procedure using outer coding (BCH), and inner coding (LDPC). The outer coding (BCH) is optional coding method. Details of operations of the Data FEC encoder 5010 will be described later.

The bit interleaver 5020 can interleave outputs of the Data FEC encoder 5010 to achieve optimized performance with combination of the LDPC codes and modulation scheme while providing an efficiently implementable structure. Details of operations of the bit interleaver 5020 will be described later.

The constellation mapper 5030 can modulate each cell word from the bit interleaver 5020 in the base and the handheld profiles, or cell word from the Cell-word demultiplexer 5010-1 in the advanced profile using either QPSK, QAM-16, non-uniform QAM (NUQ-64, NUQ-256, NUQ-1024) or non-uniform constellation (NUC-16, NUC-64, NUC-256, NUC-1024) to give a power-normalized constellation point, el. This constellation mapping is applied only for DPs. Observe that QAM-16 and NUQs are square shaped, while NUCs have arbitrary shape. When each constellation is rotated by any multiple of 90 degrees, the rotated constellation exactly overlaps with its original one. This "rotation-sense" symmetric property makes the capacities and the average powers of the real and imaginary components equal to each other. Both NUQs and NUCs are defined specifically for each code rate and the particular one used is signaled by the parameter DP_MOD filed in PLS2 data.

The time interleaver 5050 can operates at the DP level. The parameters of time interleaving (TI) may be set differently for each DP. Details of operations of the time interleaver 5050 will be described later.

A processing block 5000-1 of the BICM block for the advanced profile can include the Data FEC encoder, bit interleaver, constellation mapper, and time interleaver.

However, the processing block 5000-1 is distinguished from the processing block 5000 further includes a cell-word demultiplexer 5010-1 and a MIMO encoding block 5020-1.

Also, the operations of the Data FEC encoder, bit interleaver, constellation mapper, and time interleaver in the processing block 5000-1 correspond to those of the Data FEC encoder 5010, bit interleaver 5020, constellation mapper 5030, and time interleaver 5050 described and thus description thereof is omitted.

The cell-word demultiplexer 5010-1 is used for the DP of the advanced profile to divide the single cell-word stream into dual cell-word streams for MIMO processing. Details of operations of the cell-word demultiplexer 5010-1 will be described later.

The MIMO encoding block 5020-1 can processing the output of the cell-word demultiplexer 5010-1 using MIMO encoding scheme. The MIMO encoding scheme was optimized for broadcasting signal transmission. The MIMO technology is a promising way to get a capacity increase but it depends on channel characteristics. Especially for broadcasting, the strong LOS component of the channel or a difference in the received signal power between two antennas caused by different signal propagation characteristics makes it difficult to get capacity gain from MIMO. The proposed MIMO encoding scheme overcomes this problem using a rotation-based pre-coding and phase randomization of one of the MIMO output signals.

MIMO encoding is intended for a 2×2 MIMO system requiring at least two antennas at both the transmitter and the receiver. Two MIMO encoding modes are defined in this proposal; full-rate spatial multiplexing (FR-SM) and full-rate full-diversity spatial multiplexing (FRFD-SM). The FR-SM encoding provides capacity increase with relatively small complexity increase at the receiver side while the FRFD-SM encoding provides capacity increase and additional diversity gain with a great complexity increase at the receiver side. The proposed MIMO encoding scheme has no restriction on the antenna polarity configuration.

MIMO processing is required for the advanced profile frame, which means all DPs in the advanced profile frame are processed by the MIMO encoder. MIMO processing is applied at DP level. Pairs of the Constellation Mapper outputs NUQ (e1,i and e2,i) are fed to the input of the MIMO Encoder. Paired MIMO Encoder output (g1,i and g2,i) is transmitted by the same carrier k and OFDM symbol 1 of their respective TX antennas.

The above-described blocks may be omitted or replaced by blocks having similar or identical functions.

Figure 5:
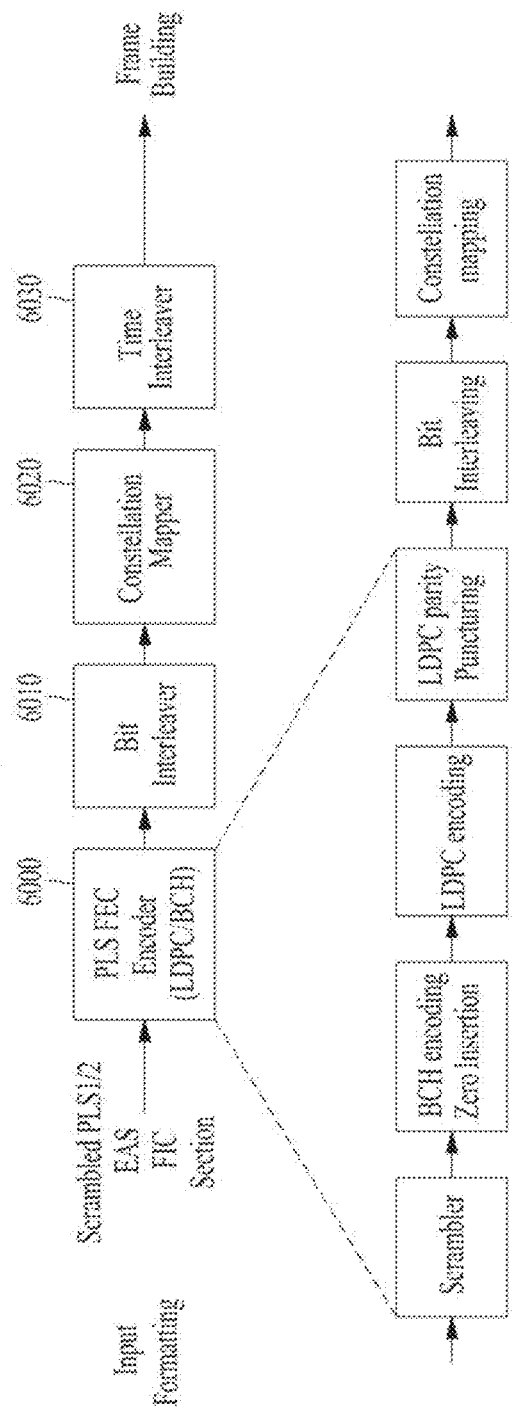
FIG. 5 illustrates a BICM block according to another embodiment of the present invention.

FIG. 5 illustrates a BICM block according to another embodiment of the present invention.

The BICM block illustrated in FIG. 6 corresponds to an embodiment of the BICM block 1010 described with reference to FIG. 1.

FIG. 5 illustrates a BICM block for protection of physical layer signaling (PLS), emergency alert channel (EAC) and fast information channel (FIC). EAC is a part of a frame that carries EAS information data and FIC is a logical channel in a frame that carries the mapping information between a service and the corresponding base DP. Details of the EAC and FIC will be described later.

Figure 6:
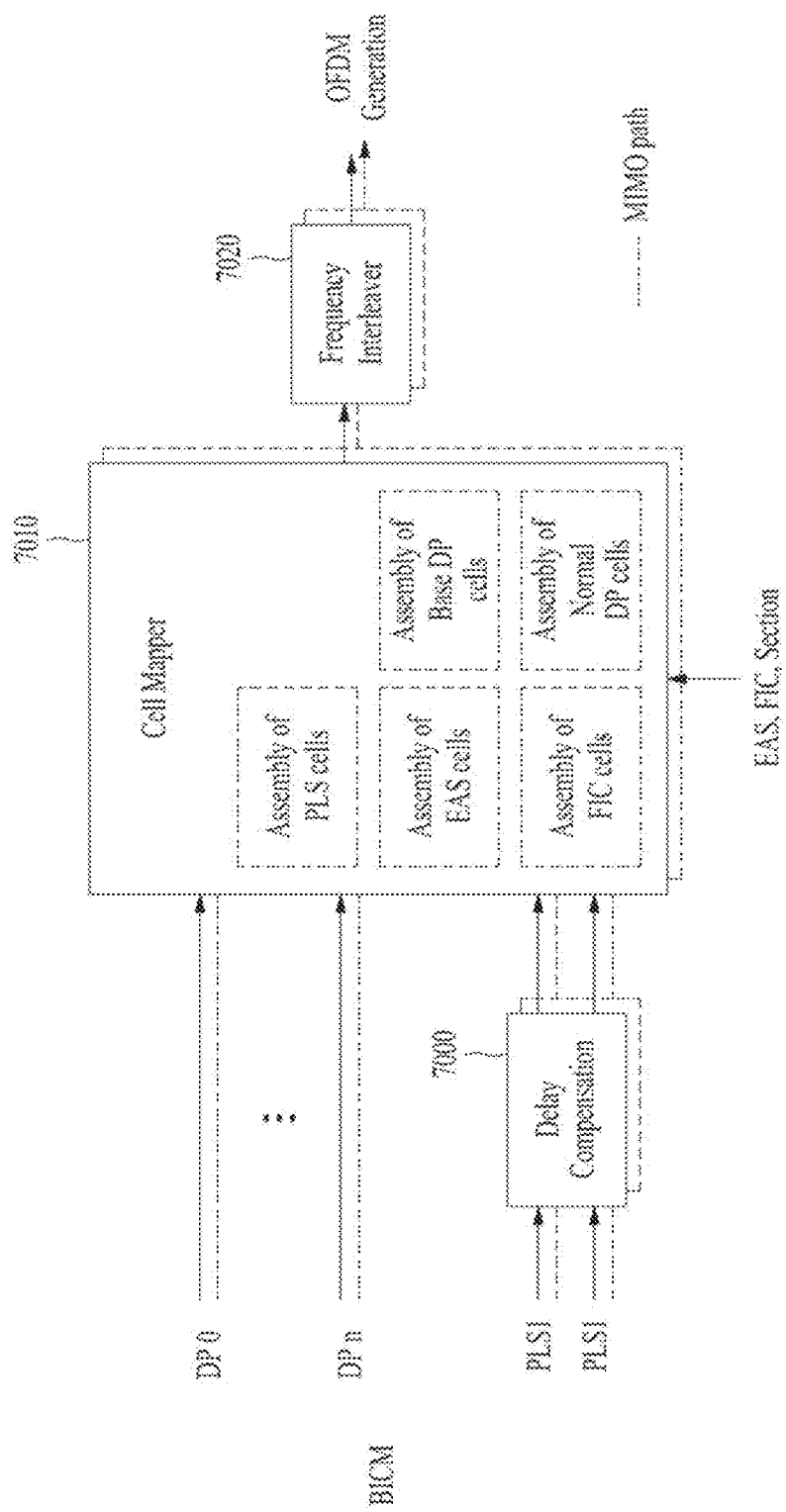
FIG. 6 illustrates a frame building block according to one embodiment of the present invention.

Referring to FIG. 6, the BICM block for protection of PLS, EAC and FIC can include a PLS FEC encoder 6000, a bit interleaver 6010 and a constellation mapper 6020.

Also, the PLS FEC encoder 6000 can include a scrambler, BCH encoding/zero insertion block, LDPC encoding block and LDPC parity puncturing block. Description will be given of each block of the BICM block.

The PLS FEC encoder 6000 can encode the scrambled PLS 1/2 data, EAC and FIC section.

The scrambler can scramble PLS1 data and PLS2 data before BCH encoding and shortened and punctured LDPC encoding.

The BCH encoding/zero insertion block can perform outer encoding on the scrambled PLS 1/2 data using the shortened BCH code for PLS protection and insert zero bits after the BCH encoding. For PLS1 data only, the output bits of the zero insertion may be permitted before LDPC encoding.

The LDPC encoding block can encode the output of the BCH encoding/zero insertion block using LDPC code. To generate a complete coded block, Cldpc, parity bits, Pldpc are encoded systematically from each zero-inserted PLS information block, Ildpc and appended after it.

$$C_{ldpc} = [I_{ldpc} P_{ldpc}] = [i_0, i_1, \ldots, i_{K_{ldpc}-1}, p_0, p_1, \ldots, p_{N_{ldpc}-K_{ldpc}-1}]$$ [Equation 1]

The LDPC code parameters for PLS1 and PLS2 are as following table 4.

TABLE 4

| Signaling Type | Ksig | Kbch | Nbch_parity | Kldpc (=Nbch) | Nldpc | Nldpc_parity | code rate | Qldpc |
|---|---|---|---|---|---|---|---|---|
| PLS1 | 342 | 1020 | 60 | 1080 | 4320 | 3240 | 1/4 | 36 |
| PLS2 | <1021 | | | | | | | |
| | >1020 | 2100 | | 2160 | 7200 | 5040 | 3/10 | 56 |

The LDPC parity puncturing block can perform puncturing on the PLS1 data and PLS 2 data.

When shortening is applied to the PLS1 data protection, some LDPC parity bits are punctured after LDPC encoding. Also, for the PLS2 data protection, the LDPC parity bits of PLS2 are punctured after LDPC encoding. These punctured bits are not transmitted.

The bit interleaver 6010 can interleave the each shortened and punctured PLS1 data and PLS2 data.

The constellation mapper 6020 can map the bit interleaved PLS1 data and PLS2 data onto constellations.

The above-described blocks may be omitted or replaced by blocks having similar or identical functions.

FIG. 6 illustrates a frame building block according to one embodiment of the present invention.

The frame building block illustrated in FIG. 6 corresponds to an embodiment of the frame building block 1020 described with reference to FIG. 1.

Referring to FIG. 6, the frame building block can include a delay compensation block 7000, a cell mapper 7010 and a frequency interleaver 7020. Description will be given of each block of the frame building block.

The delay compensation block 7000 can adjust the timing between the data pipes and the corresponding PLS data to ensure that they are co-timed at the transmitter end. The PLS data is delayed by the same amount as data pipes are by addressing the delays of data pipes caused by the Input Formatting block and BICM block. The delay of the BICM block is mainly due to the time interleaver 5050. In-band signaling data carries information of the next TI group so that they are carried one frame ahead of the DPs to be signaled. The Delay Compensating block delays in-band signaling data accordingly.

The cell mapper 7010 can map PLS, EAC, FIC, DPs, auxiliary streams and dummy cells into the active carriers of the OFDM symbols in the frame. The basic function of the cell mapper 7010 is to map data cells produced by the TIs for each of the DPs, PLS cells, and EAC/FIC cells, if any, into arrays of active OFDM cells corresponding to each of the OFDM symbols within a frame. Service signaling data (such as PSI (program specific information)/SI) can be separately gathered and sent by a data pipe. The Cell Mapper operates according to the dynamic information produced by the scheduler and the configuration of the frame structure. Details of the frame will be described later.

The frequency interleaver 7020 can randomly interleave data cells received from the cell mapper 7010 to provide frequency diversity. Also, the frequency interleaver 7020 can operate on very OFDM symbol pair comprised of two sequential OFDM symbols using a different interleaving-seed order to get maximum interleaving gain in a single frame.

The above-described blocks may be omitted or replaced by blocks having similar or identical functions.

Figure 7:
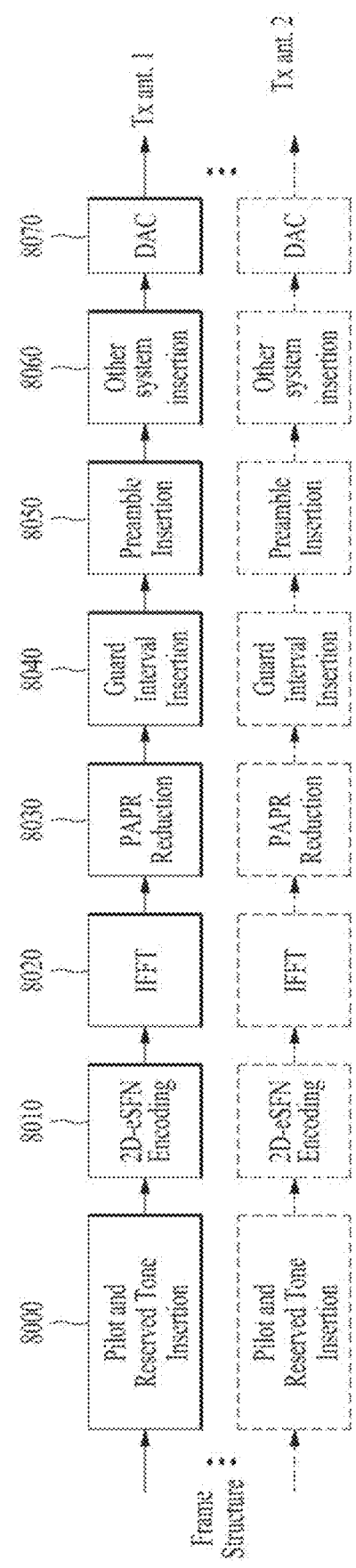
FIG. 7 illustrates an OFDM generation block according to an embodiment of the present invention.

FIG. 7 illustrates an OFDM generation block according to an embodiment of the present invention.

The OFDM generation block illustrated in FIG. 7 corresponds to an embodiment of the OFDM generation block 1030 described with reference to FIG. 1.

The OFDM generation block modulates the OFDM carriers by the cells produced by the Frame Building block, inserts the pilots, and produces the time domain signal for transmission. Also, this block subsequently inserts guard intervals, and applies PAPR (Peak-to-Average Power Radio) reduction processing to produce the final RF signal.

Referring to FIG. 7, the OFDM generation block can include a pilot and reserved tone insertion block 8000, a 2D-eSFN encoding block 8010, an IFFT (Inverse Fast Fourier Transform) block 8020, a PAPR reduction block 8030, a guard interval insertion block 8040, a preamble insertion block 8050, other system insertion block 8060 and a DAC block 8070.

The other system insertion block 8060 can multiplex signals of a plurality of broadcast transmission/reception systems in the time domain such that data of two or more different broadcast transmission/reception systems providing broadcast services can be simultaneously transmitted in the same RF signal bandwidth. In this case, the two or more different broadcast transmission/reception systems refer to systems providing different broadcast services. The different broadcast services may refer to a terrestrial broadcast service, mobile broadcast service, etc.

Figure 8:
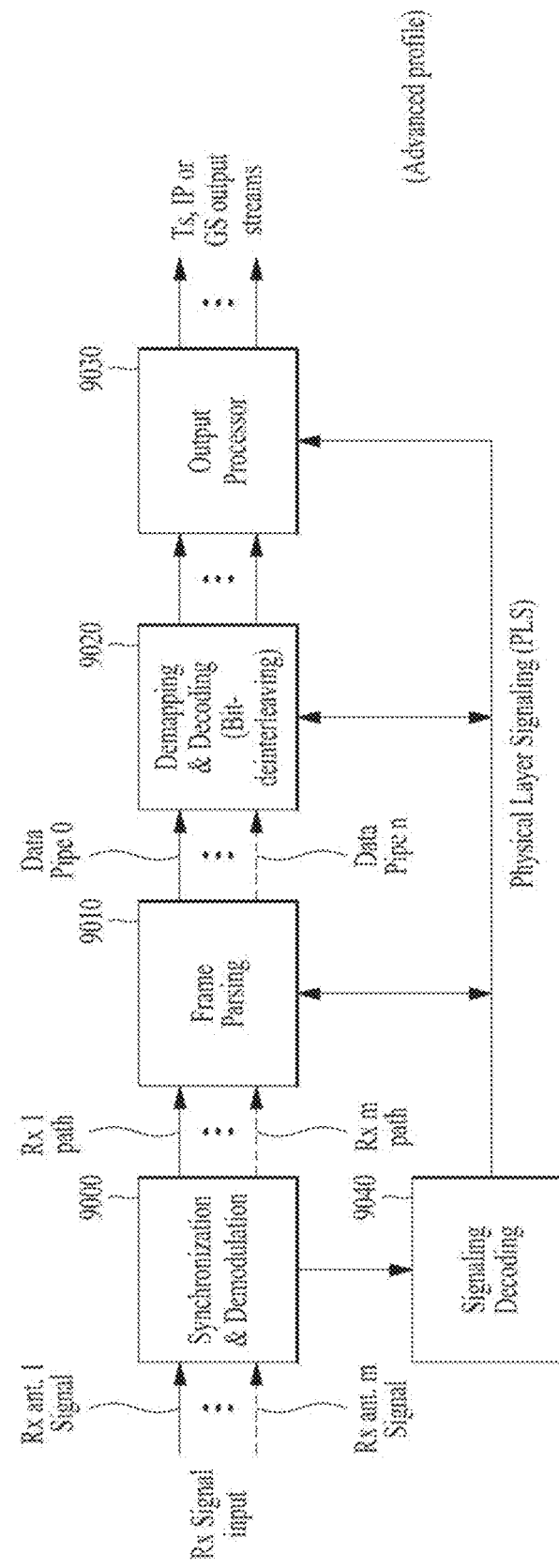
FIG. 8 illustrates a structure of an apparatus for receiving broadcast signals for future broadcast services according to an embodiment of the present invention.

FIG. 8 illustrates a structure of an apparatus for receiving broadcast signals for future broadcast services according to an embodiment of the present invention.

The apparatus for receiving broadcast signals for future broadcast services according to an embodiment of the present invention can correspond to the apparatus for transmitting broadcast signals for future broadcast services, described with reference to FIG. 1.

The apparatus for receiving broadcast signals for future broadcast services according to an embodiment of the present invention can include a synchronization & demodulation module 9000, a frame parsing module 9010, a demapping & decoding module 9020, an output processor 9030 and a signaling decoding module 9040. A description will be given of operation of each module of the apparatus for receiving broadcast signals.

The synchronization & demodulation module 9000 can receive input signals through m Rx antennas, perform signal detection and synchronization with respect to a system corresponding to the apparatus for receiving broadcast signals and carry out demodulation corresponding to a reverse procedure of the procedure performed by the apparatus for transmitting broadcast signals.

The frame parsing module 9010 can parse input signal frames and extract data through which a service selected by a user is transmitted. If the apparatus for transmitting broadcast signals performs interleaving, the frame parsing module 9010 can carry out deinterleaving corresponding to a reverse procedure of interleaving. In this case, the positions of a signal and data that need to be extracted can be obtained by decoding data output from the signaling decoding module 9040 to restore scheduling information generated by the apparatus for transmitting broadcast signals.

The demapping & decoding module 9020 can convert the input signals into bit domain data and then deinterleave the same as necessary. The demapping & decoding module 9020 can perform demapping for mapping applied for transmission efficiency and correct an error generated on a transmission channel through decoding. In this case, the demapping & decoding module 9020 can obtain transmission parameters necessary for demapping and decoding by decoding the data output from the signaling decoding module 9040.

The output processor 9030 can perform reverse procedures of various compression/signal processing procedures which are applied by the apparatus for transmitting broadcast signals to improve transmission efficiency. In this case, the output processor 9030 can acquire necessary control information from data output from the signaling decoding module 9040. The output of the output processor 8300 corresponds to a signal input to the apparatus for transmitting broadcast signals and may be MPEG-TSs, IP streams (v4 or v6) and generic streams.

The signaling decoding module 9040 can obtain PLS information from the signal demodulated by the synchronization & demodulation module 9000. As described above, the frame parsing module 9010, demapping & decoding module 9020 and output processor 9030 can execute functions thereof using the data output from the signaling decoding module 9040.

Figure 9:
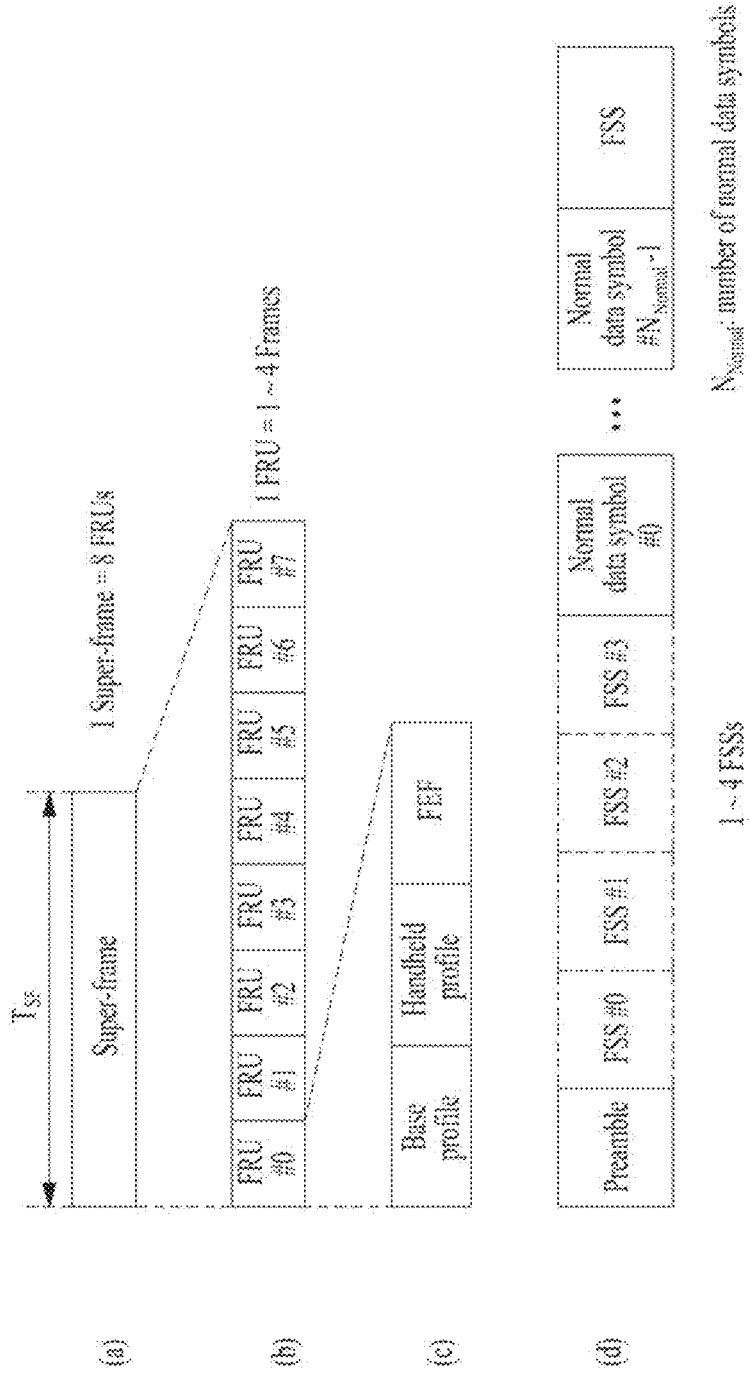
FIG. 9 illustrates a frame structure according to an embodiment of the present invention.

FIG. 9 illustrates a frame structure according to an embodiment of the present invention.

FIG. 9 shows an example configuration of the frame types and FRUs in a super-frame. (a) shows a super frame according to an embodiment of the present invention, (b) shows FRU (Frame Repetition Unit) according to an embodiment of the present invention, (c) shows frames of variable PHY profiles in the FRU and (d) shows a structure of a frame.

A super-frame may be composed of eight FRUs. The FRU is a basic multiplexing unit for TDM of the frames, and is repeated eight times in a super-frame.

Each frame in the FRU belongs to one of the PHY profiles, (base, handheld, advanced) or FEF. The maximum allowed number of the frames in the FRU is four and a given PHY profile can appear any number of times from zero times to four times in the FRU (e.g., base, base, handheld, advanced). PHY profile definitions can be extended using reserved values of the PHY_PROFILE in the preamble, if required.

The FEF part is inserted at the end of the FRU, if included. When the FEF is included in the FRU, the minimum number of FEFs is 8 in a super-frame. It is not recommended that FEF parts be adjacent to each other.

One frame is further divided into a number of OFDM symbols and a preamble. As shown in (d), the frame comprises a preamble, one or more frame signaling symbols (FSS), normal data symbols and a frame edge symbol (FES).

The preamble is a special symbol that enables fast Futurecast UTB system signal detection and provides a set of basic transmission parameters for efficient transmission and reception of the signal. The detailed description of the preamble will be will be described later.

The main purpose of the FSS(s) is to carry the PLS data. For fast synchronization and channel estimation, and hence fast decoding of PLS data, the FSS has more dense pilot pattern than the normal data symbol. The FES has exactly the same pilots as the FSS, which enables frequency-only interpolation within the FES and temporal interpolation, without extrapolation, for symbols immediately preceding the FES.

FIG. 10 illustrates a signaling hierarchy structure of the frame according to an embodiment of the present invention.

FIG. 10 illustrates the signaling hierarchy structure, which is split into three main parts: the preamble signaling data 11000, the PLS1 data 11010 and the PLS2 data 11020. The purpose of the preamble, which is carried by the preamble symbol in every frame, is to indicate the transmission type and basic transmission parameters of that frame. The PLS1 enables the receiver to access and decode the PLS2 data, which contains the parameters to access the DP of interest. The PLS2 is carried in every frame and split into two main parts: PLS2-STAT data and PLS2-DYN data. The static and dynamic portion of PLS2 data is followed by padding, if necessary.

FIG. 11 illustrates preamble signaling data according to an embodiment of the present invention.

Preamble signaling data carries 21 bits of information that are needed to enable the receiver to access PLS data and trace DPs within the frame structure. Details of the preamble signaling data are as follows:

PHY_PROFILE: This 3-bit field indicates the PHY profile type of the current frame. The mapping of different PHY profile types is given in below table 5.

TABLE 5

| Value | PHY profile |
|---|---|
| 000 | Base profile |
| 001 | Handheld profile |
| 010 | Advanced profiled |
| 011~110 | Reserved |
| 111 | FEF |

FFT_SIZE: This 2 bit field indicates the FFT size of the current frame within a frame-group, as described in below table 6.

TABLE 6

| Value | FFT size |
|---|---|
| 00 | 8K FFT |
| 01 | 16K FFT |
| 10 | 32K FFT |
| 11 | Reserved |

GI_FRACTION: This 3 bit field indicates the guard interval fraction value in the current super-frame, as described in below table 7.

TABLE 7

| Value | GI_FRACTION |
|---|---|
| 000 | 1/5 |
| 001 | 1/10 |
| 010 | 1/20 |
| 011 | 1/40 |
| 100 | 1/80 |
| 101 | 1/160 |
| 110~111 | Reserved |

EAC_FLAG: This 1 bit field indicates whether the EAC is provided in the current frame. If this field is set to '1', emergency alert service (EAS) is provided in the current frame. If this field set to '0', EAS is not carried in the current frame. This field can be switched dynamically within a super-frame.

PILOT_MODE: This 1-bit field indicates whether the pilot mode is mobile mode or fixed mode for the current frame in the current frame-group. If this field is set to '0', mobile pilot mode is used. If the field is set to '1', the fixed pilot mode is used.

PAPR_FLAG: This 1-bit field indicates whether PAPR reduction is used for the current frame in the current frame-group. If this field is set to value '1', tone reservation is used for PAPR reduction. If this field is set to '0', PAPR reduction is not used.

FRU_CONFIGURE: This 3-bit field indicates the PHY profile type configurations of the frame repetition units (FRU) that are present in the current super-frame. All profile types conveyed in the current super-frame are identified in this field in all preambles in the current super-frame. The 3-bit field has a different definition for each profile, as show in below table 8.

TABLE 8

|  | Current PHY_ PROFILE = '000' (base) | Current PHY_ PROFILE = '001' (handheld) | Current PHY_ PROFILE = '010' (advanced) | Current PHY_ PROFILE = '111' (FEF) |
|---|---|---|---|---|
| FRU_CONFIGURE = 000 | Only base profile present | Only handheld profile present | Only advanced profile present | Only FEF present |
| FRU_CONFIGURE = 1XX | Handheld profile present | Base profile present | Base profile present | Base profile present |
| FRU_CONFIGURE = X1X | Advanced profile present | Advanced profile present | Handheld profile present | Handheld profile present |
| FRU_CONFIGURE = XX1 | FEF present | FEF present | FEF present | Advanced profile present |

RESERVED: This 7-bit field is reserved for future use.

FIG. 12 illustrates PLS1 data according to an embodiment of the present invention.

PLS1 data provides basic transmission parameters including parameters required to enable the reception and decoding of the PLS2. As above mentioned, the PLS1 data remain unchanged for the entire duration of one frame-group. The detailed definition of the signaling fields of the PLS1 data are as follows:

PREAMBLE_DATA: This 20-bit field is a copy of the preamble signaling data excluding the EAC_FLAG.

NUM_FRAME_FRU: This 2-bit field indicates the number of the frames per FRU.

PAYLOAD_TYPE: This 3-bit field indicates the format of the payload data carried in the frame-group. PAYLOAD_TYPE is signaled as shown in table 9.

TABLE 9

| value | Payload type |
|---|---|
| 1XX | TS stream is transmitted |
| X1X | IP stream is transmitted |
| XX1 | GS stream is transmitted |

NUM_FSS: This 2-bit field indicates the number of FSS symbols in the current frame.

SYSTEM_VERSION: This 8-bit field indicates the version of the transmitted signal format. The SYSTEM_VERSION is divided into two 4-bit fields, which are a major version and a minor version.

Major version: The MSB four bits of SYSTEM_VERSION field indicate major version information. A change in the major version field indicates a non-backward-compatible change. The default value is '0000'. For the version described in this standard, the value is set to '0000'.

Minor version: The LSB four bits of SYSTEM_VERSION field indicate minor version information. A change in the minor version field is backward-compatible.

CELL_ID: This is a 16-bit field which uniquely identifies a geographic cell in an ATSC network. An ATSC cell coverage area may consist of one or more frequencies, depending on the number of frequencies used per Futurecast UTB system. If the value of the CELL_ID is not known or unspecified, this field is set to '0'.

NETWORK_ID: This is a 16-bit field which uniquely identifies the current ATSC network.

SYSTEM_ID: This 16-bit field uniquely identifies the Futurecast UTB system within the ATSC network. The Futurecast UTB system is the terrestrial broadcast system whose input is one or more input streams (TS, IP, GS) and whose output is an RF signal. The Futurecast UTB system carries one or more PHY profiles and FEF, if any. The same Futurecast UTB system may carry different input streams and use different RF frequencies in different geographical areas, allowing local service insertion. The frame structure and scheduling is controlled in one place and is identical for all transmissions within a Futurecast UTB system. One or more Futurecast UTB systems may have the same SYSTEM_ID meaning that they all have the same physical layer structure and configuration.

The following loop consists of FRU_PHY_PROFILE, FRU_FRAME_LENGTH, FRU_GI_FRACTION, and RESERVED which are used to indicate the FRU configuration and the length of each frame type. The loop size is fixed so that four PHY profiles (including a FEF) are signaled within the FRU. If NUM_FRAME_FRU is less than 4, the unused fields are filled with zeros.

FRU_PHY_PROFILE: This 3-bit field indicates the PHY profile type of the (i+1)th (i is the loop index) frame of the associated FRU. This field uses the same signaling format as shown in the table 8.

FRU_FRAME_LENGTH: This 2-bit field indicates the length of the (i+1)th frame of the associated FRU. Using FRU_FRAME_LENGTH together with FRU_GI_FRACTION, the exact value of the frame duration can be obtained.

FRU_GI_FRACTION: This 3-bit field indicates the guard interval fraction value of the (i+1)th frame of the associated FRU. FRU_GI_FRACTION is signaled according to the table 7.

RESERVED: This 4-bit field is reserved for future use.

The following fields provide parameters for decoding the PLS2 data.

PLS2_FEC_TYPE: This 2-bit field indicates the FEC type used by the PLS2 protection. The FEC type is signaled according to table 10. The details of the LDPC codes will be described later.

TABLE 10

| Content | PLS2 FEC type |
|---|---|
| 00 | 4K-1/4 and 7K-3/10 LDPC codes |
| 01~11 | Reserved |

PLS2_MOD: This 3-bit field indicates the modulation type used by the PLS2. The modulation type is signaled according to table 11.

TABLE 11

| Value | PLS2_MODE |
|---|---|
| 000 | BPSK |
| 001 | QPSK |
| 010 | QAM-16 |
| 011 | NUQ-64 |
| 100~111 | Reserved |

PLS2_SIZE_CELL: This 15-bit field indicates Ctotal_partial block, the size (specified as the number of QAM cells) of the collection of full coded blocks for PLS2 that is carried in the current frame-group. This value is constant during the entire duration of the current frame-group.

PLS2_STAT_SIZE_BIT: This 14-bit field indicates the size, in bits, of the PLS2-STAT for the current frame-group. This value is constant during the entire duration of the current frame-group.

PLS2_DYN_SIZE_BIT: This 14-bit field indicates the size, in bits, of the PLS2-DYN for the current frame-group. This value is constant during the entire duration of the current frame-group.

PLS2_REP_FLAG: This 1-bit flag indicates whether the PLS2 repetition mode is used in the current frame-group. When this field is set to value '1', the PLS2 repetition mode is activated. When this field is set to value '0', the PLS2 repetition mode is deactivated.

PLS2_REP_SIZE_CELL: This 15-bit field indicates Ctotalpartial block, the size (specified as the number of QAM cells) of the collection of partial coded blocks for PLS2 carried in every frame of the current frame-group, when PLS2 repetition is used. If repetition is not used, the value of this field is equal to 0. This value is constant during the entire duration of the current frame-group.

PLS2_NEXT_FEC_TYPE: This 2-bit field indicates the FEC type used for PLS2 that is carried in every frame of the next frame-group. The FEC type is signaled according to the table 10.

PLS2_NEXT_MOD: This 3-bit field indicates the modulation type used for PLS2 that is carried in every frame of the next frame-group. The modulation type is signaled according to the table 11.

PLS2_NEXT_REP_FLAG: This 1-bit flag indicates whether the PLS2 repetition mode is used in the next frame-group. When this field is set to value '1', the PLS2 repetition mode is activated. When this field is set to value '0', the PLS2 repetition mode is deactivated.

PLS2_NEXT_REP_SIZE_CELL: This 15-bit field indicates Ctotal full block, The size (specified as the number of QAM cells) of the collection of full coded blocks for PLS2 that is carried in every frame of the next frame-group, when PLS2 repetition is used. If repetition is not used in the next frame-group, the value of this field is equal to 0. This value is constant during the entire duration of the current frame-group.

PLS2_NEXT_REP_STAT_SIZE_BIT: This 14-bit field indicates the size, in bits, of the PLS2-STAT for the next frame-group. This value is constant in the current frame-group.

PLS2_NEXT_REP_DYN_SIZE_BIT: This 14-bit field indicates the size, in bits, of the PLS2-DYN for the next frame-group. This value is constant in the current frame-group.

PLS2_AP_MODE: This 2-bit field indicates whether additional parity is provided for PLS2 in the current frame-group. This value is constant during the entire duration of the current frame-group. The below table 12 gives the values of this field. When this field is set to '00', additional parity is not used for the PLS2 in the current frame-group.

TABLE 12

| Value | PLS2-AP mode |
| --- | --- |
| 00 | AP is not provided |
| 01 | AP1 mode |
| 10~11 | Reserved |

PLS2_AP_SIZE_CELL: This 15-bit field indicates the size (specified as the number of QAM cells) of the additional parity bits of the PLS2. This value is constant during the entire duration of the current frame-group.

PLS2_NEXT_AP_MODE: This 2-bit field indicates whether additional parity is provided for PLS2 signaling in every frame of next frame-group. This value is constant during the entire duration of the current frame-group. The table 12 defines the values of this field PLS2_NEXT_AP_SIZE_CELL: This 15-bit field indicates the size (specified as the number of QAM cells) of the additional parity bits of the PLS2 in every frame of the next frame-group. This value is constant during the entire duration of the current frame-group.

RESERVED: This 32-bit field is reserved for future use.

CRC_32: A 32-bit error detection code, which is applied to the entire PLS1 signaling.

FIG. 13 illustrates PLS2 data according to an embodiment of the present invention.

FIG. 13 illustrates PLS2-STAT data of the PLS2 data. The PLS2-STAT data are the same within a frame-group, while the PLS2-DYN data provide information that is specific for the current frame.

The details of fields of the PLS2-STAT data are as follows:

FIC_FLAG: This 1-bit field indicates whether the FIC is used in the current frame-group. If this field is set to '1', the FIC is provided in the current frame. If this field set to '0', the FIC is not carried in the current frame. This value is constant during the entire duration of the current frame-group.

AUX_FLAG: This 1-bit field indicates whether the auxiliary stream(s) is used in the current frame-group. If this field is set to '1', the auxiliary stream is provided in the current frame. If this field set to '0', the auxiliary stream is not carried in the current frame. This value is constant during the entire duration of current frame-group.

NUM_DP: This 6-bit field indicates the number of DPs carried within the current frame. The value of this field ranges from 1 to 64, and the number of DPs is NUM_DP+1.

DP_ID: This 6-bit field identifies uniquely a DP within a PHY profile.

DP_TYPE: This 3-bit field indicates the type of the DP. This is signaled according to the below table 13.

TABLE 13

| Value | DP Type |
| --- | --- |
| 000 | DP Type 1 |
| 001 | DP Type 2 |
| 010~111 | reserved |

DP_GROUP_ID: This 8-bit field identifies the DP group with which the current DP is associated. This can be used by a receiver to access the DPs of the service components associated with a particular service, which will have the same DP_GROUP_ID.

BASE_DP_ID: This 6-bit field indicates the DP carrying service signaling data (such as PSI/SI) used in the Management layer. The DP indicated by BASE_DP_ID may be either a normal DP carrying the service signaling data along with the service data or a dedicated DP carrying only the service signaling data DP_FEC_TYPE: This 2-bit field indicates the FEC type used by the associated DP. The FEC type is signaled according to the below table 14.

TABLE 14

| Value | FEC_TYPE |
| --- | --- |
| 00 | 16K LDPC |
| 01 | 64K LDPC |
| 10~11 | Reserved |

DP_COD: This 4-bit field indicates the code rate used by the associated DP. The code rate is signaled according to the below table 15.

TABLE 15

| Value | Code rate |
| --- | --- |
| 0000 | 5/15 |
| 0001 | 6/15 |
| 0010 | 7/15 |
| 0011 | 8/15 |
| 0100 | 9/15 |
| 0101 | 10/15 |
| 0110 | 11/15 |
| 0111 | 12/15 |
| 1000 | 13/15 |
| 1001~1111 | Reserved |

DP_MOD: This 4-bit field indicates the modulation used by the associated DP. The modulation is signaled according to the below table 16.

TABLE 16

| Value | Modulation |
| --- | --- |
| 0000 | QPSK |
| 0001 | QAM-16 |
| 0010 | NUQ-64 |
| 0011 | NUQ-256 |
| 0100 | NUQ-1024 |
| 0101 | NUC-16 |
| 0110 | NUC-64 |
| 0111 | NUC-256 |
| 1000 | NUC-1024 |
| 1001~1111 | reserved |

DP_SSD_FLAG: This 1-bit field indicates whether the SSD mode is used in the associated DP. If this field is set to value '1', SSD is used. If this field is set to value '0', SSD is not used.

The following field appears only if PHY_PROFILE is equal to '010', which indicates the advanced profile:

DP_MIMO: This 3-bit field indicates which type of MIMO encoding process is applied to the associated DP. The type of MIMO encoding process is signaled according to the table 17.

TABLE 17

| Value | MIMO encoding |
| --- | --- |
| 000 | FR-SM |
| 001 | FRFD-SM |
| 010~111 | reserved |

DP_TI_TYPE: This 1-bit field indicates the type of time-interleaving. A value of '0' indicates that one TI group corresponds to one frame and contains one or more TI-blocks. A value of '1' indicates that one TI group is carried in more than one frame and contains only one TI-block.

DP_TI_LENGTH: The use of this 2-bit field (the allowed values are only 1, 2, 4, 8) is determined by the values set within the DP_TI_TYPE field as follows:

If the DP_TI_TYPE is set to the value '1', this field indicates PI, the number of the frames to which each TI group is mapped, and there is one TI-block per TI group (NTI=1). The allowed PI values with 2-bit field are defined in the below table 18.

If the DP_TI_TYPE is set to the value '0', this field indicates the number of TI-blocks NTI per TI group, and there is one TI group per frame (PI=1). The allowed PI values with 2-bit field are defined in the below table 18.

TABLE 18

| 2-bit field | PI | NTI |
| --- | --- | --- |
| 00 | 1 | 1 |
| 01 | 2 | 2 |
| 10 | 4 | 3 |
| 11 | 8 | 4 |

DP_FRAME_INTERVAL: This 2-bit field indicates the frame interval (IJUMP) within the frame-group for the associated DP and the allowed values are 1, 2, 4, 8 (the corresponding 2-bit field is '00', '01', '10', or '11', respectively). For DPs that do not appear every frame of the frame-group, the value of this field is equal to the interval between successive frames. For example, if a DP appears on the frames 1, 5, 9, 13, etc., this field is set to '4'. For DPs that appear in every frame, this field is set to '1'.

DP_TI_BYPASS: This 1-bit field determines the availability of time interleaver 5050. If time interleaving is not used for a DP, it is set to '1'. Whereas if time interleaving is used it is set to '0'.

DP_FIRST_FRAME_IDX: This 5-bit field indicates the index of the first frame of the super-frame in which the current DP occurs. The value of DP_FIRST_FRAME_IDX ranges from 0 to 31

DP_NUM_BLOCK_MAX: This 10-bit field indicates the maximum value of DP_NUM_BLOCKS for this DP. The value of this field has the same range as DP_NUM_BLOCKS.

DP_PAYLOAD_TYPE: This 2-bit field indicates the type of the payload data carried by the given DP. DP_PAYLOAD_TYPE is signaled according to the below table 19.

TABLE 19

| Value | Payload Type |
| --- | --- |
| 00 | TS. |
| 01 | IP |
| 10 | GS |
| 11 | reserved |

DP_INBAND_MODE: This 2-bit field indicates whether the current DP carries in-band signaling information. The in-band signaling type is signaled according to the below table 20.

TABLE 20

| Value | In-band mode |
| --- | --- |
| 00 | In-band signaling is not carried. |
| 01 | INBAND-PLS is carried only |
| 10 | INBAND-ISSY is carried only |
| 11 | INBAND-PLS and INBAND-ISSY are carried |

DP_PROTOCOL_TYPE: This 2-bit field indicates the protocol type of the payload carried by the given DP. It is signaled according to the below table 21 when input payload types are selected.

TABLE 21

| Value | If DP_PAYLOAD_TYPE Is TS | If DP_PAYLOAD_TYPE Is IP | If DP_PAYLOAD_TYPE Is GS |
|---|---|---|---|
| 00 | MPEG2-TS | IPv4 | (Note) |
| 01 | Reserved | IPv6 | Reserved |
| 10 | Reserved | Reserved | Reserved |
| 11 | Reserved | Reserved | Reserved |

DP_CRC_MODE: This 2-bit field indicates whether CRC encoding is used in the Input Formatting block. The CRC mode is signaled according to the below table 22.

TABLE 22

| Value | CRC mode |
|---|---|
| 00 | Not used |
| 01 | CRC-8 |
| 10 | CRC-16 |
| 11 | CRC-32 |

DNP_MODE: This 2-bit field indicates the null-packet deletion mode used by the associated DP when DP_PAYLOAD_TYPE is set to TS ('00'). DNP_MODE is signaled according to the below table 23. If DP_PAYLOAD_TYPE is not TS ('00'), DNP_MODE is set to the value '00'.

TABLE 23

| Value | Null-packet deletion mode |
|---|---|
| 00 | Not used |
| 01 | DNP-NORMAL |
| 10 | DNP-OFFSET |
| 11 | Reserved |

ISSY_MODE: This 2-bit field indicates the ISSY mode used by the associated DP when DP_PAYLOAD_TYPE is set to TS ('00'). The ISSY_MODE is signaled according to the below table 24 If DP_PAYLOAD_TYPE is not TS ('00'), ISSY_MODE is set to the value '00'.

TABLE 24

| Value | ISSY mode |
|---|---|
| 00 | Not used |
| 01 | ISSY-UP |
| 10 | ISSY-BBF |
| 11 | reserved |

HC_MODE_TS: This 2-bit field indicates the TS header compression mode used by the associated DP when DP_PAYLOAD_TYPE is set to TS ('00'). The HC_MODE_TS is signaled according to the below table 25.

TABLE 25

| Value | Header compression mode |
|---|---|
| 00 | HC_MODE_TS 1 |
| 01 | HC_MODE_TS 2 |

TABLE 25-continued

| Value | Header compression mode |
|---|---|
| 10 | HC_MODE_TS 3 |
| 11 | HC_MODE_TS 4 |

HC_MODE_IP: This 2-bit field indicates the IP header compression mode when DP_PAYLOAD_TYPE is set to IP ('01'). The HC_MODE_IP is signaled according to the below table 26.

TABLE 26

| Value | Header compression mode |
|---|---|
| 00 | No compression |
| 01 | HC_MODE_IP 1 |
| 10~11 | reserved |

PID: This 13-bit field indicates the PID number for TS header compression when DP_PAYLOAD_TYPE is set to TS ('00') and HC_MODE_TS is set to '01' or '10'.

RESERVED: This 8-bit field is reserved for future use.

The following field appears only if FIC_FLAG is equal to '1':

FIC_VERSION: This 8-bit field indicates the version number of the FIC.

FIC_LENGTH_BYTE: This 13-bit field indicates the length, in bytes, of the FIC.

RESERVED: This 8-bit field is reserved for future use.

The following field appears only if AUX_FLAG is equal to '1':

NUM_AUX: This 4-bit field indicates the number of auxiliary streams. Zero means no auxiliary streams are used.

AUX_CONFIG_RFU: This 8-bit field is reserved for future use.

AUX_STREAM_TYPE: This 4-bit is reserved for future use for indicating the type of the current auxiliary stream.

AUX_PRIVATE_CONFIG: This 28-bit field is reserved for future use for signaling auxiliary streams.

Figures 14, 15:
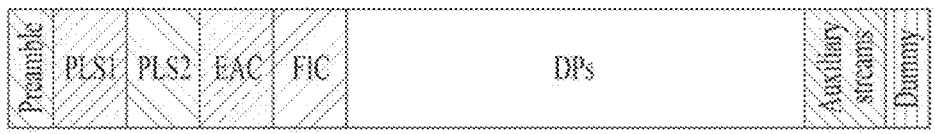
FIG. 14 illustrates PLS2 data according to another embodiment of the present invention.
FIG. 15 illustrates a logical structure of a frame according to an embodiment of the present invention.

FIG. 14 illustrates PLS2 data according to another embodiment of the present invention.

FIG. 14 illustrates PLS2-DYN data of the PLS2 data. The values of the PLS2-DYN data may change during the duration of one frame-group, while the size of fields remains constant.

The details of fields of the PLS2-DYN data are as follows:

FRAME_INDEX: This 5-bit field indicates the frame index of the current frame within the super-frame. The index of the first frame of the super-frame is set to '0'.

PLS_CHANGE_COUNTER: This 4-bit field indicates the number of super-frames ahead where the configuration will change. The next super-frame with changes in the configuration is indicated by the value signaled within this field. If this field is set to the value '0000', it means that no scheduled change is foreseen: e.g., value '1' indicates that there is a change in the next super-frame.

FIC_CHANGE_COUNTER: This 4-bit field indicates the number of super-frames ahead where the configuration (i.e., the contents of the FIC) will change. The next super-frame with changes in the configuration is indicated by the value signaled within this field. If this field is set to the value '0000', it means that no scheduled change is foreseen: e.g.

value '0001' indicates that there is a change in the next super-frame.

RESERVED: This 16-bit field is reserved for future use.

The following fields appear in the loop over NUM_DP, which describe the parameters associated with the DP carried in the current frame.

DP_ID: This 6-bit field indicates uniquely the DP within a PHY profile.

DP_START: This 15-bit (or 13-bit) field indicates the start position of the first of the DPs using the DPU addressing scheme. The DP_START field has differing length according to the PHY profile and FFT size as shown in the below table 27.

TABLE 27

| PHY profile | DP_START field size | |
|---|---|---|
| | 64K | 16K |
| Base | 13 bit | 15 bit |
| Handheld | — | 13 bit |
| Advanced | 13 bit | 15 bit |

DP_NUM_BLOCK: This 10-bit field indicates the number of FEC blocks in the current TI group for the current DP. The value of DP_NUM_BLOCK ranges from 0 to 1023

RESERVED: This 8-bit field is reserved for future use.

The following fields indicate the FIC parameters associated with the EAC.

EAC_FLAG: This 1-bit field indicates the existence of the EAC in the current frame. This bit is the same value as the EAC_FLAG in the preamble.

EAS_WAKE_UP_VERSION_NUM: This 8-bit field indicates the version number of a wake-up indication.

If the EAC_FLAG field is equal to '1', the following 12 bits are allocated for EAC_LENGTH_BYTE field. If the EAC_FLAG field is equal to '0', the following 12 bits are allocated for EAC_COUNTER.

EAC_LENGTH_BYTE: This 12-bit field indicates the length, in byte, of the EAC.

EAC_COUNTER: This 12-bit field indicates the number of the frames before the frame where the EAC arrives.

The following field appears only if the AUX_FLAG field is equal to '1':

AUX_PRIVATE_DYN: This 48-bit field is reserved for future use for signaling auxiliary streams. The meaning of this field depends on the value of AUX_STREAM_TYPE in the configurable PLS2-STAT.

CRC_32: A 32-bit error detection code, which is applied to the entire PLS2.

FIG. 15 illustrates a logical structure of a frame according to an embodiment of the present invention.

As above mentioned, the PLS, EAC, FIC, DPs, auxiliary streams and dummy cells are mapped into the active carriers of the OFDM symbols in the frame. The PLS1 and PLS2 are first mapped into one or more FSS(s). After that, EAC cells, if any, are mapped immediately following the PLS field, followed next by FIC cells, if any. The DPs are mapped next after the PLS or EAC, FIC, if any. Type 1 DPs follows first, and Type 2 DPs next. The details of a type of the DP will be described later. In some case, DPs may carry some special data for EAS or service signaling data. The auxiliary stream or streams, if any, follow the DPs, which in turn are followed by dummy cells. Mapping them all together in the above mentioned order, i.e. PLS, EAC, FIC, DPs, auxiliary streams and dummy data cells exactly fill the cell capacity in the frame.

Figure 16:
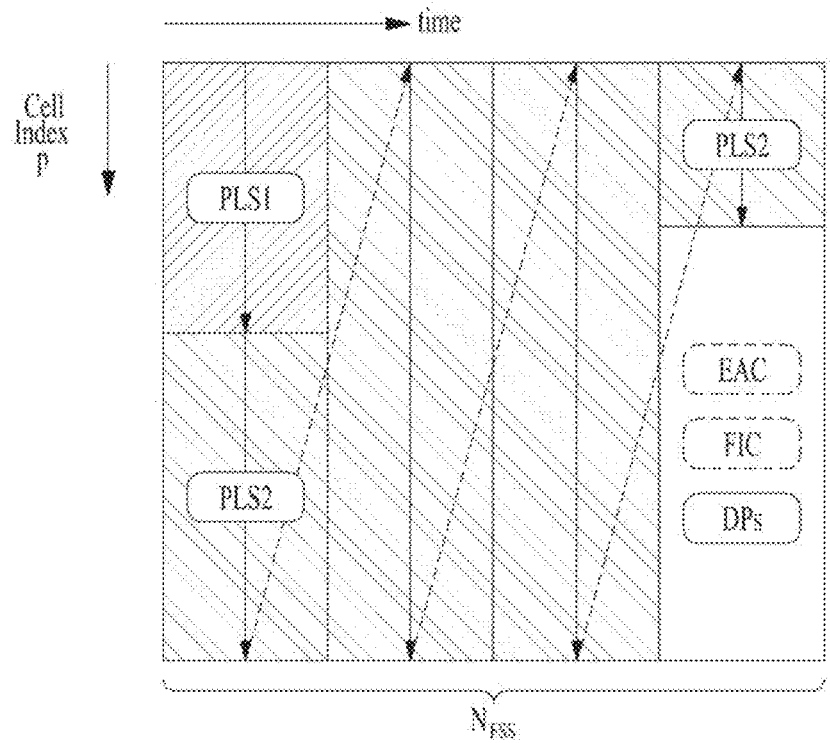
FIG. 16 illustrates PLS mapping according to an embodiment of the present invention.

FIG. 16 illustrates PLS mapping according to an embodiment of the present invention.

PLS cells are mapped to the active carriers of FSS(s). Depending on the number of cells occupied by PLS, one or more symbols are designated as FSS(s), and the number of FSS(s) NFSS is signaled by NUM_FSS in PLS1. The FSS is a special symbol for carrying PLS cells. Since robustness and latency are critical issues in the PLS, the FSS(s) has higher density of pilots allowing fast synchronization and frequency-only interpolation within the FSS.

PLS cells are mapped to active carriers of the NFSS FSS(s) in a top-down manner as shown in an example in FIG. 16. The PLS1 cells are mapped first from the first cell of the first FSS in an increasing order of the cell index. The PLS2 cells follow immediately after the last cell of the PLS1 and mapping continues downward until the last cell index of the first FSS. If the total number of required PLS cells exceeds the number of active carriers of one FSS, mapping proceeds to the next FSS and continues in exactly the same manner as the first FSS.

After PLS mapping is completed, DPs are carried next. If EAC, FIC or both are present in the current frame, they are placed between PLS and "normal" DPs.

Figure 17:
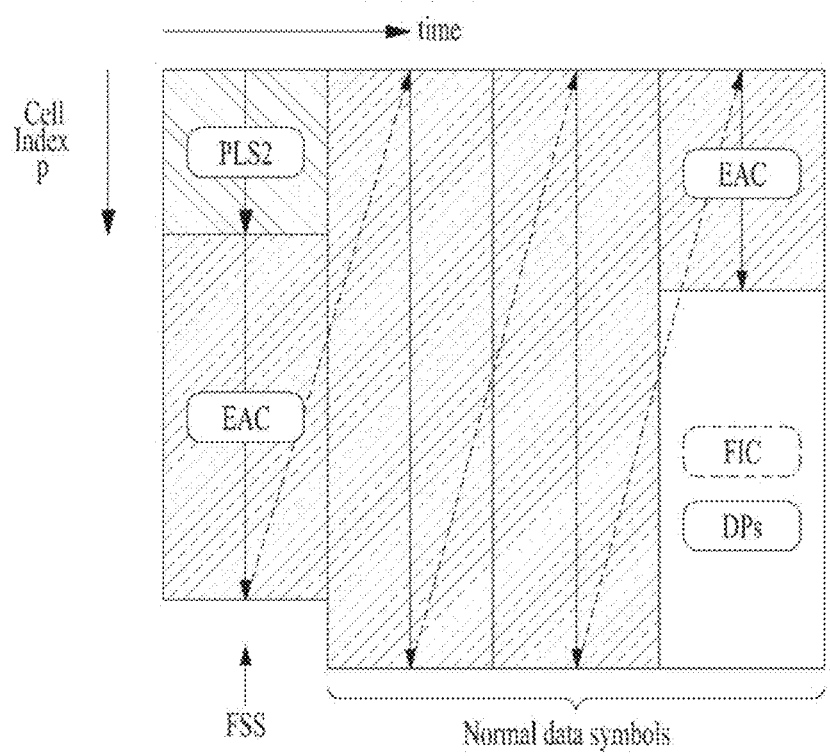
FIG. 17 illustrates EAC mapping according to an embodiment of the present invention.

FIG. 17 illustrates EAC mapping according to an embodiment of the present invention.

EAC is a dedicated channel for carrying EAS messages and links to the DPs for EAS. EAS support is provided but EAC itself may or may not be present in every frame. EAC, if any, is mapped immediately after the PLS2 cells. EAC is not preceded by any of the FIC, DPs, auxiliary streams or dummy cells other than the PLS cells. The procedure of mapping the EAC cells is exactly the same as that of the PLS.

The EAC cells are mapped from the next cell of the PLS2 in increasing order of the cell index as shown in the example in FIG. 17. Depending on the EAS message size, EAC cells may occupy a few symbols, as shown in FIG. 17.

EAC cells follow immediately after the last cell of the PLS2, and mapping continues downward until the last cell index of the last FSS. If the total number of required EAC cells exceeds the number of remaining active carriers of the last FSS mapping proceeds to the next symbol and continues in exactly the same manner as FSS(s). The next symbol for mapping in this case is the normal data symbol, which has more active carriers than a FSS.

After EAC mapping is completed, the FIC is carried next, if any exists. If FIC is not transmitted (as signaled in the PLS2 field), DPs follow immediately after the last cell of the EAC.

Figure 18:
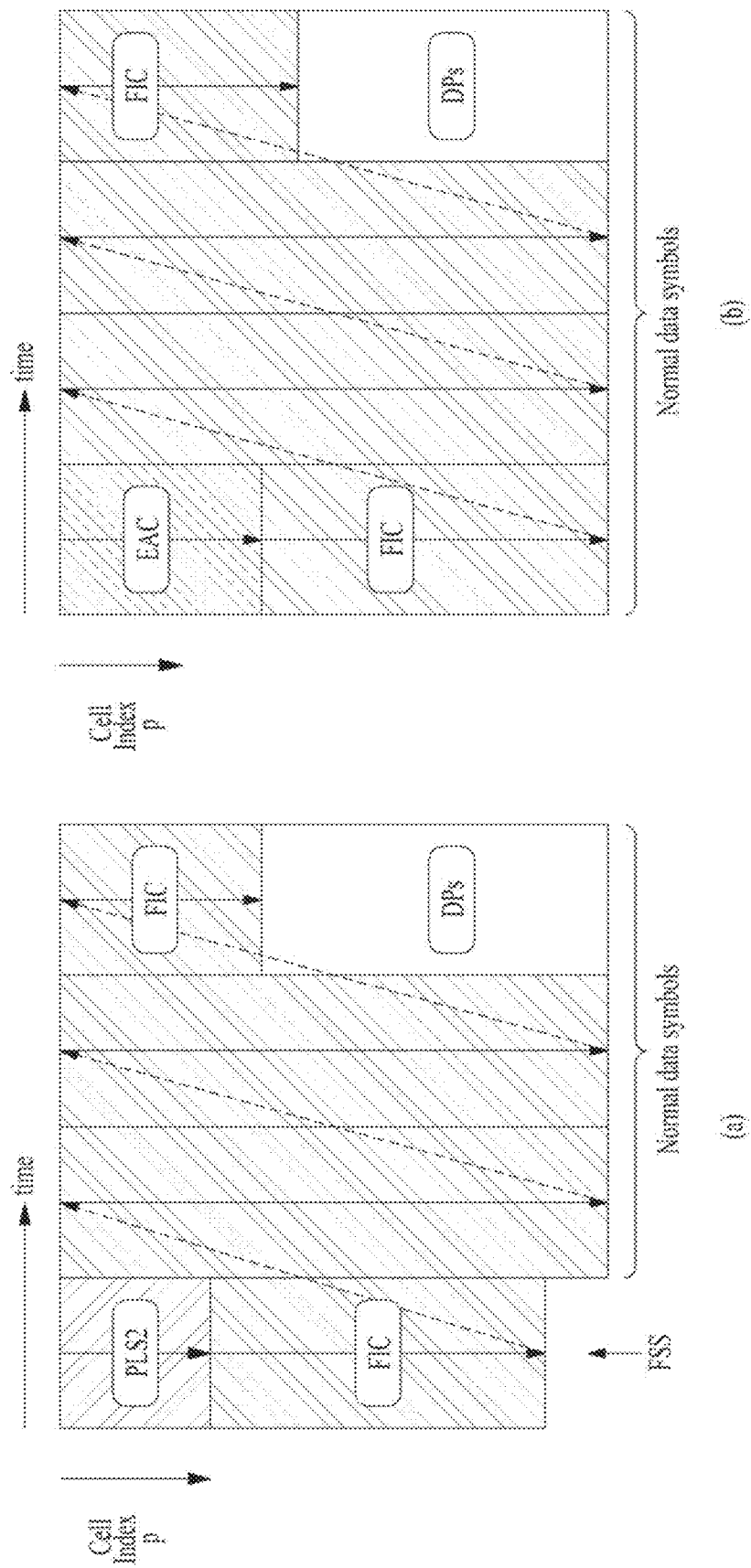
FIG. 18 illustrates FIC mapping according to an embodiment of the present invention.

FIG. 18 illustrates FIC mapping according to an embodiment of the present invention.

shows an example mapping of FIC cell without EAC and (b) shows an example mapping of FIC cell with EAC.

FIC is a dedicated channel for carrying cross-layer information to enable fast service acquisition and channel scanning. This information primarily includes channel binding information between DPs and the services of each broadcaster. For fast scan, a receiver can decode FIC and obtain information such as broadcaster ID, number of services, and BASE_DP_ID. For fast service acquisition, in addition to FIC, base DP can be decoded using BASE_DP_ID. Other than the content it carries, a base DP is encoded and mapped to a frame in exactly the same way as a normal DP. Therefore, no additional description is required for a base DP. The FIC data is generated and consumed in the Management Layer. The content of FIC data is as described in the Management Layer specification.

The FIC data is optional and the use of FIC is signaled by the FIC_FLAG parameter in the static part of the PLS2. If FIC is used, FIC_FLAG is set to '1' and the signaling field for FIC is defined in the static part of PLS2. Signaled in this field are FIC_VERSION, and FIC_LENGTH_BYTE. FIC uses the same modulation, coding and time interleaving parameters as PLS2. FIC shares the same signaling parameters such as PLS2_MOD and PLS2_FEC. FIC data, if any, is mapped immediately after PLS2 or EAC if any. FIC is not preceded by any normal DPs, auxiliary streams or dummy cells. The method of mapping FIC cells is exactly the same as that of EAC which is again the same as PLS.

Without EAC after PLS, FIC cells are mapped from the next cell of the PLS2 in an increasing order of the cell index as shown in an example in (a). Depending on the FIC data size, FIC cells may be mapped over a few symbols, as shown in (b).

FIC cells follow immediately after the last cell of the PLS2, and mapping continues downward until the last cell index of the last FSS. If the total number of required FIC cells exceeds the number of remaining active carriers of the last FSS, mapping proceeds to the next symbol and continues in exactly the same manner as FSS(s). The next symbol for mapping in this case is the normal data symbol which has more active carriers than a FSS.

If EAS messages are transmitted in the current frame, EAC precedes FIC, and FIC cells are mapped from the next cell of the EAC in an increasing order of the cell index as shown in (b).

After FIC mapping is completed, one or more DPs are mapped, followed by auxiliary streams, if any, and dummy cells.

Figure 19:
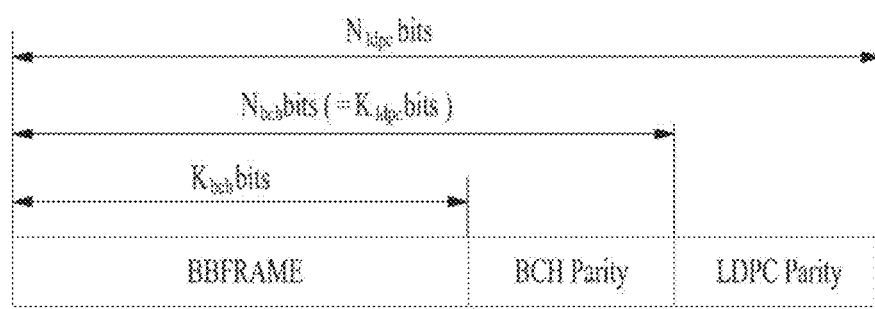
FIG. 19 illustrates an FEC structure according to an embodiment of the present invention.

FIG. 19 illustrates an FEC structure according to an embodiment of the present invention.

FIG. 19 illustrates an FEC structure according to an embodiment of the present invention before bit interleaving. As above mentioned, Data FEC encoder may perform the FEC encoding on the input BBF to generate FECBLOCK procedure using outer coding (BCH), and inner coding (LDPC). The illustrated FEC structure corresponds to the FECBLOCK. Also, the FECBLOCK and the FEC structure have same value corresponding to a length of LDPC codeword.

Figure 22:
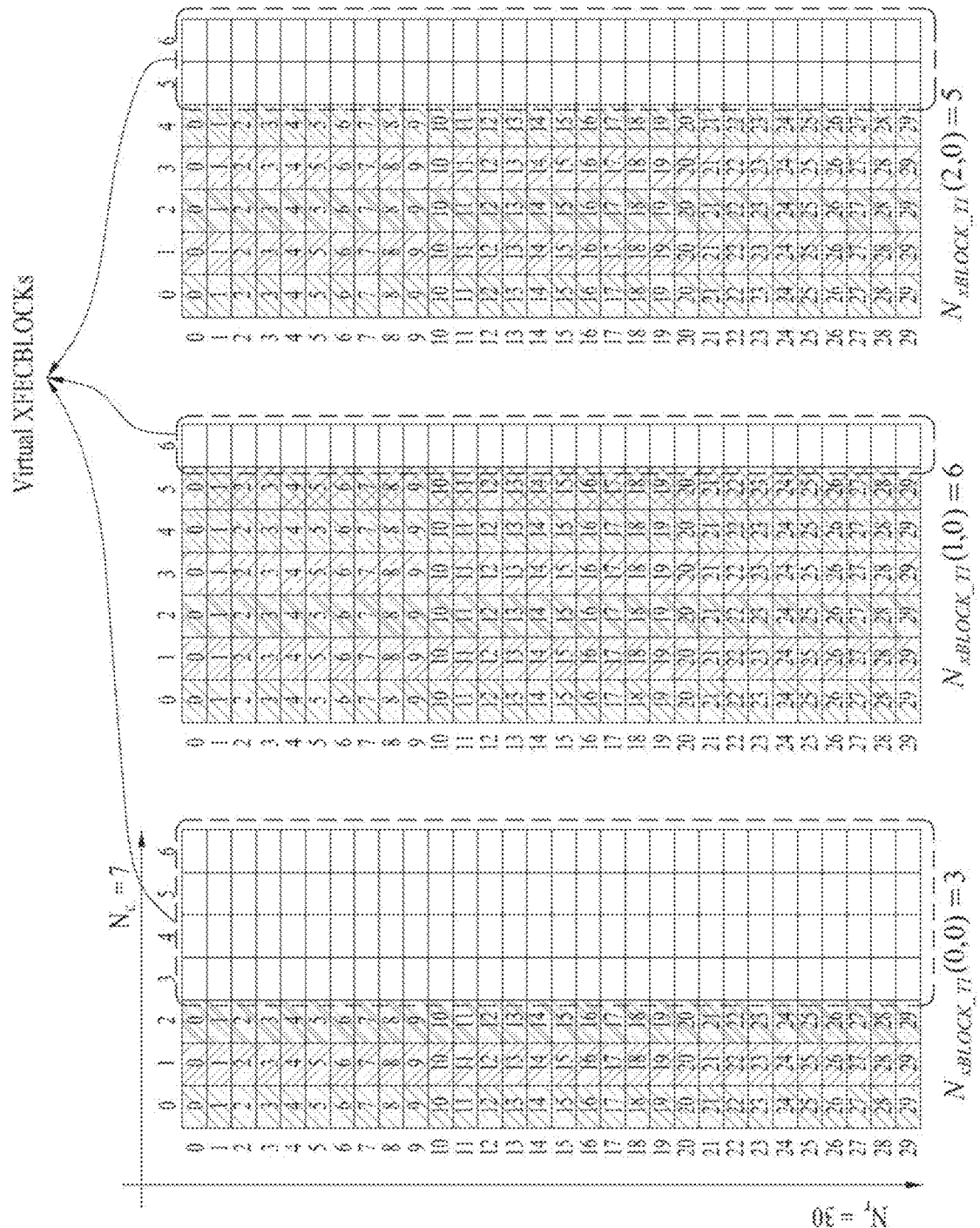
FIG. 22 illustrates an operation of a twisted row-column block interleaver according to another embodiment of the present invention.

The BCH encoding is applied to each BBF (Kbch bits), and then LDPC encoding is applied to BCH-encoded BBF (Kldpc bits=Nbch bits) as illustrated in FIG. 22.

The value of Nldpc is either 64800 bits (long FECBLOCK) or 16200 bits (short FECBLOCK).

The below table 28 and table 29 show FEC encoding parameters for a long FECBLOCK and a short FECBLOCK, respectively.

TABLE 28

| LDPC Rate | Nldpc | Kldpc | Kbch | BCH error correction capability | Nbch-Kbch |
|---|---|---|---|---|---|
| 5/15 | 64800 | 21600 | 21408 | 12 | 192 |
| 6/15 | | 25920 | 25728 | | |
| 7/15 | | 30240 | 30048 | | |
| 8/15 | | 34560 | 34368 | | |
| 9/15 | | 38880 | 38688 | | |
| 10/15 | | 43200 | 43008 | | |
| 11/15 | | 47520 | 47328 | | |
| 12/15 | | 51840 | 51648 | | |
| 13/15 | | 56160 | 55968 | | |

TABLE 29

| LDPC Rate | Nldpc | Kldpc | Kbch | BCH error correction capability | Nbch-Kbch |
|---|---|---|---|---|---|
| 5/15 | 16200 | 5400 | 5232 | 12 | 168 |
| 6/15 | | 6480 | 6312 | | |
| 7/15 | | 7560 | 7392 | | |
| 8/15 | | 8640 | 8472 | | |
| 9/15 | | 9720 | 9552 | | |
| 10/15 | | 10800 | 10632 | | |
| 11/15 | | 11880 | 11712 | | |
| 12/15 | | 12960 | 12792 | | |
| 13/15 | | 14040 | 13872 | | |

The details of operations of the BCH encoding and LDPC encoding are as follows:

A 12-error correcting BCH code is used for outer encoding of the BBF. The BCH generator polynomial for short FECBLOCK and long FECBLOCK are obtained by multiplying together all polynomials.

LDPC code is used to encode the output of the outer BCH encoding. To generate a completed Bldpc (FECBLOCK), Pldpc (parity bits) is encoded systematically from each Ildpc (BCH-encoded BBF), and appended to Ildpc. The completed Bldpc (FECBLOCK) are expressed as follow equation.

$$B_{ldpc}=[I_{ldpc}P_{ldpc}]=[i_0,i_1,\ldots,i_{K_{ldpc}-1},p_0,p_1,\ldots,p_{N_{ldpc}-K_{ldpc}-1}] \quad \text{[Equation 2]}$$

The parameters for long FECBLOCK and short FECBLOCK are given in the above table 28 and 29, respectively.

The detailed procedure to calculate Nldpc-Kldpc parity bits for long FECBLOCK, is as follows:

1) Initialize the parity bits, $$p_0=p_1=p_2=\ldots=p_{N_{ldpc}-K_{ldpc}-1}=0 \quad \text{[Equation 3]}$$

2) Accumulate the first information bit −i0, at parity bit addresses specified in the first row of an addresses of parity check matrix. The details of addresses of parity check matrix will be described later. For example, for rate 13/15:

$$p_{983} = p_{983} \oplus i_0 \quad p_{2815} = p_{2815} \oplus i_0 \quad \text{[Equation 4]}$$
$$p_{4837} = p_{4837} \oplus i_0 \quad p_{4989} = p_{4989} \oplus i_0$$
$$p_{6138} = p_{6138} \oplus i_0 \quad p_{6458} = p_{6458} \oplus i_0$$
$$p_{6921} = p_{6921} \oplus i_0 \quad p_{6974} = p_{6974} \oplus i_0$$
$$p_{7572} = p_{7572} \oplus i_0 \quad p_{8260} = p_{8260} \oplus i_0$$
$$p_{8496} = p_{8496} \oplus i_0$$

3) For the next 359 information bits, is, s=1, 2, . . . , 359 accumulate is at parity bit addresses using following equation.

$$\{x+(s \bmod 360) \times Q_{ldpc}\} \bmod(N_{ldpc}-K_{ldpc}) \quad \text{[Equation 5]}$$

where x denotes the address of the parity bit accumulator corresponding to the first bit i0, and Qldpc is a code rate dependent constant specified in the addresses of parity check matrix. Continuing with the example, Qldpc=24 for rate 13/15, so for information bit i1, the following operations are performed:

$$p_{1007} = p_{1007} \oplus i_1 \quad p_{2839} = p_{2839} \oplus i_1 \quad \text{[Equation 6]}$$
$$p_{4861} = p_{4861} \oplus i_1 \quad p_{5013} = p_{5013} \oplus i_1$$
$$p_{6162} = p_{6162} \oplus i_1 \quad p_{6482} = p_{6482} \oplus i_1$$
$$p_{6945} = p_{6945} \oplus i_1 \quad p_{6998} = p_{6998} \oplus i_1$$
$$p_{7596} = p_{7596} \oplus i_1 \quad p_{8284} = p_{8284} \oplus i_1$$
$$p_{8520} = p_{8520} \oplus i_1$$

4) For the 361st information bit i360, the addresses of the parity bit accumulators are given in the second row of the addresses of parity check matrix. In a similar manner the addresses of the parity bit accumulators for the following 359 information bits is, s=361, 362, . . . , 719 are obtained using the equation 6, where x denotes the address of the parity bit accumulator corresponding to the information bit i360, i.e., the entries in the second row of the addresses of parity check matrix.

5) In a similar manner, for every group of 360 new information bits, a new row from addresses of parity check matrixes used to find the addresses of the parity bit accumulators.

After all of the information bits are exhausted, the final parity bits are obtained as follows:

6) Sequentially perform the following operations starting with i=1

$$p_i = p_i \oplus p_{i-1}, i=1,2, \ldots, N_{ldpc} - K_{ldpc} - 1 \quad \text{[Equation 7]}$$

where final content of pi, i=0, 1, . . . NLdpc−Kldpc−1 is equal to the parity bit pi.

TABLE 30

| Code Rate | Qldpc |
|---|---|
| 5/15 | 120 |
| 6/15 | 108 |
| 7/15 | 96 |
| 8/15 | 84 |
| 9/15 | 72 |
| 10/15 | 60 |
| 11/15 | 48 |
| 12/15 | 36 |
| 13/15 | 24 |

This LDPC encoding procedure for a short FECBLOCK is in accordance with the LDPC encoding procedure for the long FECBLOCK, except replacing the table 30 with table 31, and replacing the addresses of parity check matrix for the long FECBLOCK with the addresses of parity check matrix for the short FECBLOCK.

TABLE 31

| Code Rate | Qldpc |
|---|---|
| 5/15 | 30 |
| 6/15 | 27 |
| 7/15 | 24 |
| 8/15 | 21 |
| 9/15 | 18 |
| 10/15 | 15 |

TABLE 31-continued

| Code Rate | Qldpc |
|---|---|
| 11/15 | 12 |
| 12/15 | 9 |
| 13/15 | 6 |

FIG. 20 illustrates a time interleaving according to an embodiment of the present invention.

In FIG. 20, (a) to (c) show examples of TI mode.

The time interleaver operates at the DP level. The parameters of time interleaving (TI) may be set differently for each DP.

The following parameters, which appear in part of the PLS2-STAT data, configure the TI:

DP_TI_TYPE (allowed values: 0 or 1): Represents the TI mode; '0' indicates the mode with multiple TI blocks (more than one TI block) per TI group. In this case, one TI group is directly mapped to one frame (no inter-frame interleaving). '1' indicates the mode with only one TI block per TI group. In this case, the TI block may be spread over more than one frame (inter-frame interleaving).

DP_TI_LENGTH: If DP_TI_TYPE='0', this parameter is the number of TI blocks NTI per TI group. For DP_TI_TYPE='1', this parameter is the number of frames PI spread from one TI group.

DP_NUM_BLOCK_MAX (allowed values: 0 to 1023): Represents the maximum number of XFECBLOCKs per TI group.

DP_FRAME_INTERVAL (allowed values: 1, 2, 4, 8): Represents the number of the frames HUMP between two successive frames carrying the same DP of a given PHY profile.

DP_TI_BYPASS (allowed values: 0 or 1): If time interleaving is not used for a DP, this parameter is set to '1'. It is set to '0' if time interleaving is used.

Additionally, the parameter DP_NUM_BLOCK from the PLS2-DYN data is used to represent the number of XFECBLOCKs carried by one TI group of the DP.

When time interleaving is not used for a DP, the following TI group, time interleaving operation, and TI mode are not considered. However, the Delay Compensation block for the dynamic configuration information from the scheduler will still be required. In each DP, the XFECBLOCKs received from the SSD/MIMO encoding are grouped into TI groups. That is, each TI group is a set of an integer number of XFECBLOCKs and will contain a dynamically variable number of XFECBLOCKs. The number of XFECBLOCKs in the TI group of index n is denoted by NxBLOCK_Group (n) and is signaled as DP_NUM_BLOCK in the PLS2-DYN data. Note that NxBLOCK_Group(n) may vary from the minimum value of 0 to the maximum value NxBLOCK_Group_MAX (corresponding to DP_NUM_BLOCK_MAX) of which the largest value is 1023.

Each TI group is either mapped directly onto one frame or spread over PI frames. Each TI group is also divided into more than one TI blocks(NTI), where each TI block corresponds to one usage of time interleaver memory. The TI blocks within the TI group may contain slightly different numbers of XFECBLOCKs. If the TI group is divided into multiple TI blocks, it is directly mapped to only one frame. There are three options for time interleaving (except the extra option of skipping the time interleaving) as shown in the below table 32.

TABLE 32

| Modes | Descriptions |
|---|---|
| Option-1 | Each TI group contains one TI block and is mapped directly to one frame as shown in (a). This option is signaled in the PLS2-STAT by DP_TI_TYPE = '0' and DP_TI_LENGTH = '1'(NTI = 1). |
| Option-2 | Each TI group contains one TI block and is mapped to more than one frame. (b) shows an example, where one TI group is mapped to two frames, i.e., DP_TI_LENGTH = '2' (PI = 2) and DP_FRAME_INTERVAL (IJUMP = 2). This provides greater time diversity for low data-rate services. This option is signaled in the PLS2-STAT by DP_TI_TYPE = '1'. |
| Option-3 | Each TI group is divided into multiple TI blocks and is mapped directly to one frame as shown in (c). Each TI block may use full TI memory, so as to provide the maximum bit-rate for a DP. This option is signaled in the PLS2-STAT signaling by DP_TI_TYPE = '0' and DP_TI_LENGTH = NTI, while PI = 1. |

Typically, the time interleaver will also act as a buffer for DP data prior to the process of frame building. This is achieved by means of two memory banks for each DP. The first TI-block is written to the first bank. The second TI-block is written to the second bank while the first bank is being read from and so on.

The TI is a twisted row-column block interleaver. For the sth TI block of the nth TI group, the number of rows $N_r$ of a TI memory is equal to the number of cells $N_{cells}$, i.e., $N_r = N_{cells}$ while the number of columns $N_c$ is equal to the number $N_{xBLOCK\_TI}(n, s)$.

Figure 21:
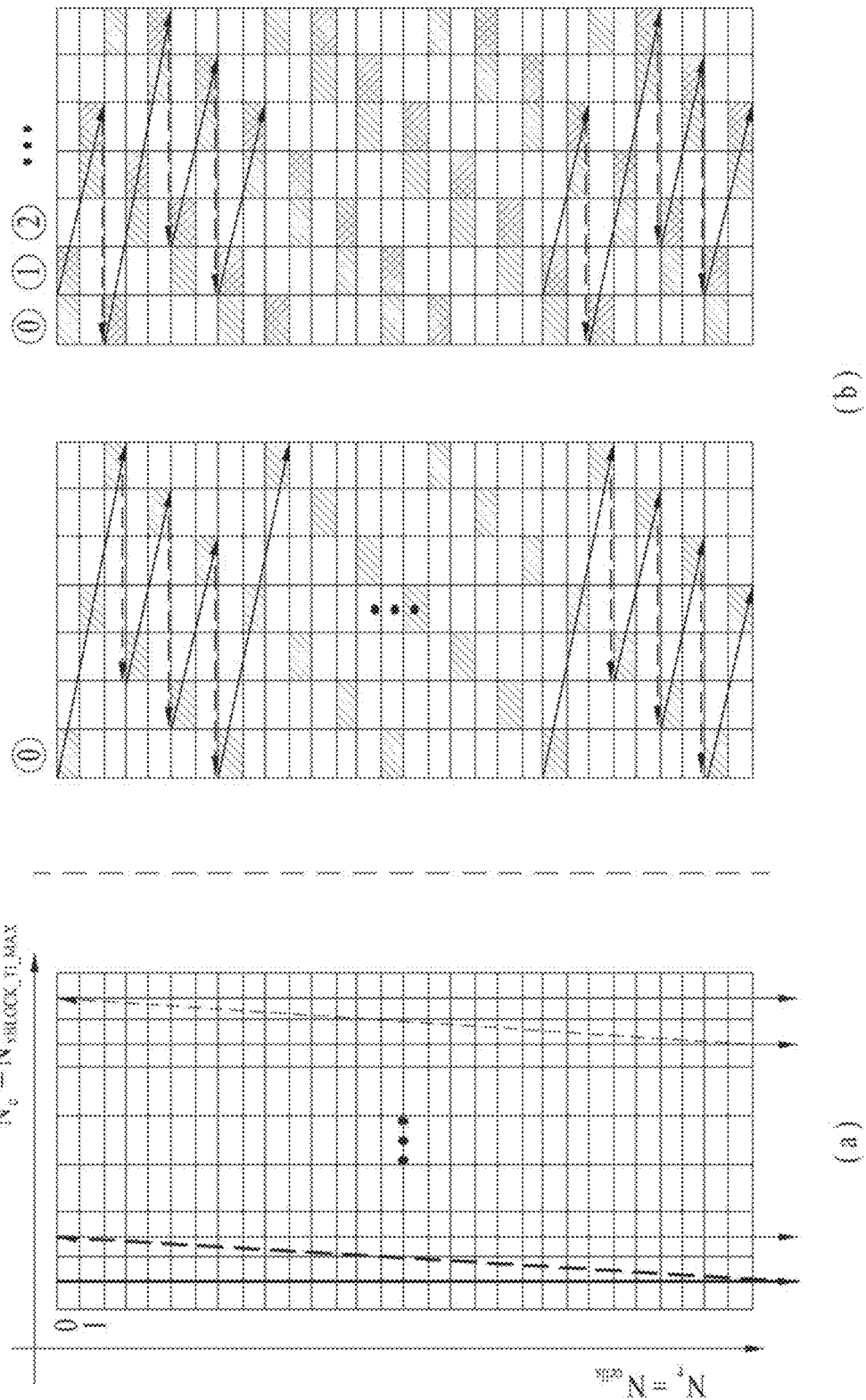
FIG. 21 illustrates the basic operation of a twisted row-column block interleaver according to an embodiment of the present invention.

FIG. 21 illustrates the basic operation of a twisted row-column block interleaver according to an embodiment of the present invention.

FIG. 21 (a) shows a writing operation in the time interleaver and FIG. 21(b) shows a reading operation in the time interleaver The first XFECBLOCK is written column-wise into the first column of the TI memory, and the second XFECBLOCK is written into the next column, and so on as shown in (a). Then, in the interleaving array, cells are read out diagonal-wise. During diagonal-wise reading from the first row (rightwards along the row beginning with the left-most column) to the last row, $N_r$ cells are read out as shown in (b). In detail, assuming $z_{n,s,i}$ (i=0, ..., $N_r N_c$) as the TI memory cell position to be read sequentially, the reading process in such an interleaving array is performed by calculating the row index $R_{n,s,i}$, the column index $C_{n,s,i}$, and the associated twisting parameter $T_{n,s,i}$ as follows equation.

$$\text{GENERATE}(R_{n,s,i}, C_{n,s,i}) = \quad \text{[Equation 8]}$$

$$\{$$

$$R_{n,s,i} = \mod(i, N_r),$$

$$T_{n,s,i} = \mod(S_{shift} \times R_{n,s,i}, N_c),$$

$$C_{n,s,i} = \mod\left(T_{n,s,i} + \left\lfloor \frac{i}{N_r} \right\rfloor, N_c\right)$$

$$\}$$

where $S_{shift}$ is a common shift value for the diagonal-wise reading process regardless of $N_{xBLOCK\_TI}(n,s)$, and it is determined by $N_{xBLOCK\_TI\_MAX}$ given in the PLS2-STAT as follows equation.

[Equation 9]

$$\text{for } \begin{cases} N'_{xBLOCK\_TI\_MAX} = N_{xBLOCK\_TI\_MAX} + 1, & \text{if } N_{xBLOCK\_TI\_MAX} \mod 2 = 0 \\ N'_{xBLOCK\_TI\_MAX} = N_{xBLOCK\_TI\_MAX}, & \text{if } N_{xBLOCK\_TI\_MAX} \mod 2 = 1 \end{cases},$$

$$S_{shift} = \frac{N'_{xBLOCK\_TI\_MAX} - 1}{2}$$

As a result, the cell positions to be read are calculated by a coordinate as $z_{n,s,i} = N_r C_{n,s,i} + R_{n,s,i}$.

FIG. 22 illustrates an operation of a twisted row-column block interleaver according to another embodiment of the present invention.

More specifically, FIG. 22 illustrates the interleaving array in the TI memory for each TI group, including virtual XFECBLOCKs when $N_{xBLOCK\_TI}$ (0,0)=3, $N_{xBLOCK\_TI}$ (1,0)=6, $N_{xBLOCK\_TI}$ (2,0)=5.

The variable number $N_{xBLOCK\_TI}(n,s) = N_r$ will be less than or equal to $N_{xBLOCK\_TI\_MAX}$. Thus, in order to achieve a single-memory deinterleaving at the receiver side, regardless of $N_{xBLOCK\_TI}(n,s)$, the interleaving array for use in a twisted row-column block interleaver is set to the size of $N_r \times N_c = N_{cells} \times N_{xBLOCK\_TI\_MAX}$ by inserting the virtual XFECBLOCKs into the TI memory and the reading process is accomplished as follow equation.

$$p = 0; \quad \text{[Equation 10]}$$

for $i = 0; i < N_{cells} N'_{xBLOCK\_TI\_MAX}; i = i + 1$

{GENERATE $(R_{n,s,i}, C_{n,s,i})$;

$V_i = N_r C_{n,s,j} + R_{n,s,j}$ if $V_i < N_{cells} N_{xBLOCK\_TI}(n, s)$

{

$Z_{n,s,p} = V_i; p = p + 1;$

}

}

The number of TI groups is set to 3. The option of time interleaver is signaled in the PLS2-STAT data by DP_TI_TYPE='0', DP_FRAME_INTERVAL='1', and DP_TI_LENGTH='1', i.e.,NTI=1, IJUMP=1, and PI=1. The number of XFECBLOCKs, each of which has Ncells=30 cells, per TI group is signaled in the PLS2-DYN data by NxBLOCK_TI(0,0)=3, NxBLOCK_TI(1,0)=6, and NxBLOCK_TI(2,0)=5, respectively. The maximum number of XFECBLOCK is signaled in the PLS2-STAT data by NxBLOCK_Group_MAX, which leads to $\lfloor N_{xBLOCK\_Group\_MAX}/N_{TI} \rfloor = N_{xBLOCK\_TI\_MAX}=6$.

Figure 23:
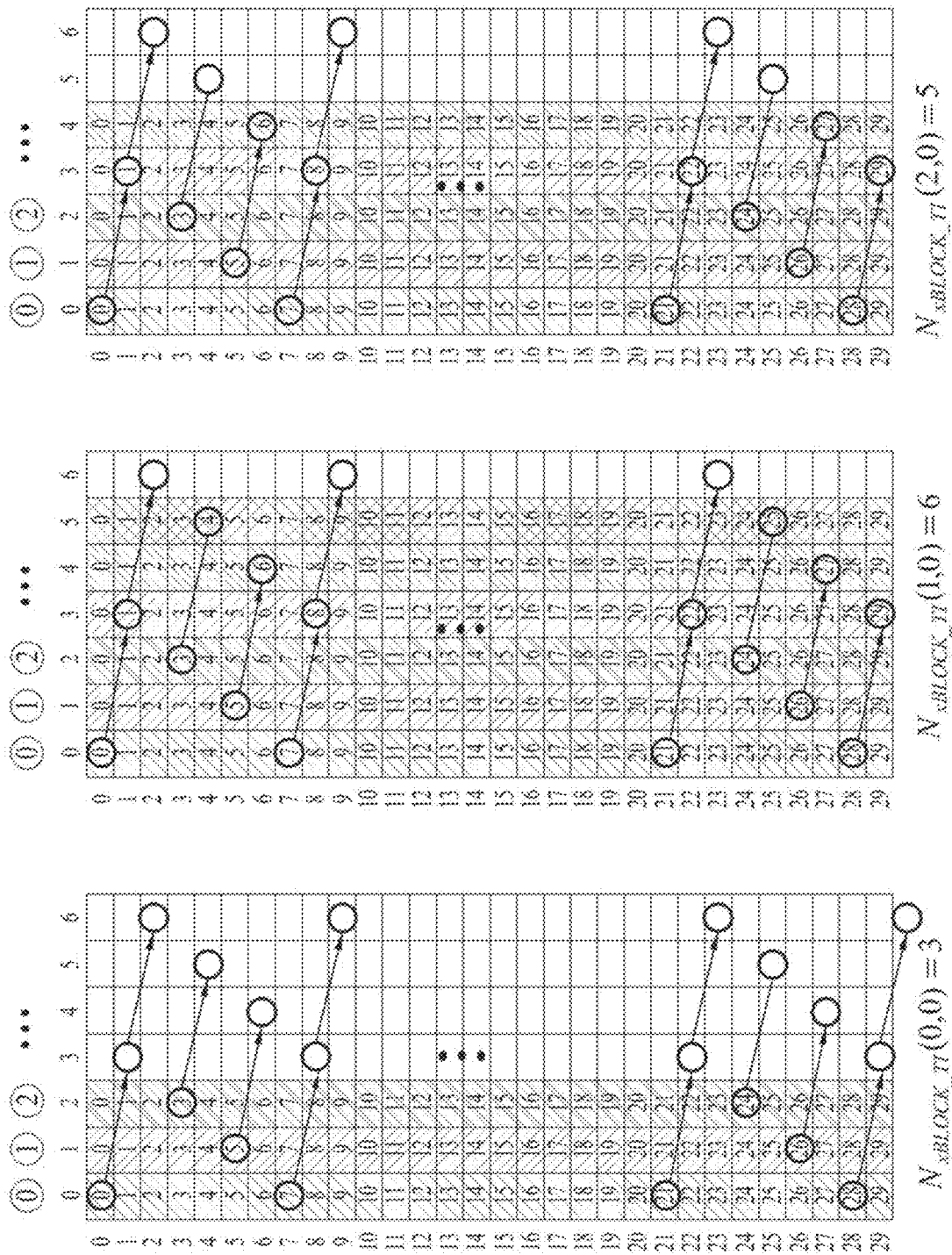
FIG. 23 illustrates a diagonal-wise reading pattern of a twisted row-column block interleaver according to an embodiment of the present invention.

FIG. 23 illustrates a diagonal-wise reading pattern of a twisted row-column block interleaver according to an embodiment of the present invention.

More specifically FIG. 23 shows a diagonal-wise reading pattern from each interleaving array with parameters of $N_{xBLOCK\_TI\_MAX}'=7$ and Sshift=(7−1)/2=3. Note that in the reading process shown as pseudocode above, if $V_i \geq N_{cells} N_{xBLOCK\_TI}$ (n,s), the value of Vi is skipped and the next calculated value of Vi is used.

Figure 24:
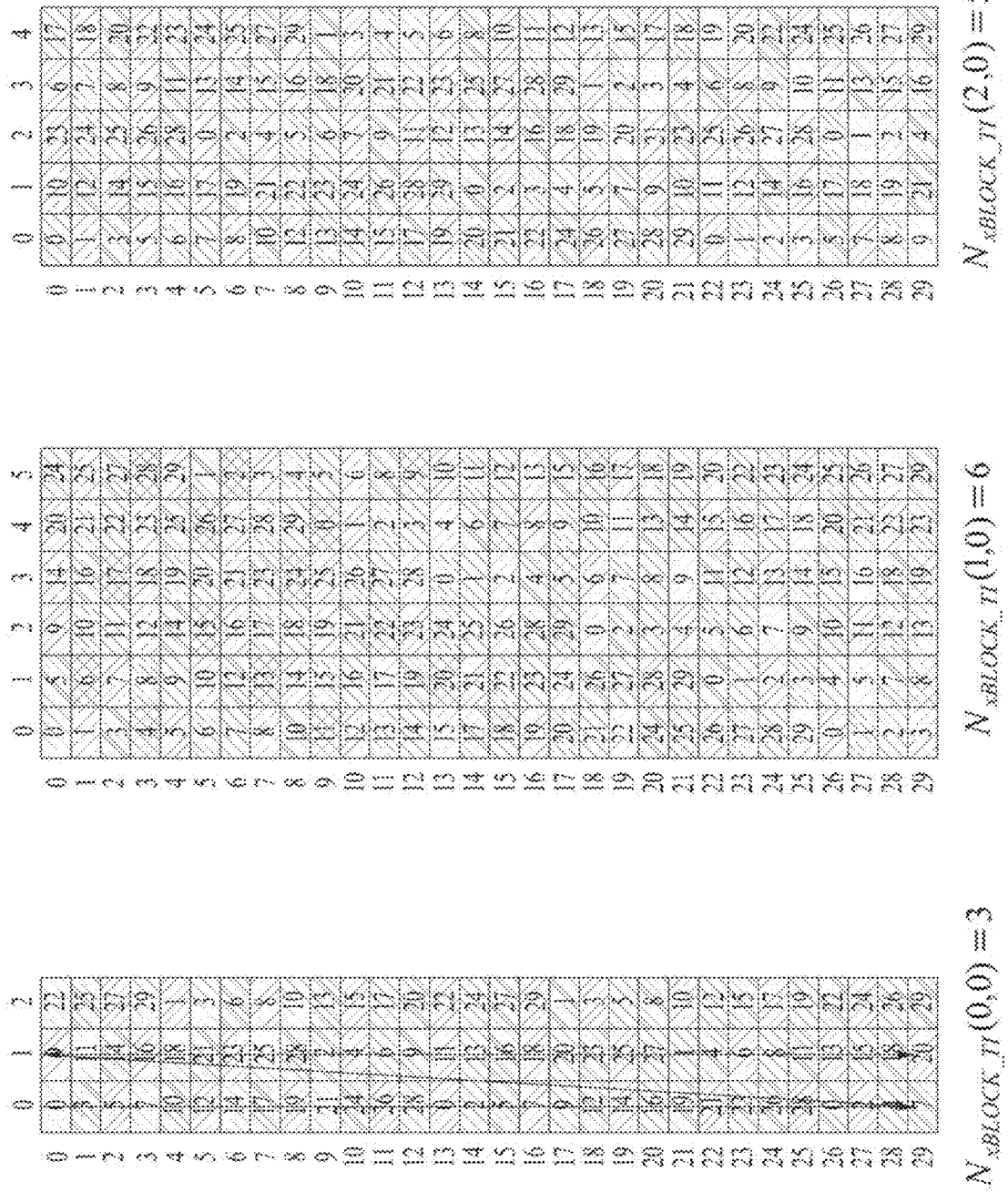
FIG. 24 illustrates interleaved XFECBLOCKs from each interleaving array according to an embodiment of the present invention.

FIG. 24 illustrates interleaved XFECBLOCKs from each interleaving array according to an embodiment of the present invention.

FIG. 24 illustrates the interleaved XFECBLOCKs from each interleaving array with parameters of $N_{xBLOCK\_TI\_MAX}'=7$ and Sshift=3.

FIG. 25 illustrates signaling for single-memory deinterleaving irrespective of the number of symbols in a frame according to an embodiment of the present invention.

As described above, the frequency interleaver according to the present invention performs interleaving using different interleaving sequences in a plurality of OFDM symbols, but the frequency deinterleaver may perform single-memory deinterleaving on the received OFDM symbols.

The present invention proposes a method for performing single-memory deinterleaving by the frequency deinterleaver irrespective of whether the number of OFDM symbols in one frame is an even number or an odd number. To this end, the above-described architecture of the frequency interleaver may operate differently depending on whether the number of OFDM symbols is an even number or an odd number. Furthermore, signaling information related thereto may be additionally defined in the above-described preamble and/or the physical layer signal (PLS). As such, single-memory deinterleaving is not limited to a case in which the number of OFDM symbols is an even number, and may always be enabled.

Here, the PLS may be transmitted in a frame starting symbol (FSS) of every frame. Alternatively, according to another embodiment, the PLS may be transmitted in the first OFDM symbol. Otherwise, based on whether the PLS is present, signaling information corresponding to the PLS may be completely transmitted in the preamble. Or, signaling information corresponding to the preamble and/or the PLS may be transmitted in bootstrap information. The bootstrap information may be an information part located in front of the preamble.

Information about, for example, a processing operation used by the frequency interleaver of the transmitter may include an FI_mode field and an N_sym field.

The FI_mode field may be a 1-bit field which can be located in the preamble. The FI_mode field may indicate an interleaving scheme used in the FSS or the first OFDM symbol of every frame.

The interleaving scheme indicated as the FI_mode field may include FI scheme #1 and FI scheme #2.

FI scheme #1 can indicate that the frequency interleaver of the transmitter performs random writing operation and then linear reading operation on the FSS. This case may correspond to a case in which the FI_mode field value is 0. The random writing or linear reading operation may be performed in or from memory using a value generated by an arbitrary random sequence generator using, for example, a pseudo-random binary sequence (PRBS). Here, linear reading may refer to sequentially reading operation.

FI scheme #2 can indicate that the transmitter performs linear writing operation and then random reading operation on the FSS. This case may correspond to a case in which the FI_mode field value is 1. Likewise, the linear writing or random reading operation may be performed in or from memory using a value generated by an arbitrary random sequence generator using, for example, PRBS. Here, linear writing may refer to a sequentially writing operation.

In addition, the FI_mode field may indicate an interleaving scheme used in a frame edge symbol (FES) or the last OFDM symbol of every frame. The interleaving scheme applied to the FES may be indicated differently from the value of the N_sym field transmitted by the PLS. That is, the interleaving scheme indicated as the FI_mode field may differ depending on whether the number of OFDM symbols is an odd number or an even number. Mapping information between the two fields may be predefined as a table by the transmitter and the receiver.

The FI_mode field may be defined and transmitted in a part of the frame other than the preamble according to another embodiment.

The N_sym field may be a field which can be located in the PLS part. The number of bits of the N_sym field is variable according to embodiments. The N_sym field may indicate number of OFDM symbols included in one frame. As such, the receiver can acquire information about whether the number of OFDM symbols is an even number or an odd number.

Operation of the frequency deinterleaver corresponding to the frequency interleaver irrespective of the number of OFDM symbols in one frame is as described below. This frequency deinterleaver may perform single-memory deinterleaving by utilizing the proposed signaling fields irrespective of whether the number of OFDM symbols is an even number or an odd number.

Initially, the frequency deinterleaver may perform frequency deinterleaving on the FSS using information of the FI_mode field of the preamble because the frequency interleaving scheme used in the FSS is indicated as the FI_mode.

The frequency deinterleaver may perform frequency deinterleaving on the FES using signaling information of the FI_mode field and signaling information of the N_sym field of the PLS. In this case, the mapping information between the two fields may be acquired using the predefined table. A description of the predefined table will be given below.

Overall deinterleaving operation on the other symbols may be performed inversely from the interleaving operation of the transmitter. That is, on a pair of contiguously input OFDM symbols, the frequency deinterleaver may perform deinterleaving using one interleaving sequence. Here, the interleaving sequence may be an interleaving sequence used by the frequency interleaver for reading & writing. The frequency deinterleaver may perform reading & writing operation inversely using the interleaving sequence.

However, the frequency deinterleaver according to the present invention may not use a ping pong architecture using double memories. The frequency deinterleaver may perform deinterleaving on contiguously input OFDM symbols using a single memory. As such, the efficiency of using memory by the frequency deinterleaver may be increased.

FIG. 26 illustrates FI schemes of FSS in signaling for single-memory deinterleaving irrespective of the number of symbols in a frame according to an embodiment of the present invention.

An interleaving scheme applied to frequency interleaving operation may be determined using the above-described FI_mode field and the N_sym field.

In the case of FSS, when the number of OFDM symbols indicated as the N_sym field is an even number, FI scheme #1 may be performed on the FSS irrespective of the FI_mode field value.

When the number of OFDM symbols indicated as the N_sym field is an odd number, FI scheme #1 may be applied to the FSS if the FI_mode field has a value of 0, and FI scheme #2 may be applied to the FSS if the FI_mode field has a value of 1. That is, when the number of OFDM symbols is an odd number, FI schemes #1 and #2 may be alternately applied to the FSS symbols for frequency interleaving.

FIG. 27 illustrates operation of a reset mode in signaling for single-memory deinterleaving irrespective of the number of symbols in a frame according to an embodiment of the present invention.

For frequency interleaving on FES, the above-described symbol offset generator may adopt a reset mode as a new concept. The reset mode may refer to a mode in which a symbol offset value generated by the symbol offset generator is '0'.

For frequency interleaving on FES, whether to use the reset mode may be determined using the above-described FI_mode field and the N_sym field.

When the number of OFDM symbols indicated as the N_sym field is an even number, the reset mode of the symbol offset generator may not operate (off) irrespective of the value of the FI_mode field.

When the number of OFDM symbols indicated as the N_sym field is an odd number, if the value of the FI_mode field is 0, the symbol offset generator may operate in the reset mode (on). Otherwise, if the value of the FI_mode field is 1, the reset mode of the symbol offset generator may not operate (off). That is, when the number of OFDM symbols is an odd number, the reset mode may be alternately turned on and off for frequency interleaving.

FIG. 28 illustrates equations indicating input and output of the frequency interleaver in signaling for single-memory deinterleaving irrespective of the number of symbols in a frame according to an embodiment of the present invention.

As described above, OFDM symbol pairs of memory bank-A and memory bank-B may be processed through the above-described interleaving operation. As described above, for interleaving, a variety of different interleaving seeds generated by cyclically shifting one main interleaving seed may be used. Here, the interleaving seed may also be called an interleaving sequence. Alternatively, the interleaving seed may also be called an interleaving address value, an address value, or an interleaving address. Here, the term "interleaving address value(s)" can be used for referring plural address values, or for referring a interleaving seed which is a singular. That is, depending on embodiments, interleaving address value(s) can mean H(p) itself, or each addresses belong to H(p).

Input of frequency interleaving to be interleaved within one OFDM symbol may be indicated as Om,L (t50010). Here, data cells may be indicated as xm,1, 0, . . . xm,l, Ndata−1. Meanwhile, p may indicate a cell index, l may indicate an OFDM symbol index, and m may indicate a frame index. That is, xm,l,p may indicate a p-th data cell of an l-th OFDM symbol of an m-th frame. Ndata may indicate the number of data cells. Nsym may indicate the number of symbols (frame signaling symbols, normal data symbols, or frame edge symbols).

Data cells which are interleaved based on the above-described operation may be indicated as Pm,l (t50020). The interleaved data cells may be indicated as vm,l,0, . . . , vm,l,Ndata−1. Meanwhile, p, l, and m may have the above-described index values.

FIG. 29 illustrates equations of a logical operation mechanism of frequency interleaving based on FI scheme #1 and FI scheme #2 in signaling for single-memory deinterleaving irrespective of the number of symbols in a frame according to an embodiment of the present invention.

A description is now given of frequency interleaving based on FI scheme #1. As described above, frequency interleaving may be performed using an interleaving sequence (interleaving address) of each memory bank.

Interleaving operation on an even symbol (j mod 2=0) may be mathematically expressed as given by equation t51010. On input data x, frequency interleaving may be performed using the interleaving sequence (interleaving address) to acquire output v. Here, p-th input data x may be permuted to be identical to H(p)-th output data v.

That is, on an even symbol (the first symbol), random writing operation may be performed using the interleaving sequence, and then linear reading operation for sequentially reading data may be performed. Here, the interleaving sequence (interleaving address) may be a value generated by an arbitrary random sequence generator using, for example, PRBS.

Interleaving operation on an odd symbol (j mod 2=1) may be mathematically expressed as given by equation t51020. On input data x, frequency interleaving may be performed using the interleaving sequence (interleaving address) to acquire output v. Here, H(p)-th input data x may be permuted to be identical to p-th output data v. That is, compared to the interleaving process performed on the even symbol, the interleaving sequence (interleaving address) may be applied inversely.

That is, on an odd symbol (the second symbol), a linear writing operation for sequentially writing data in memory may be performed, and then random reading operation for randomly reading the data using the interleaving sequence may be performed. Likewise, the interleaving sequence (interleaving address) may be a value generated by an arbitrary random sequence generator using, for example, PRBS.

A description is now given of frequency interleaving based on FI scheme #2.

In the case of frequency interleaving based on FI scheme #2, operation on an even/odd symbol may be performed inversely from the operation based on FI scheme #1.

That is, on the even symbol, linear writing operation may be performed and then random reading operation may be performed as given by equation t51020. In addition, on the odd symbol, random writing operation may be performed and then linear reading operation may be performed as given by equation t51010. A detailed description thereof is the same as that given above in relation to FI scheme #1.

The symbol index l may be indicated as 0, 1, . . . , Nsym−1, and the cell index p may be indicated as 0, 1, . . . , Ndata−1. According to another embodiment, the frequency interleaving scheme on an even symbol and the frequency interleaving scheme on an odd symbol may be switched. In addition, according to another embodiment, the frequency interleaving scheme based on FI scheme #1 and the frequency interleaving scheme based on FI scheme #2 may be switched.

Figure 30:
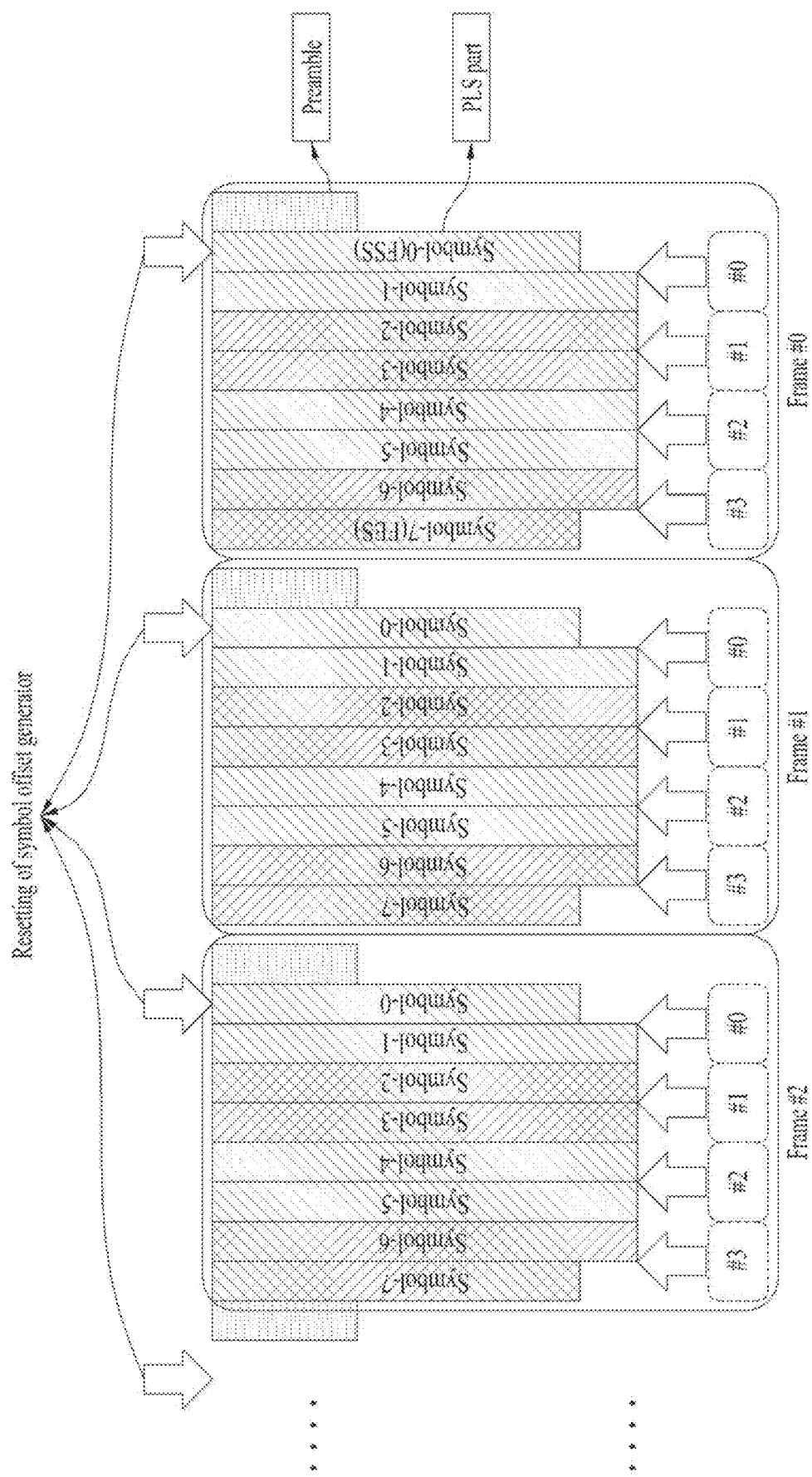
FIG. 30 illustrates an example in which the number of symbols is an even number in signaling for single-memory deinterleaving irrespective of the number of symbols in a frame according to an embodiment of the present invention.

FIG. 30 illustrates an example in which the number of symbols is an even number in signaling for single-memory deinterleaving irrespective of the number of symbols in a frame according to an embodiment of the present invention.

In the current embodiment, the N_sym field may indicate that the number of OFDM symbols in one frame is an even number. The current embodiment assumes that one frame includes one preamble and eight OFDM symbols. According to another embodiment, bootstrap information may be further included in front of the preamble. The bootstrap information is not illustrated.

In the current embodiment, one frame may include one FSS and one FES. Here, it is assumed that the FSS and the FES have the same length. In addition, since information of the N_sym field is transmitted in the PLS part, the frequency deinterleaver may acquire the corresponding information after decoding the FSS. Furthermore, the current embodiment assumes that the N_sym field is completely decoded before operation on the FES is performed.

In the FSS of each frame, the value of the symbol offset generator may be reset to 0. Accordingly, the first and second symbols may be processed using the same interleaving sequence. In addition, sequence #0 may be used for operation whenever each frame starts. After that, sequences #1 and #2 may be sequentially used for operation of the frequency interleaver/deinterleaver.

Figure 31:
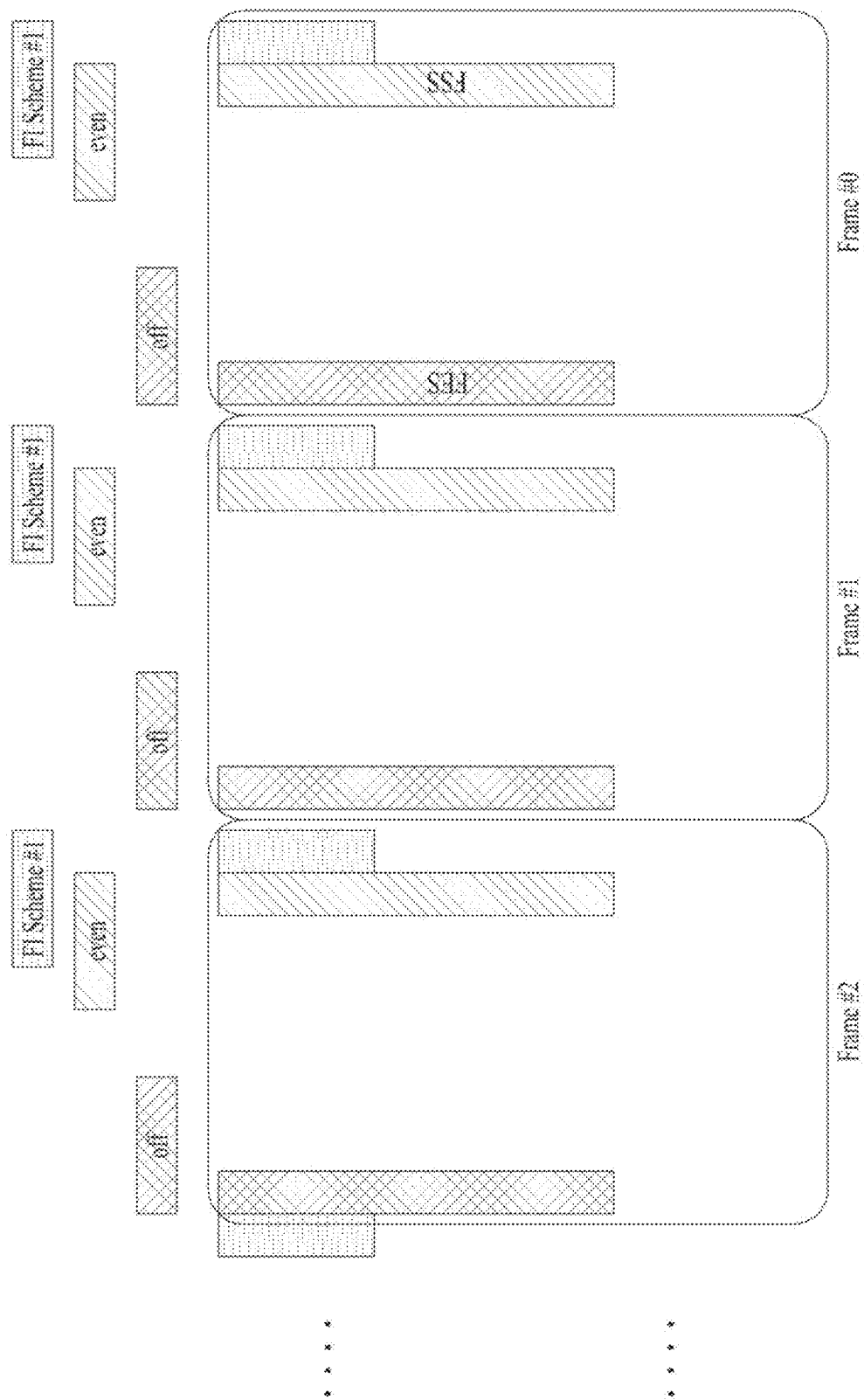
FIG. 31 illustrates an example in which the number of symbols is an even number in signaling for single-memory deinterleaving irrespective of the number of symbols in a frame according to an embodiment of the present invention.

FIG. 31 illustrates an example in which the number of symbols is an even number in signaling for single-memory deinterleaving irrespective of the number of symbols in a frame according to an embodiment of the present invention.

In the first frame, information about an interleaving scheme of the FSS may be acquired from the FI_mode field of the preamble. In the current embodiment, since the number of OFDM symbols is an even number, only FI scheme #1 may be used.

Then, the FSS may be decoded and thus N_sym information may be acquired. The N_sym information indicates that the number of symbols in the current frame is an even number. After that, the acquired FI_mode information and the N_sym information may be used when the frequency deinterleaver decodes the FES. Since the number of symbols is an even number, the symbol offset generator does not operate in the above-described reset mode. That is, the reset mode may be in an off state.

Subsequently, even in another frame, since an even number of OFDM symbols are included, the frequency deinterleaver may operate in the same manner. That is, the FI scheme to be used in the FSS is FI scheme #1, and the reset mode to be used in the FES may be in an off state.

Figure 32:
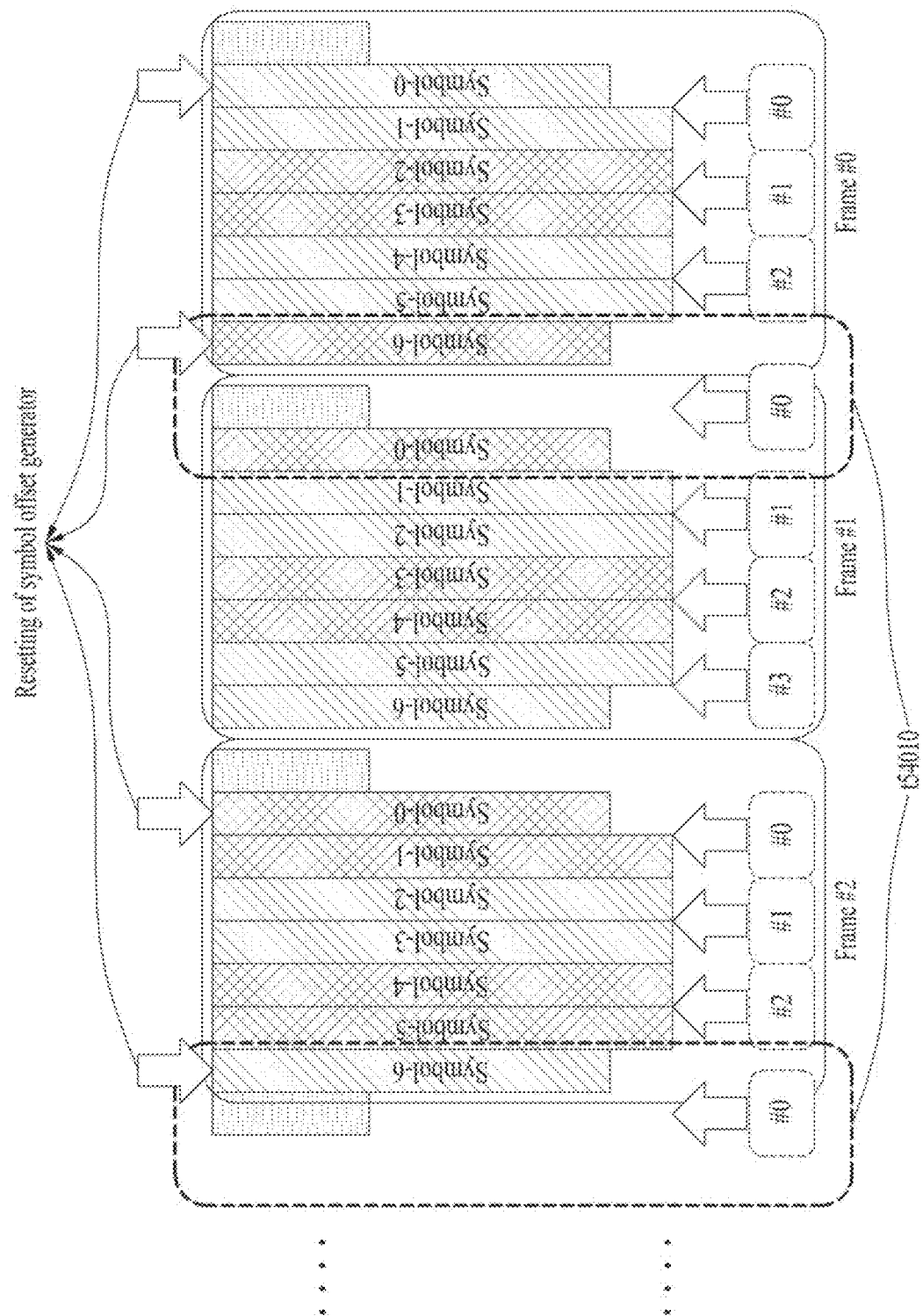
FIG. 32 illustrates an example in which the number of symbols is an odd number in signaling for single-memory deinterleaving irrespective of the number of symbols in a frame according to an embodiment of the present invention.

FIG. 32 illustrates an example in which the number of symbols is an odd number in signaling for single-memory deinterleaving irrespective of the number of symbols in a frame according to an embodiment of the present invention.

In the current embodiment, the N_sym field may indicate that the number of OFDM symbols in one frame is an odd number. The current embodiment assumes that one frame includes one preamble and seven OFDM symbols. According to another embodiment, bootstrap information may be further included in front of the preamble. The bootstrap information is not illustrated.

In the current embodiment, like the case in which the number of symbols is an even number, one frame may include one FSS and one FES. Here, it is assumed that the FSS and the FES have the same length. In addition, since information of the N_sym field is transmitted in the PLS part, the frequency deinterleaver may acquire the corresponding information after decoding the FSS. Furthermore, the current embodiment assumes that the N_sym field is completely decoded before operation on the FES is performed.

In the FSS of each frame, the value of the symbol offset generator may be reset to 0. Furthermore, in the FES of an arbitrary frame, the symbol offset generator may operate in a reset mode based on the values of the FI_mode field and the N_sym field. Accordingly, in the FES of the arbitrary frame, the value of the symbol offset generator may be reset or not reset to 0. These reset operations may be alternately performed on frames.

The symbol offset generator may be reset in the last symbol of the first frame, i.e., the FES. Accordingly, the interleaving sequence may be reset to sequence #0. As such, the frequency interleaver/deinterleaver may process the corresponding FES based on sequence #0 (t54010).

In the FSS of a subsequent frame, the symbol offset generator may be reset again and thus sequence #0 may be used (t54010). The symbol offset generator may not be reset in the FES of the second frame (frame #1), and may be reset again in the FES of the third frame (frame #2).

Figure 33:
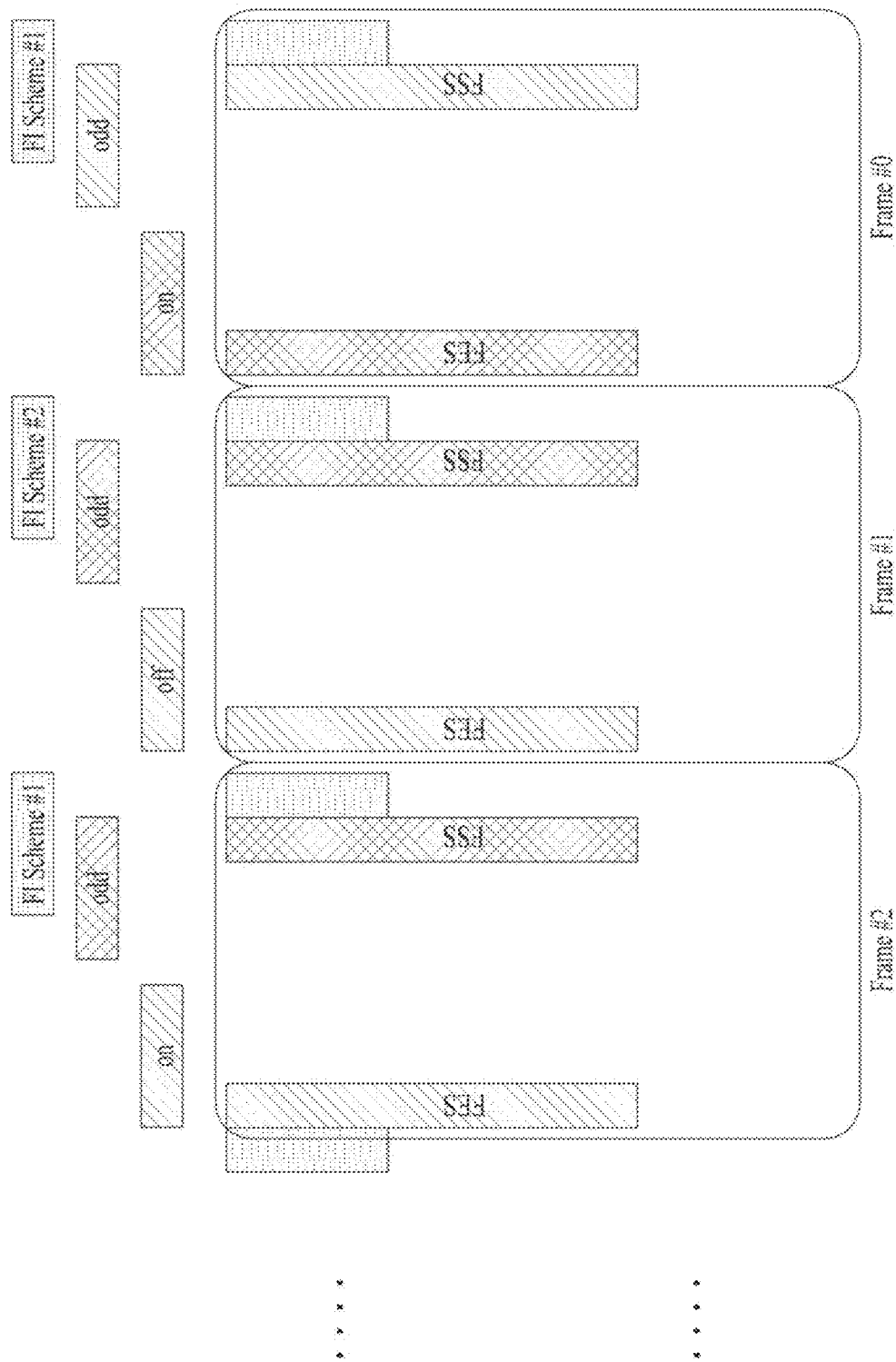
FIG. 33 illustrates an example in which the number of symbols is an odd number in signaling for single-memory deinterleaving irrespective of the number of symbols in a frame according to an embodiment of the present invention.

FIG. 33 illustrates an example in which the number of symbols is an odd number in signaling for single-memory deinterleaving irrespective of the number of symbols in a frame according to an embodiment of the present invention.

In the first frame, information about an interleaving scheme of the FSS may be acquired from the FI_mode field of the preamble. Since the number of OFDM symbols is an odd number, FI scheme #1 and FI scheme #2 may be used. In the current embodiment, FI scheme #1 is used in the first frame.

Then, the FSS may be decoded and thus N_sym information may be acquired. The N_sym information indicates that the number of symbols in the current frame is an odd number. After that, the acquired FI_mode information and the N_sym information may be used when the frequency deinterleaver decodes the FES. Since the number of symbols is an odd number and FI scheme #1 is used, the FI_mode field value is 0. Since the FI_mode is 0, the symbol offset generator may operate in the above-described reset mode. That is, the reset mode may be in an on state.

The symbol offset generator may operate in the reset mode and thus may be reset to 0. Since the FI_mode field value is 1 in the second frame, this indicates that the FSS is processed based on FI scheme #2. The N_sym field indicates that the number of symbols is an odd number. In the second frame, since the FI_mode field value is 1 and the number of symbols is an odd number, the symbol offset generator may not operate in the reset mode.

In this manner, the FI scheme to be used in the FSS may be alternately set to FI schemes #1 and #2. Furthermore, the reset mode to be used in the FES may be alternately set to be on and off. According to another embodiment, the settings may not be changed every frame.

Figure 34:
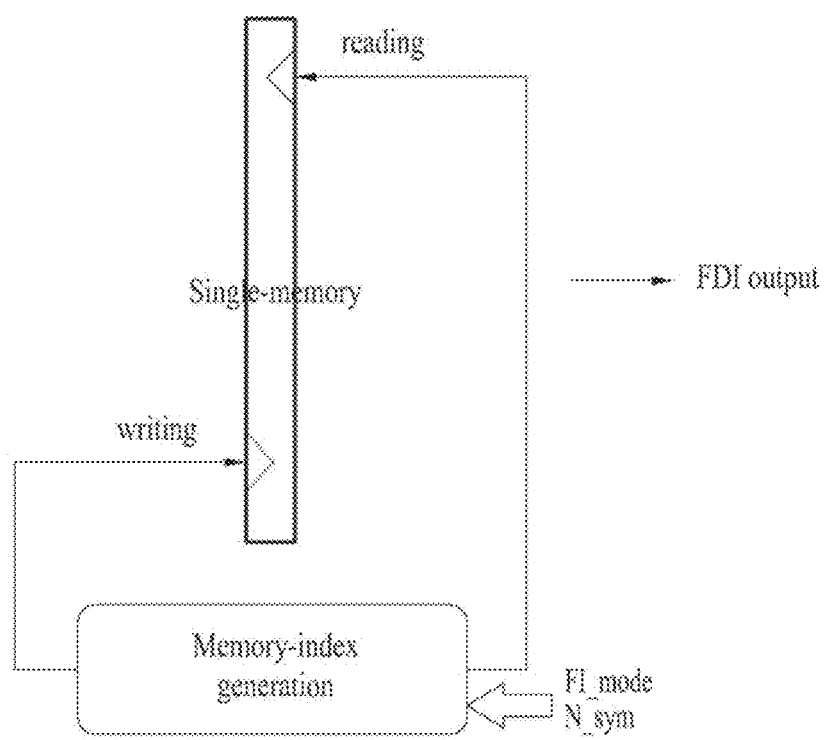
FIG. 34 illustrates operation of the frequency deinterleaver in signaling for single-memory deinterleaving irrespective of the number of symbols in a frame according to an embodiment of the present invention.

FIG. 34 illustrates operation of the frequency deinterleaver in signaling for single-memory deinterleaving irrespective of the number of symbols in a frame according to an embodiment of the present invention.

The frequency deinterleaver may perform frequency deinterleaving using information of the predefined FI_mode field and/or the N_sym field. As described above, the frequency deinterleaver may operate using a single memory. Basically, frequency deinterleaving may be inverse operation of the frequency interleaving operation performed by the transmitter, to restore the order of data.

As described above, frequency deinterleaving on the FSS may be performed based on information about the FI scheme which is acquired from the FI_mode field and the N_sym field of the preamble. Frequency deinterleaving on the FES may be performed based on information indicating whether to the reset mode operates, which is acquired using the FI_mode field and the N_sym field.

That is, on a pair of input OFDM symbols, the frequency deinterleaver may perform inverse operation of the reading/writing operation of the frequency interleaver. One interleaving sequence may be used in this operation.

However, as described above, the frequency interleaver follows the ping pong architecture using double memories, but the frequency deinterleaver may perform deinterleaving using a single memory. This single-memory frequency deinterleaving operation may be performed using information of the FI_mode field and the N_sym field. This information may allow single-memory frequency deinterleaving even on a frame having an odd number of OFDM symbols irrespective of the number of OFDM symbols.

The frequency interleaver according to the present invention may perform frequency interleaving on all data cells of the OFDM symbols. The frequency interleaver may map the data cells to available data carriers of the symbols.

The frequency interleaver according to the present invention may operate in different interleaving modes based on FFT size. For example, when the FFT size is 32K, the frequency interleaver may perform random writing/linear reading operation on an even symbol and perform linear writing/random reading operation on an odd symbol as in FI scheme #1 described above. Alternatively, when the FFT size is 16K or 8K, the frequency interleaver may perform linear reading/random writing operation on all symbols irrespective of an even/odd number.

The FFT size, which determines whether to switch the interleaving modes, may vary according to embodiments. That is, interleaving as in FI scheme #1 may be performed in the case of 32K and 16K, and interleaving irrespective of an even/odd number may be performed in the case of 8K. Alternatively, interleaving as in FI scheme #1 may be performed for all FFT sizes, or interleaving irrespective of an even/odd number may be performed for all FFT sizes. Otherwise, according to another embodiment, interleaving as in FI scheme #2 may be performed for a specific FFT size.

This frequency interleaving operation may be performed using the above-described interleaving sequence (interleaving address). The interleaving sequence may be variously generated using an offset value as described above. Alternatively, address check may be performed to generate various interleaving sequences.

Figure 35:
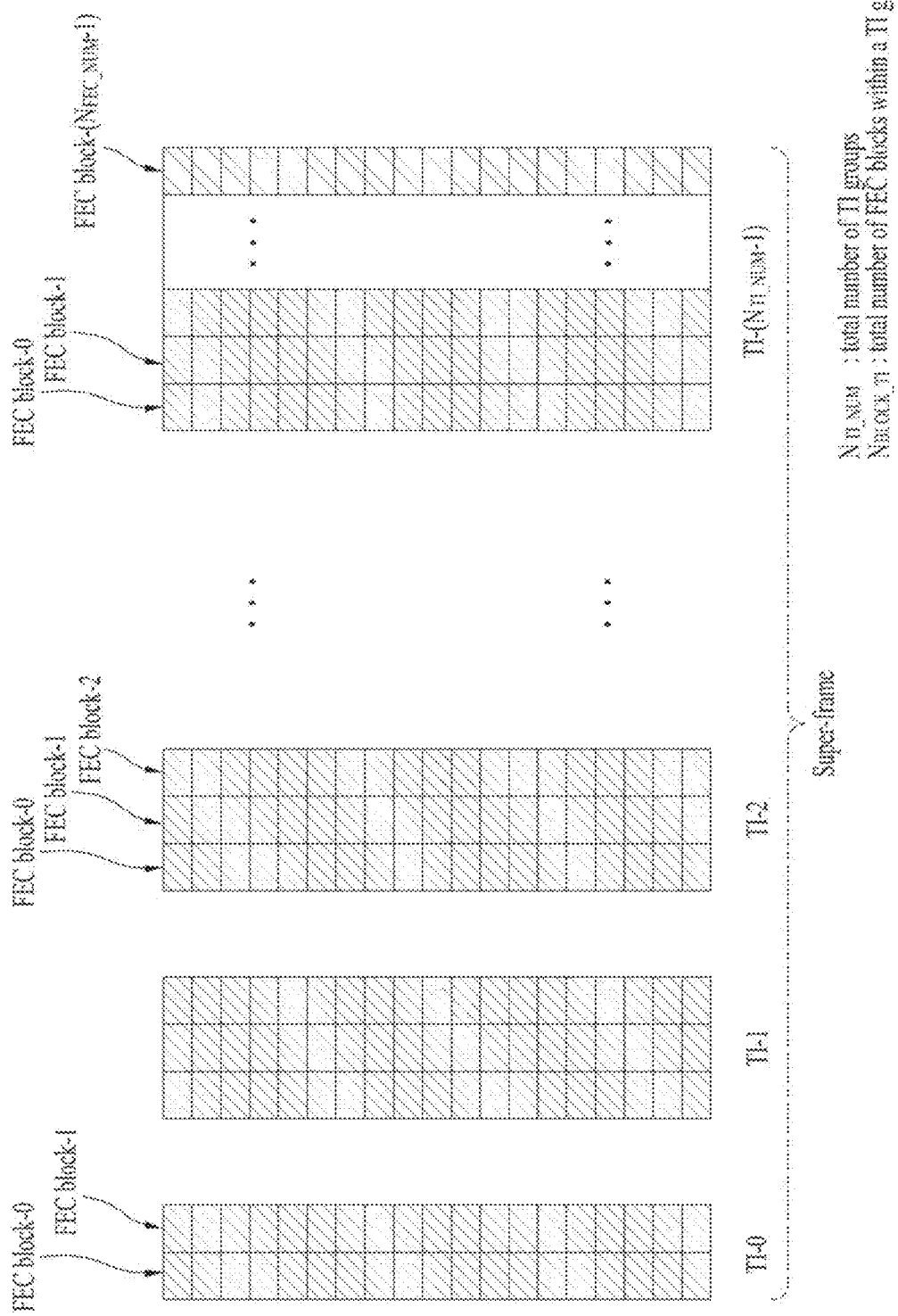
FIG. 35 illustrates the concept of a variable bit-rate system according to an embodiment of the present invention.

FIG. 35 illustrates the concept of a variable bit-rate system according to an embodiment of the present invention.

Specifically, a transport superframe, shown in FIG. 35, is composed of NTI_NUM_TI groups and each TI group can include N_BLOCK_TI FEC blocks. In this case, TI groups may respectively include different numbers of FEC blocks. The TI group according to an embodiment of the present invention can be defined as a block for performing time interleaving and can be used in the same meaning as the aforementioned TI block or IF. That is, one IF can include at least one TI block and the number of FEC blocks in the TI block is variable.

When TI groups include different numbers of FEC blocks, the present invention performs interleaving on the TI groups using one twisted row-column block interleaving rule in an embodiment. Accordingly, the receiver can perform deinterleaving using a single memory. A description will be given of an input FEC block memory arrangement method and reading operation of the time interleaver in consideration of variable bit-rate (VBR) transmission in which the number of FEC blocks can be changed per TI group.

Figure 36:
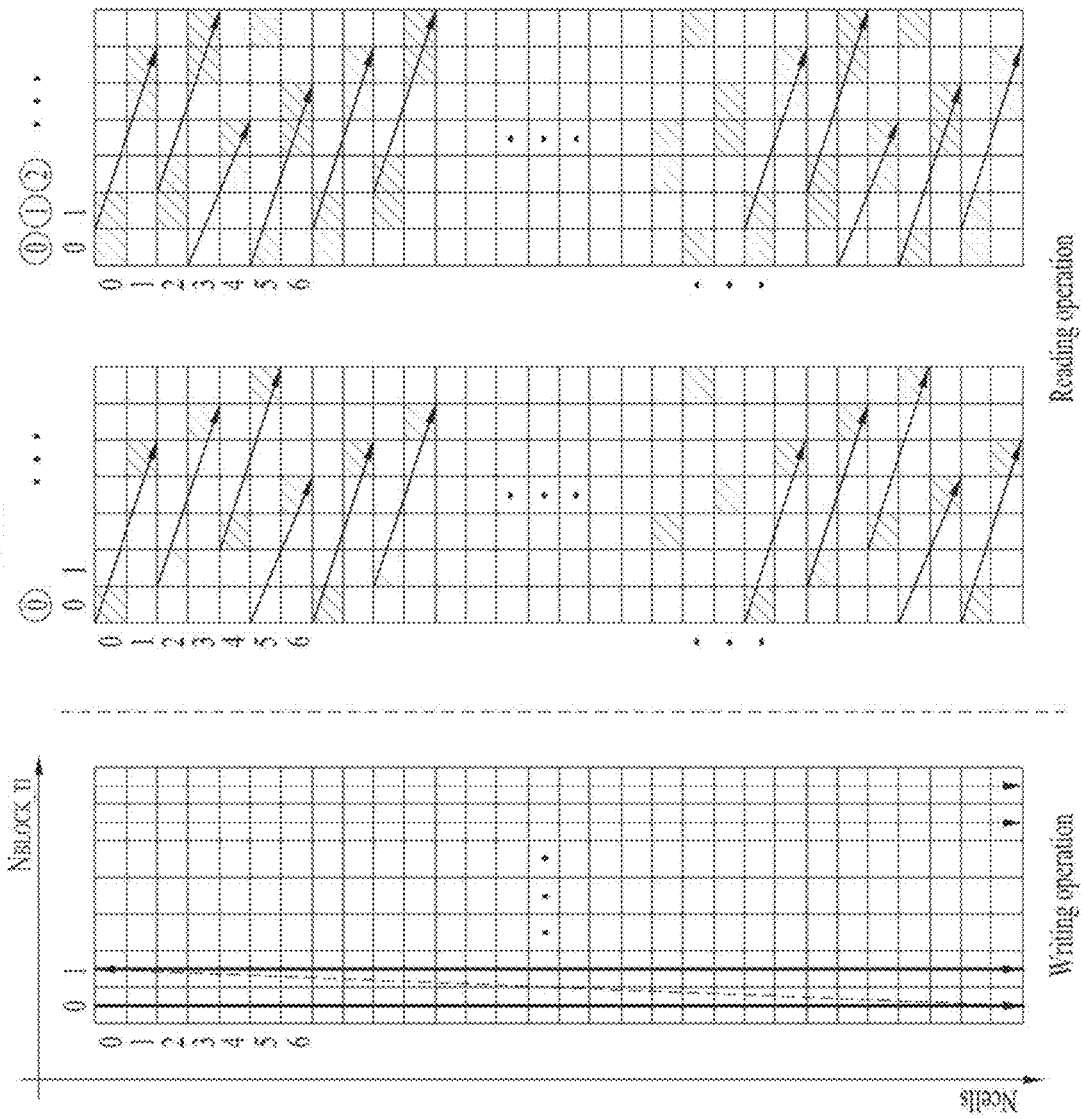
FIG. 36 illustrates writing and reading operations of block interleaving according to an embodiment of the present invention.

FIG. 36 illustrates writing and reading operations of block interleaving according to an embodiment of the present invention. Detailed descriptions about this figure was described before.

FIG. 37 shows equations representing block interleaving according to an embodiment of the present invention.

The equations shown in the figure represent block interleaving applied per TI group. As expressed by the equations, shift values can be respectively calculated in a case in which the number of FEC blocks included in a TI group is an odd number and a case in which the number of FEC blocks included in a TI group is an even number. That is, block interleaving according to an embodiment of the present invention can calculate a shift value after making the number of FEC blocks be an odd-number.

A time interleaver according to an embodiment of the present invention can determine parameters related to interleaving on the basis of a TI group having a maximum number of FEC blocks in the corresponding superframe. Accordingly, the receiver can perform deinterleaving using a single memory. Here, for a TI group having a smaller number of FEC blocks than the maximum number of FEC blocks, virtual FEC blocks corresponding to a difference between the number of FEC blocks and the maximum number of FEC blocks can be added.

Virtual FEC blocks according to an embodiment of the present invention can be inserted before actual FEC blocks. Subsequently, the time interleaver according to an embodiment of the present invention can perform interleaving on the TI groups using one twisted row-column block interleaving rule in consideration of the virtual FEC blocks. In addition, the time interleaver according to an embodiment of the present invention can perform the aforementioned skip operation when a memory-index corresponding to virtual FEC blocks is generated during reading operation. In the following writing operation, the number of FEC blocks of input TI groups is matched to the number of FEC blocks of output TI groups. Consequently, according to time interleaving according to an embodiment of the present invention, loss of data rate of data actually transmitted may be prevented through skip operation even if virtual FEC blocks are inserted in order to perform efficient single-memory deinterleaving in the receiver.

FIG. 38 illustrates virtual FEC blocks according to an embodiment of the present invention.

The left side of the figure shows parameters indicating a maximum number of FEC blocks in a TI group, the actual number of FEC blocks included in a TI group and a difference between the maximum number of FEC blocks and the actual number of FEC blocks, and equations for deriving the number of virtual FEC blocks.

The right side of the figure shows an embodiment of inserting virtual FEC blocks into a TI group. In this case, the virtual FEC blocks can be inserted before actual FEC blocks, as described above.

FIG. 39 shows equations representing reading operation after insertion of virtual FEC blocks according to an embodiment of the present invention.

Skip operation illustrated in the figure can skip virtual FEC blocks in reading operation.

Figure 40:
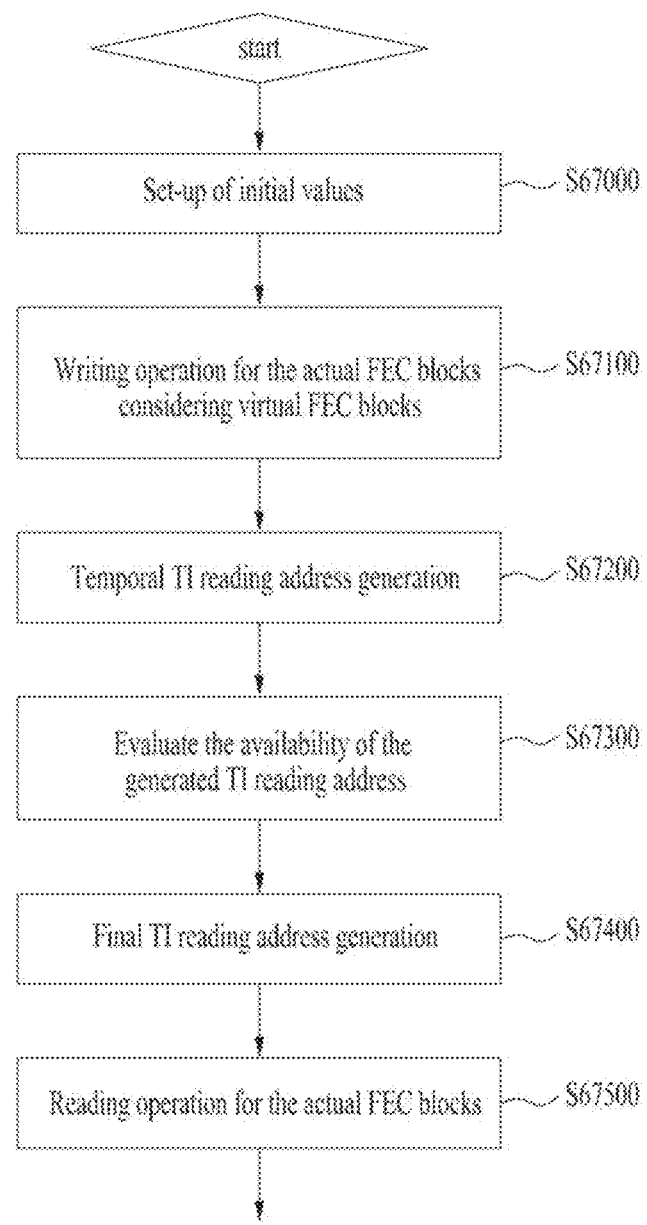
FIG. 40 is a flowchart illustrating a time interleaving process according to an embodiment of the present invention.

FIG. 40 is a flowchart illustrating a time interleaving process according to an embodiment of the present invention.

A time interleaver according to an embodiment of the present invention can setup initial values (S67000).

Then, the time interleaver according to an embodiment of the present invention can perform writing operation on actual FEC blocks in consideration of virtual FEC blocks (S67100).

The time interleaver according to an embodiment of the present invention can generate a temporal TI address (S67200).

Subsequently, the time interleaver according to an embodiment of the present invention can evaluate the availability of the generated TI reading address (S67300). Then, the time interleaver according to an embodiment of the present invention can generate a final TI reading address (S67400).

The time interleaver according to an embodiment of the present invention can read the actual FEC blocks (S67500).

Figure 41:
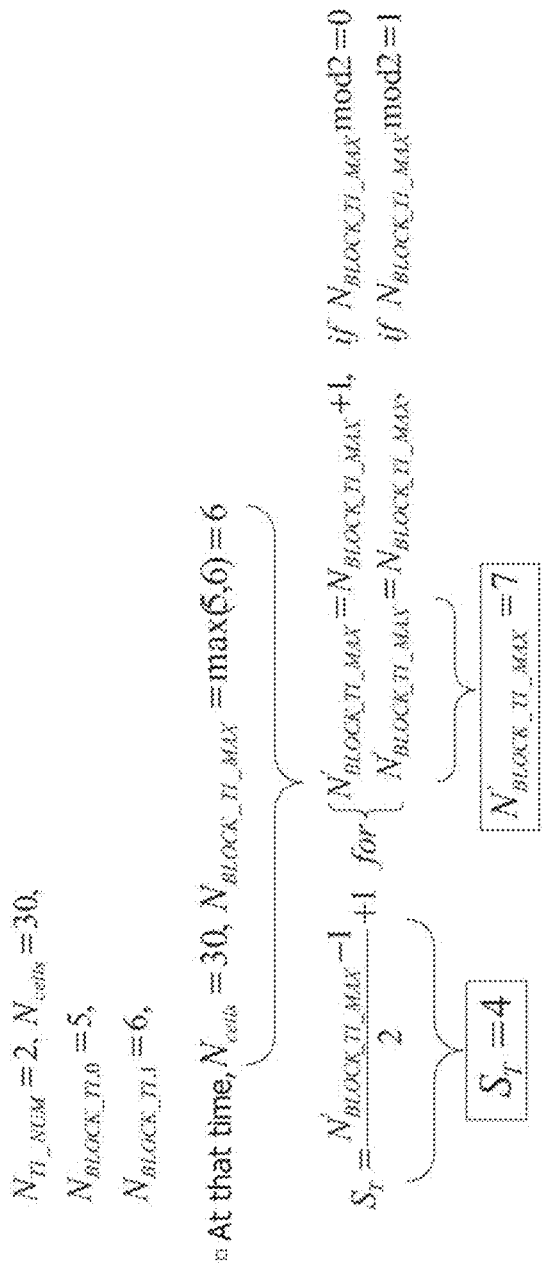
FIG. 41 shows equations representing a process of determining a shift value and a maximum TI block size according to an embodiment of the present invention.
Figure 48:
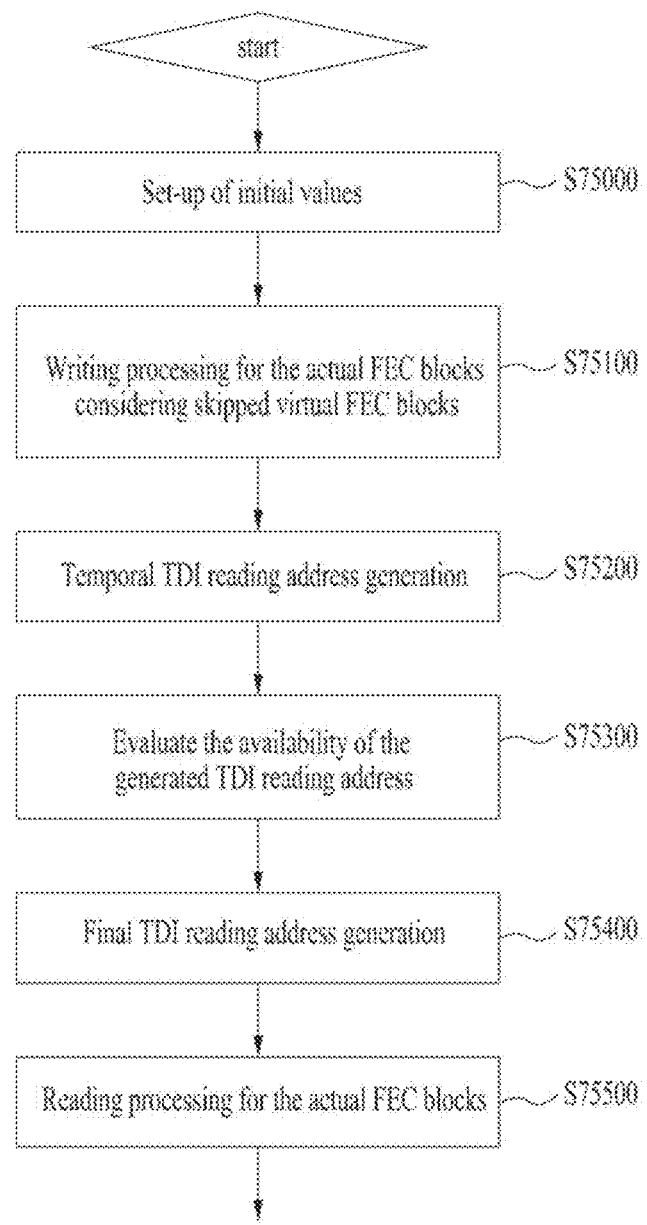
FIG. 48 is a flowchart illustrating a time deinterleaving process according to an embodiment of the present invention.
Figure 49:
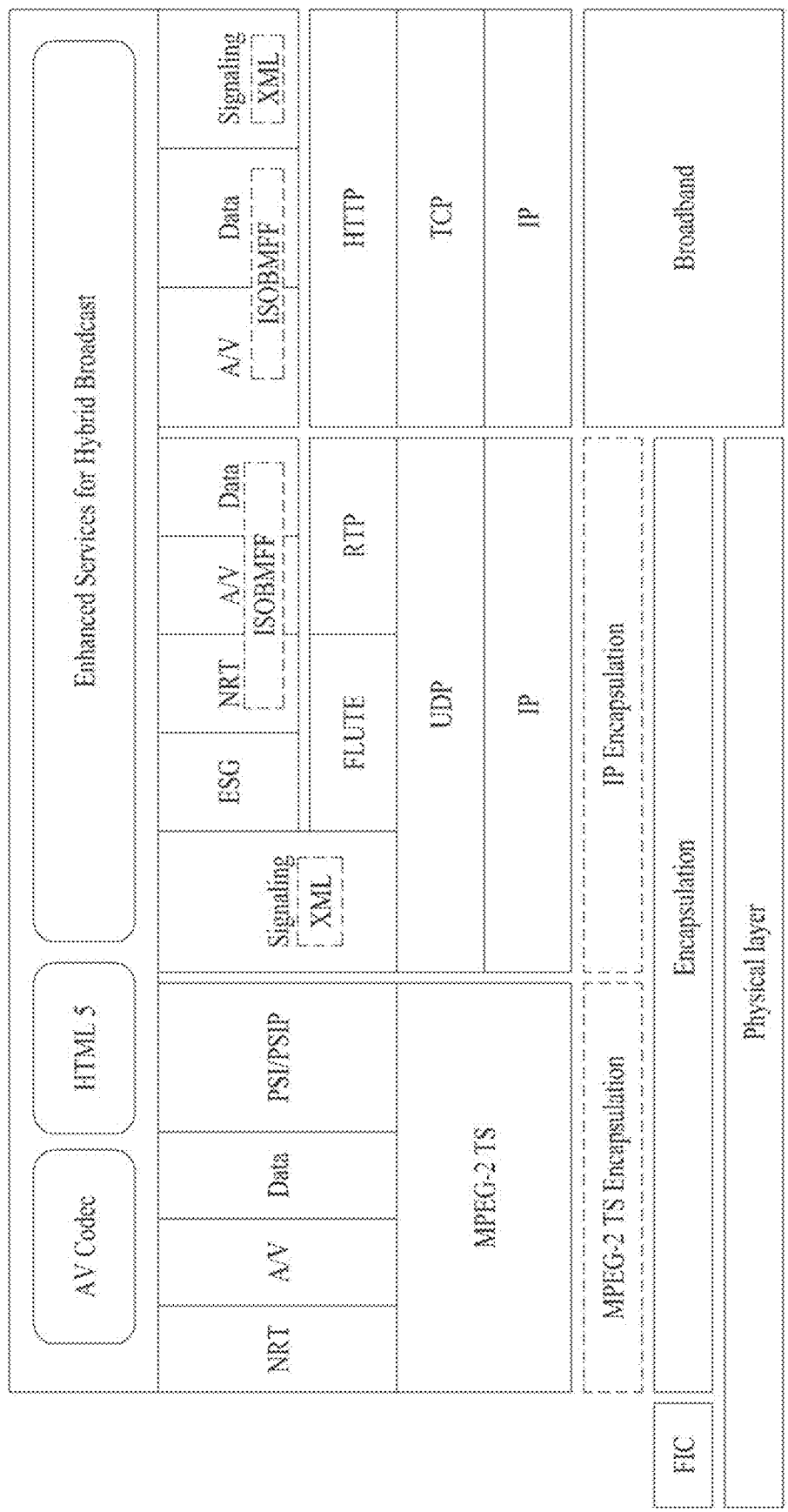
FIG. 49 is a diagram showing a protocol stack supporting a broadcast service according to one embodiment of the present invention.
Figure 50:
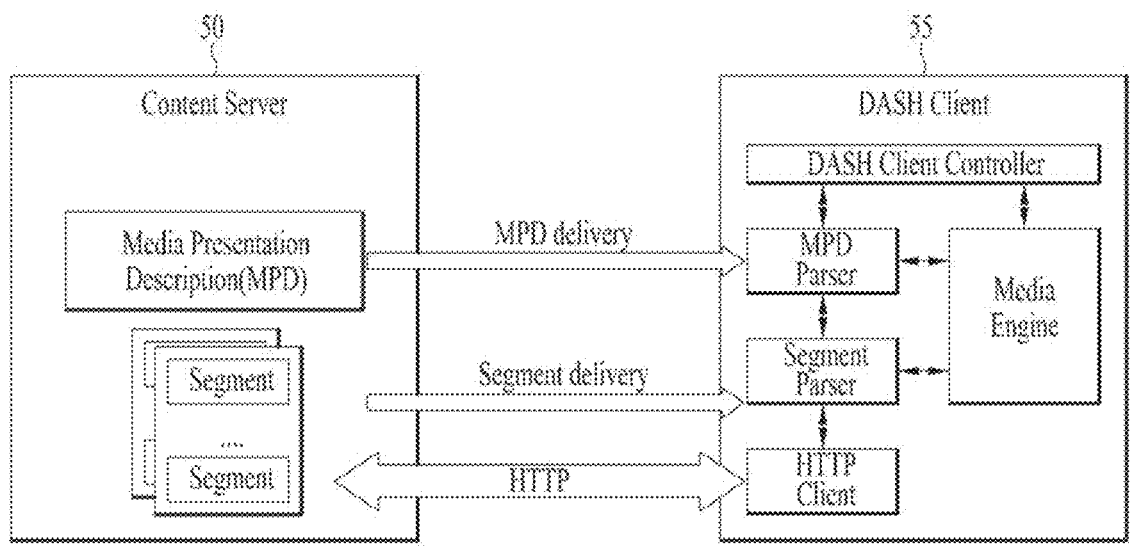
FIG. 50 is a diagram showing a transport layer of a broadcast service according to one embodiment of the present invention.
Figure 51:
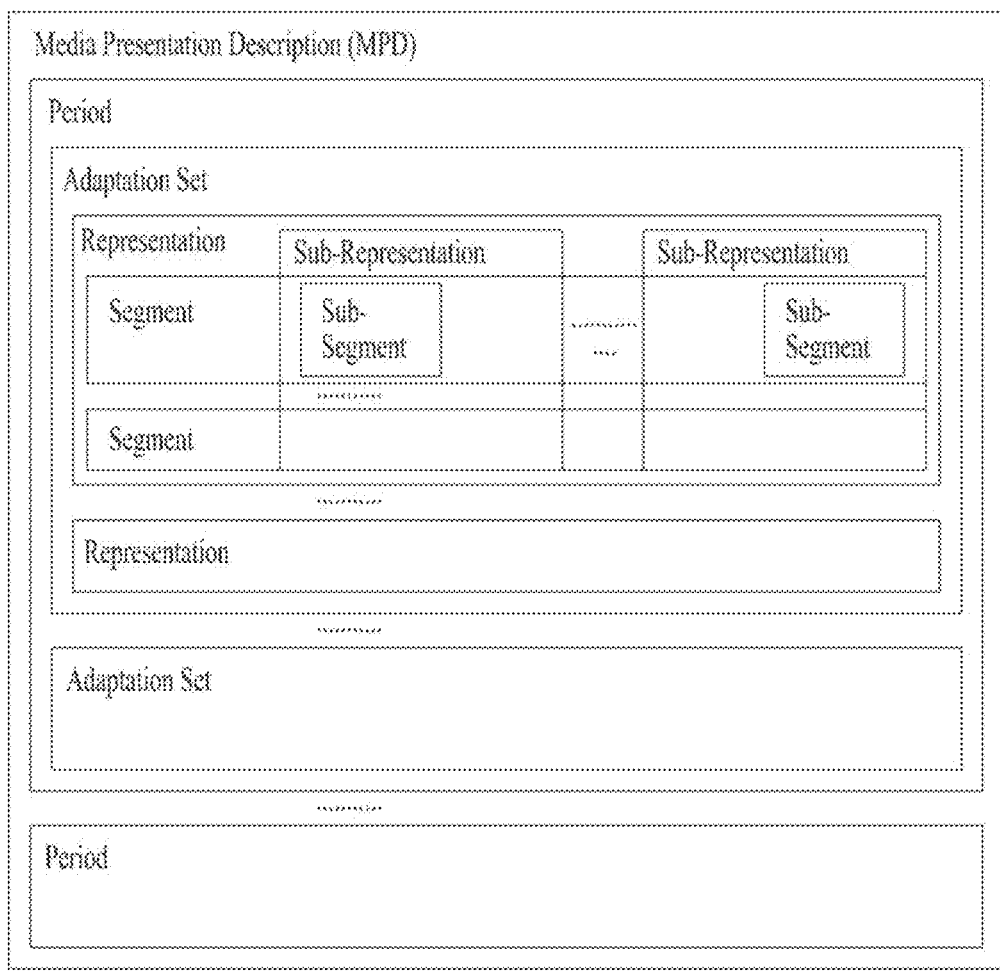
FIG. 51 is a diagram showing the configuration of a media content transmission and reception system via an IP network according to one embodiment of the present invention.
Figure 52:
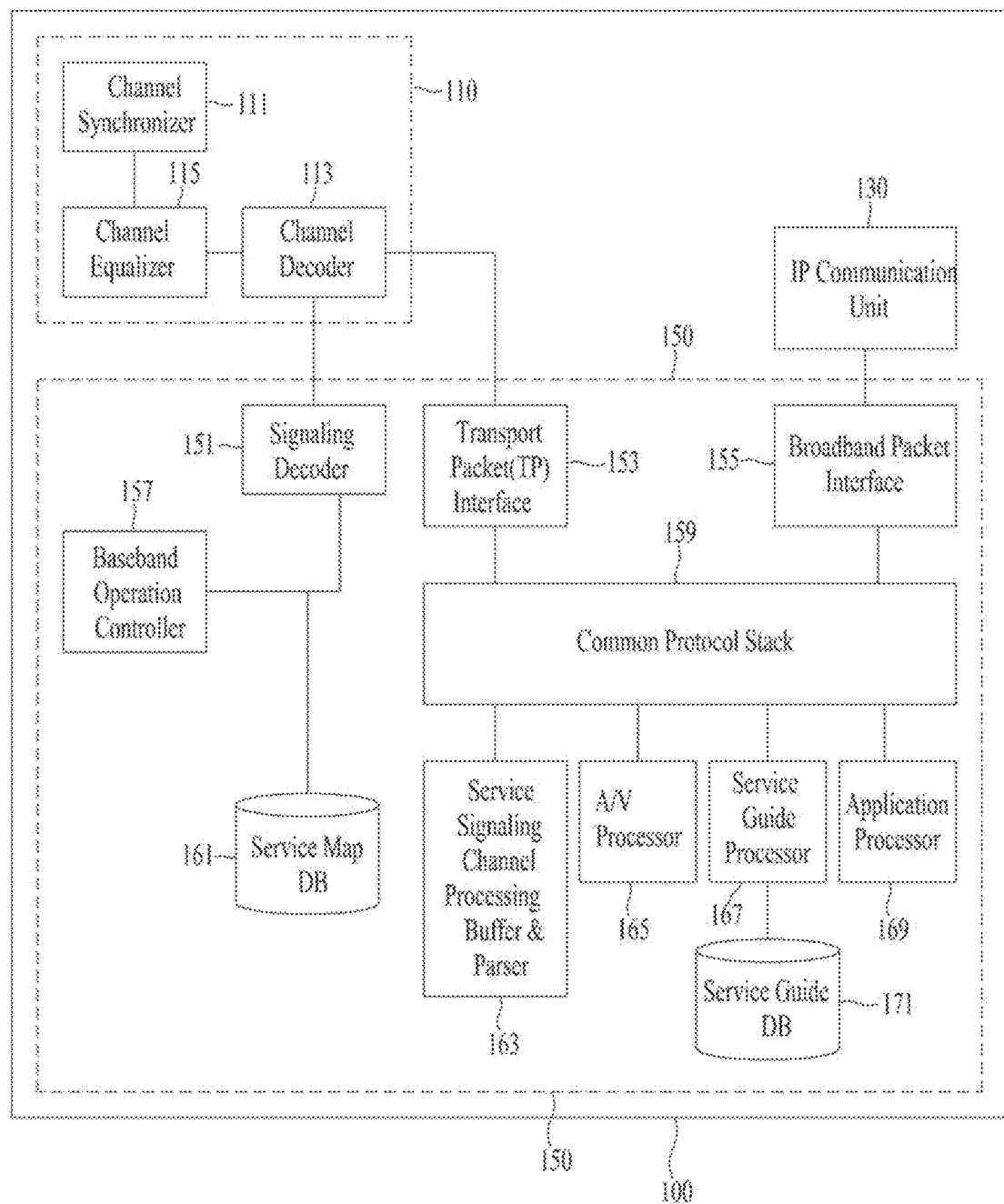
FIG. 52 is a diagram showing the structure of a media presentation description (MPD) according to one embodiment of the present invention.
Figure 53:
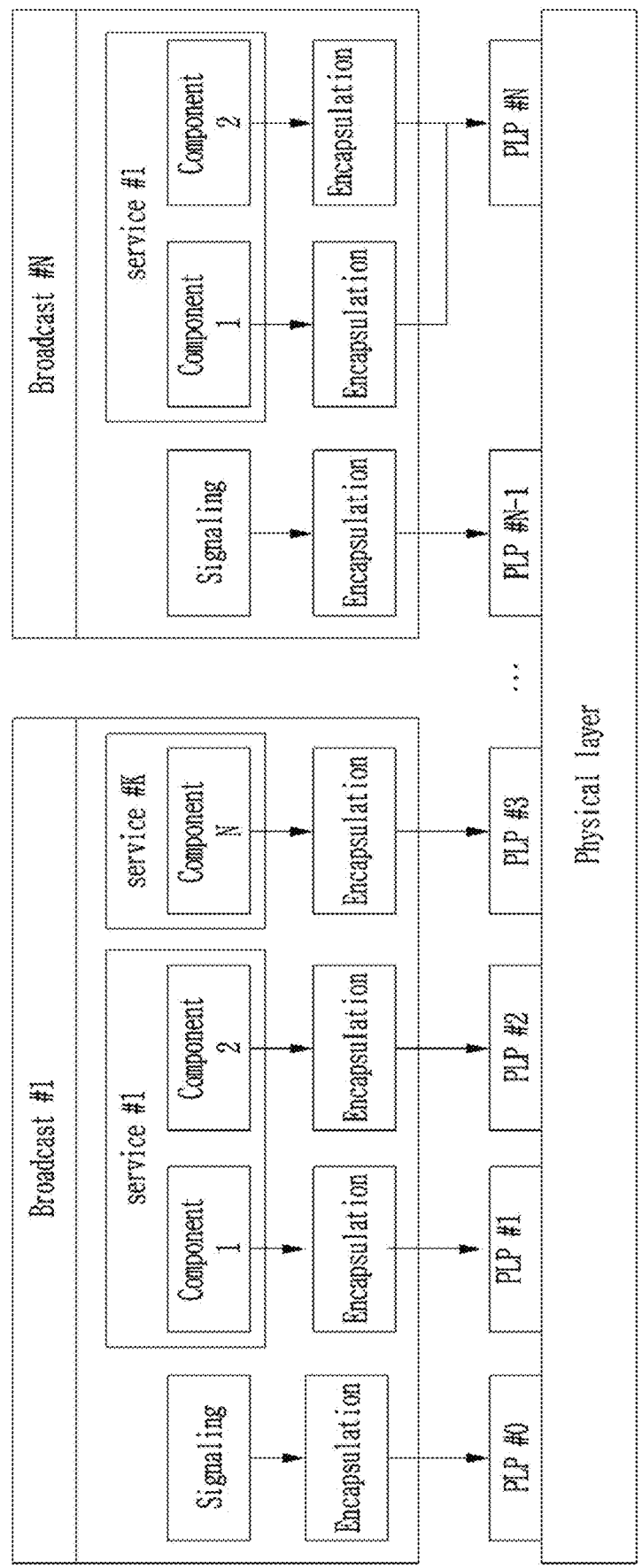
FIG. 53 is a diagram showing the configuration of a broadcast reception apparatus according to one embodiment of the present invention.
Figure 54:
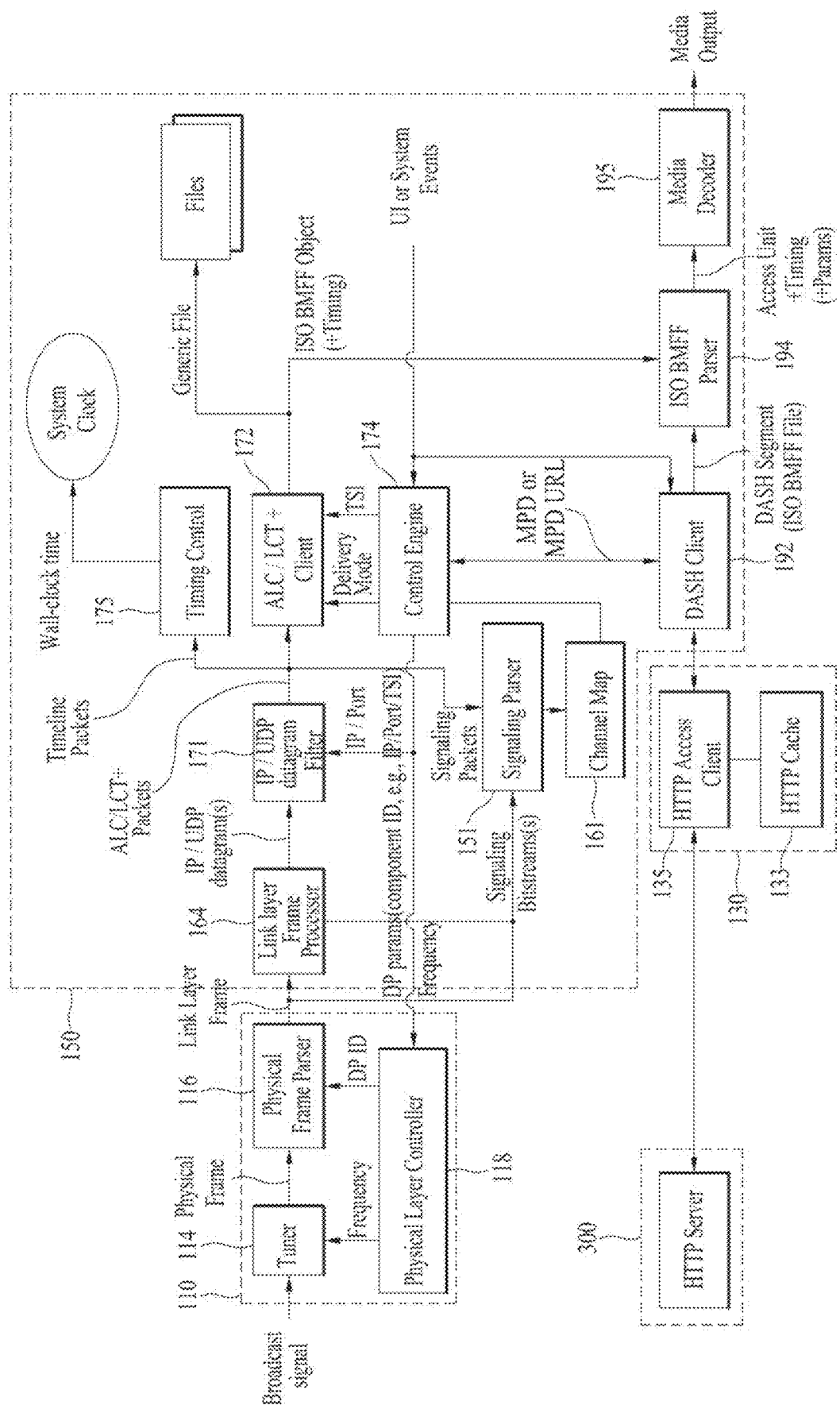
FIGS. 54 to 55 are diagrams showing the configuration of a broadcast reception apparatus according to another embodiment of the present invention.
Figure 55:
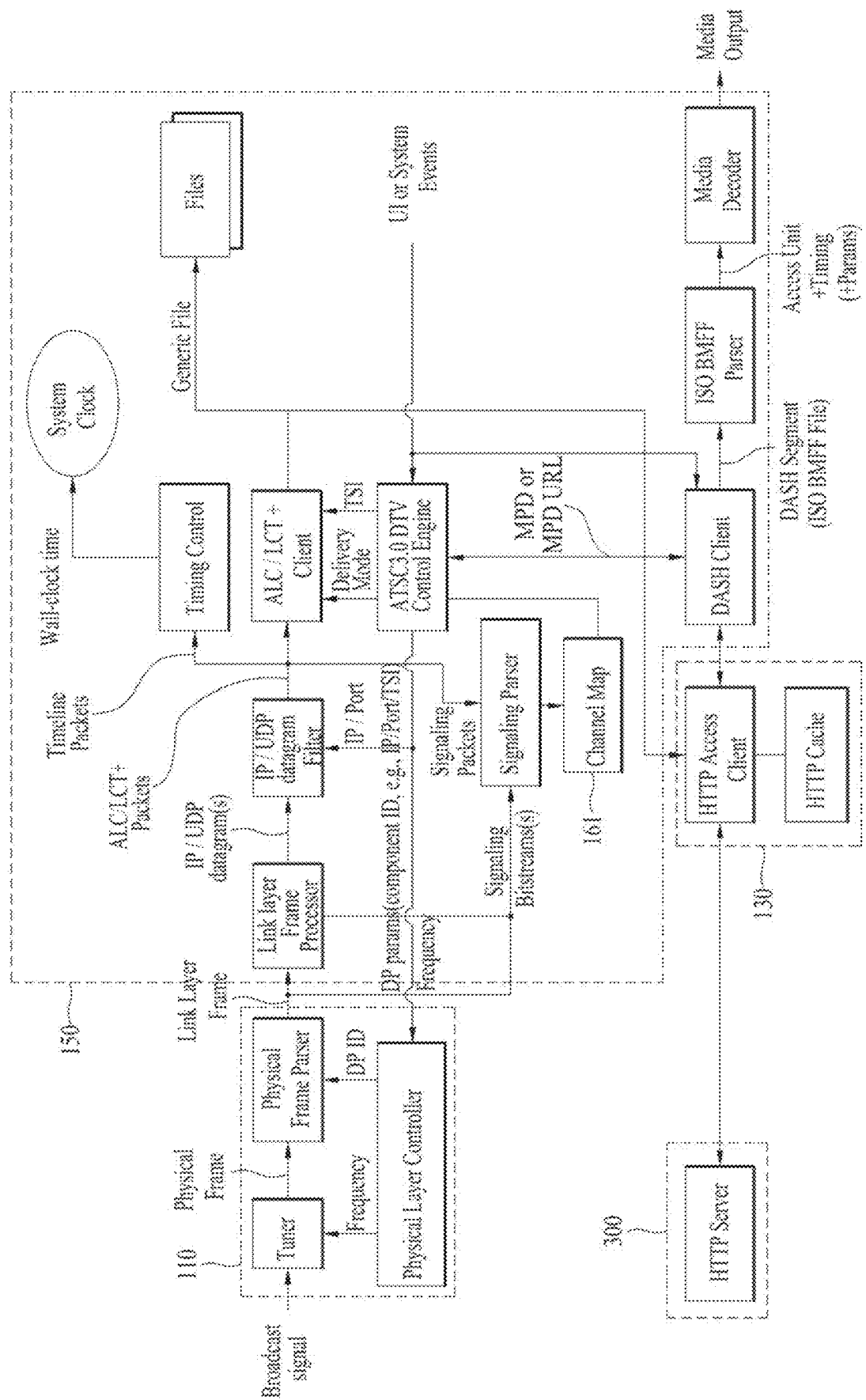
Figure 56:
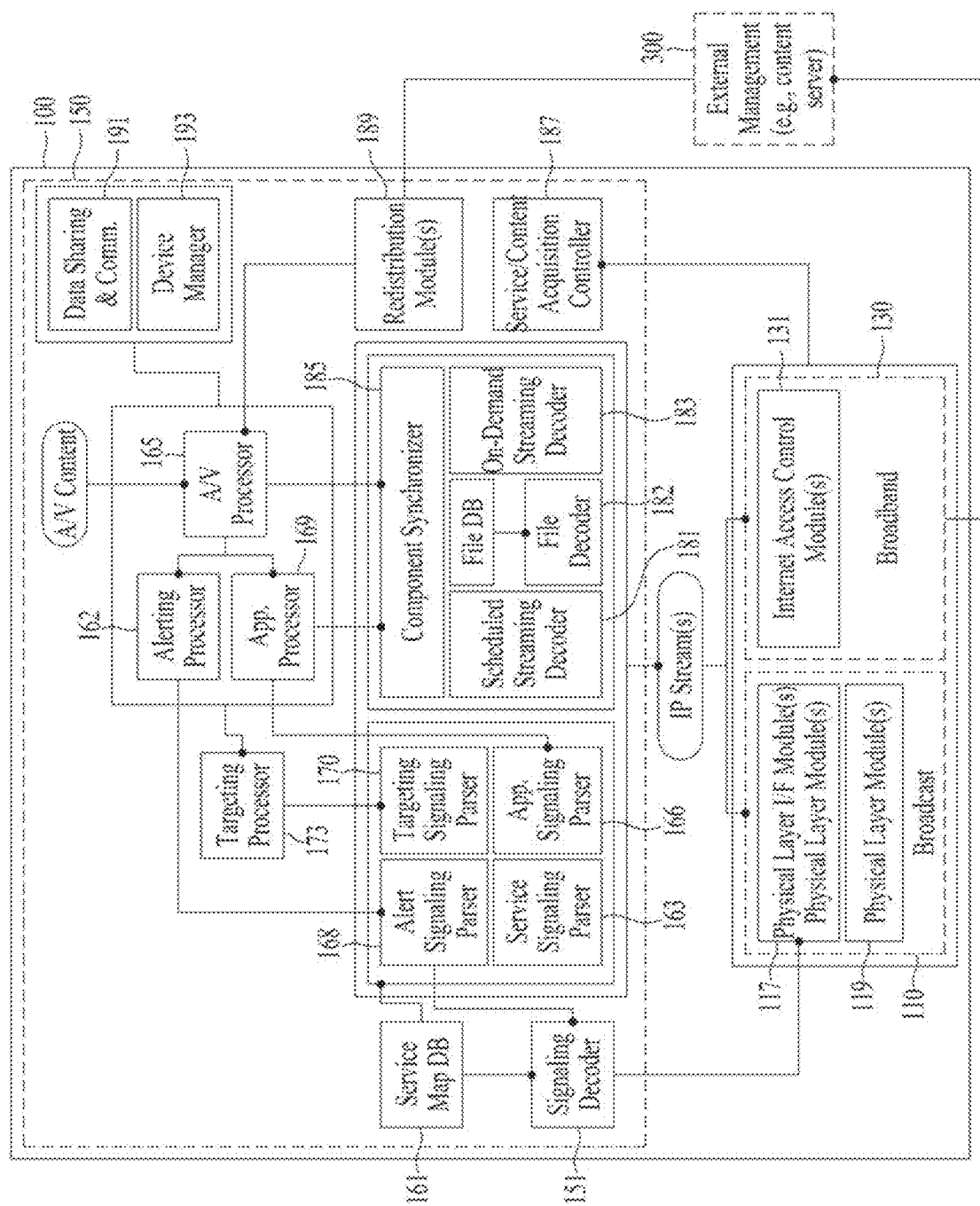
FIG. 56 is a diagram showing the configuration of a broadcast reception apparatus according to another embodiment of the present invention.
Figure 57:
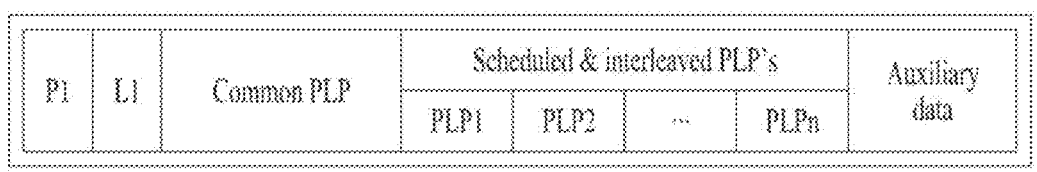
FIG. 57 is a diagram showing a broadcast transport frame according to one embodiment of the present invention.
Figure 58:
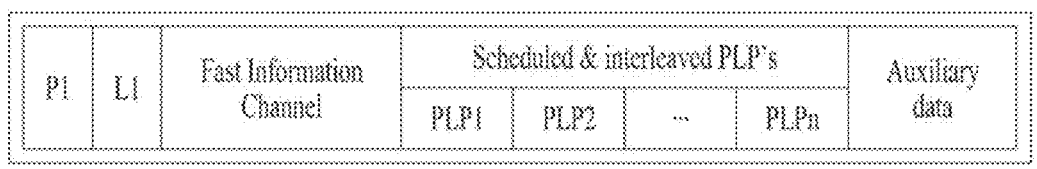
FIG. 58 is a diagram showing a broadcast transport frame according to another embodiment of the present invention.
Figure 59:
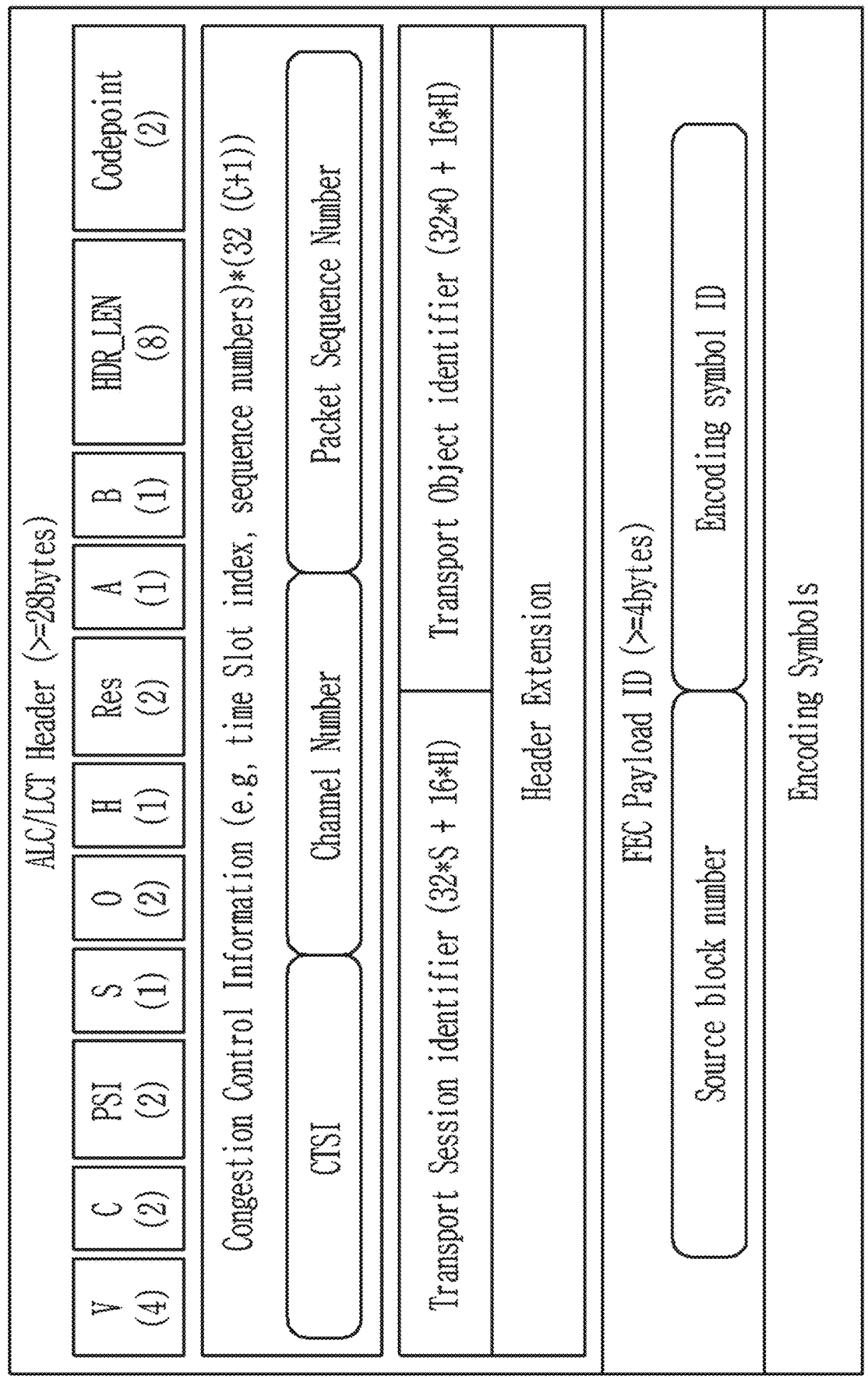
FIG. 59 is a diagram showing the configuration of a transport packet according to one embodiment of the present invention.
Figure 71:
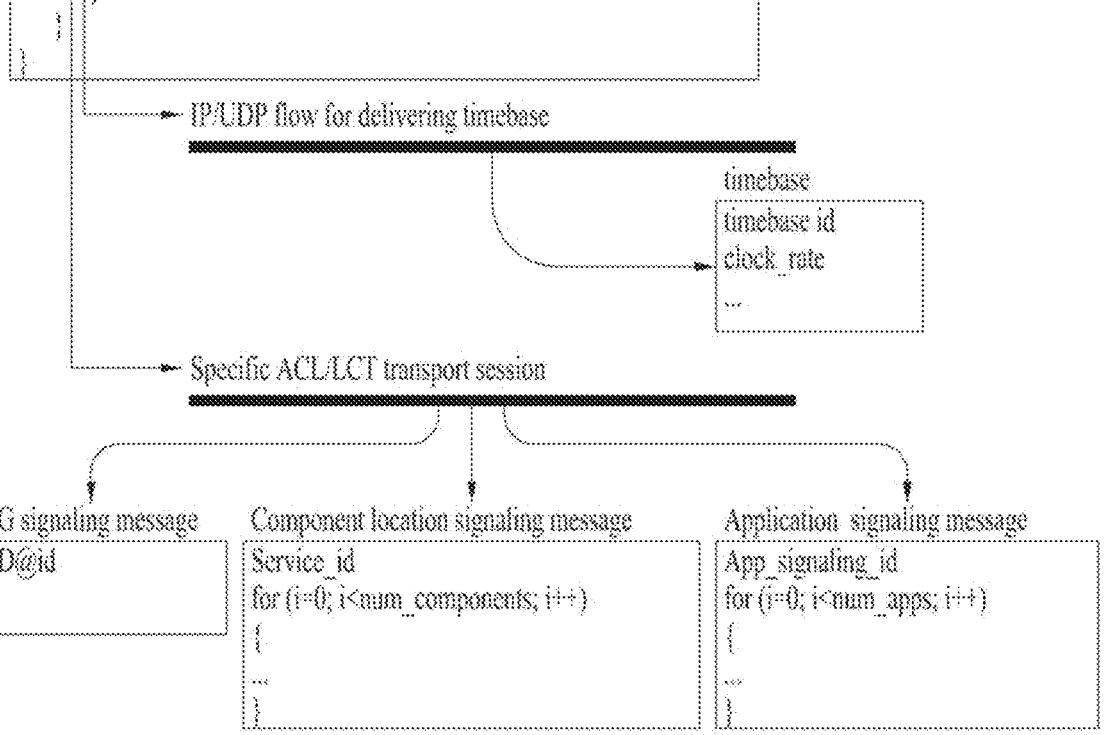
FIG. 71 is a diagram showing a process of acquiring a timebase and a service signaling message in the embodiments of FIGS. 62 to 70.
Figure 79:
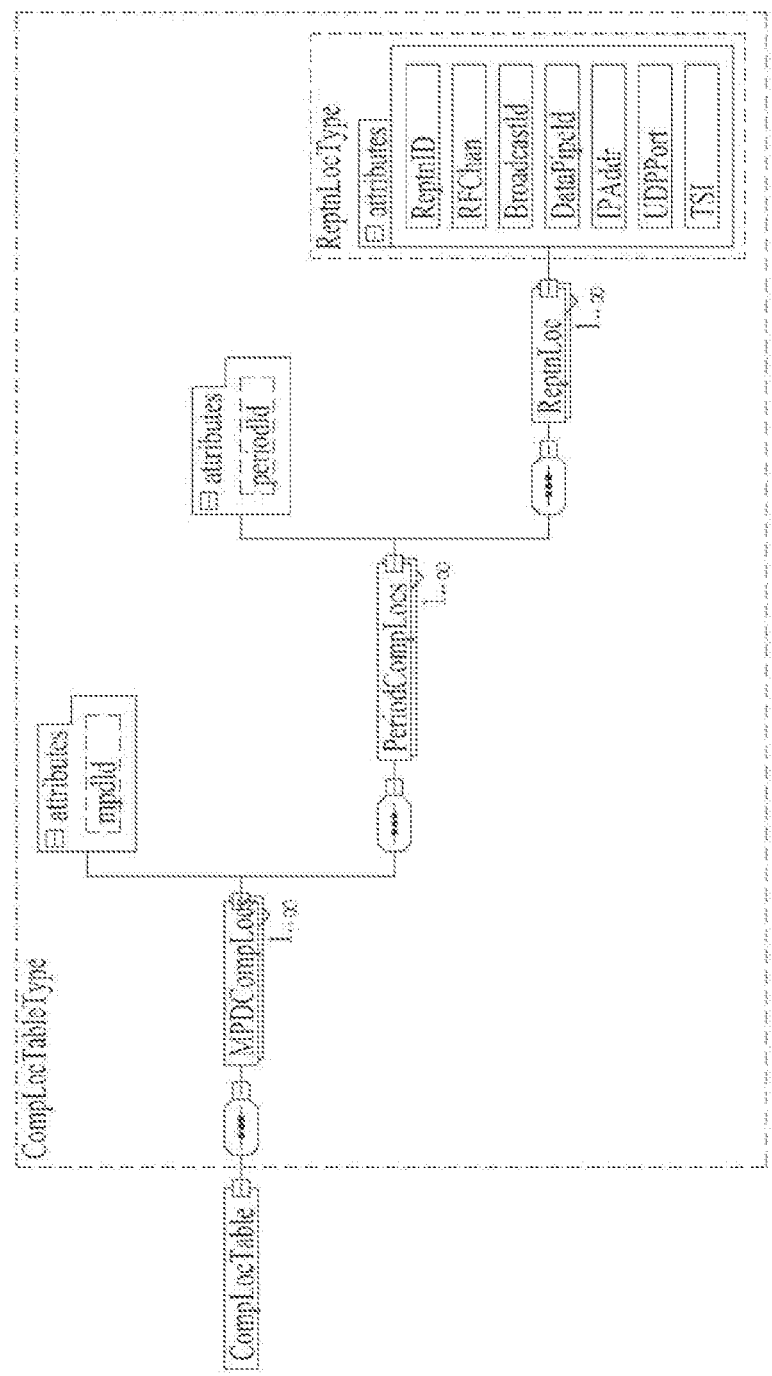
FIG. 79 is a diagram showing the configuration of the component location signaling of FIG. 78.

FIG. 41 shows equations representing a process of determining a shift value and a maximum TI block size according to an embodiment of the present invention.

The figure shows an embodiment in which the number of TI groups is 2, the number of cells in a TI group is 30, the number of FEC blocks included in the first TI group is 5 and the number of FEC blocks included in the second TI block is 6. While a maximum number of FEC blocks is 6, 6 is an even number. Accordingly, a maximum number of FEC blocks, which is adjusted in order to obtain the shift value, can be 7 and the shift value can be calculated as 4.

FIGS. 83 to 85 illustrate a TI process of the embodiment described before.

Figure 42:
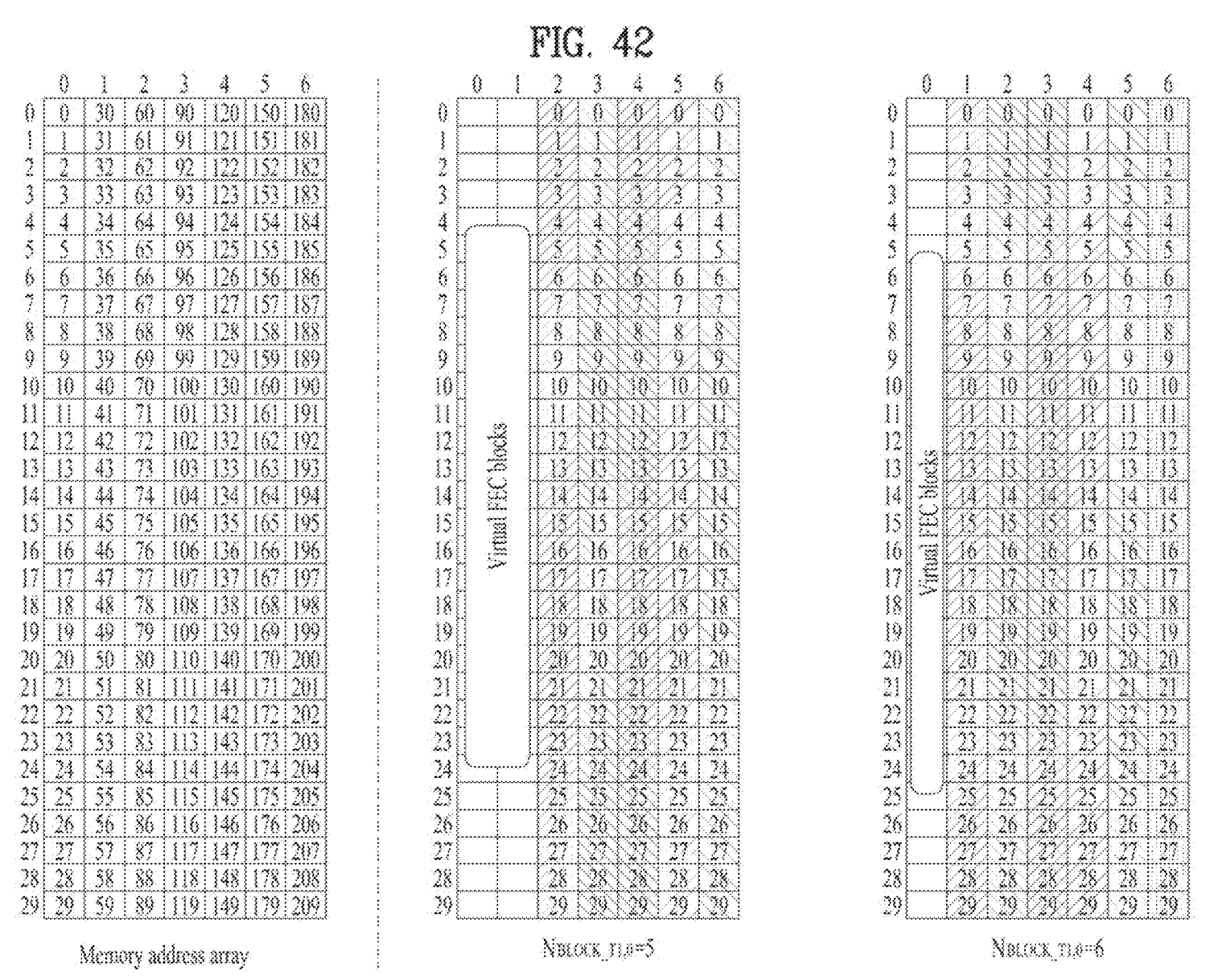

FIG. 42 illustrates writing operation according to an embodiment of the present invention.

FIG. 42 shows writing operation for the two TI groups described before.

A block shown in the left side of the figure represents a TI memory address array and blocks shown in the right side of the figure illustrate writing operation when two virtual FEC blocks and one virtual FEC block are respectively inserted into two continuous TI groups. Since the adjusted maximum number of FEC blocks is 7, as described above, two virtual FEC blocks are inserted into the first TI group and one virtual FEC block is inserted into the second TI group.

FIG. 43 illustrates reading operation according to an embodiment of the present invention.

A block shown in the left side of the figure represents a TI memory address array and blocks shown in the right side of the figure illustrate reading operation when two virtual FEC blocks and one virtual FEC block are respectively inserted into two continuous TI groups. In this case, reading operation can be performed on the virtual FEC blocks in the same manner as the reading operation performed on actual FEC blocks.

Figure 44:
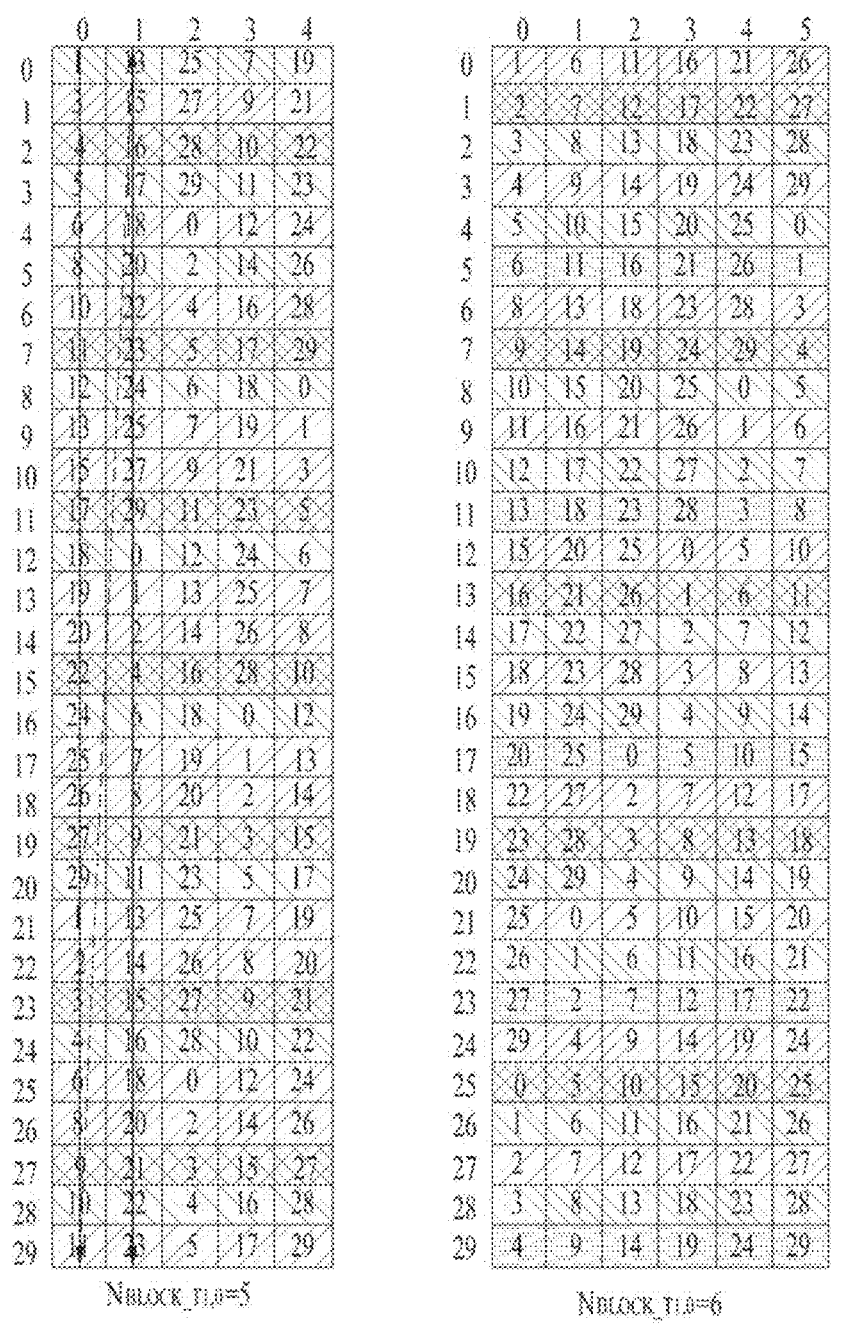

FIG. 44 illustrates a result of skip operation in reading operation according to an embodiment of the present invention.

As shown in the figure, virtual FEC blocks can be skipped in two TI groups.

FIGS. 86 to 88 illustrate time deinterleaving corresponding to a reverse of TI described before.

Figure 45:
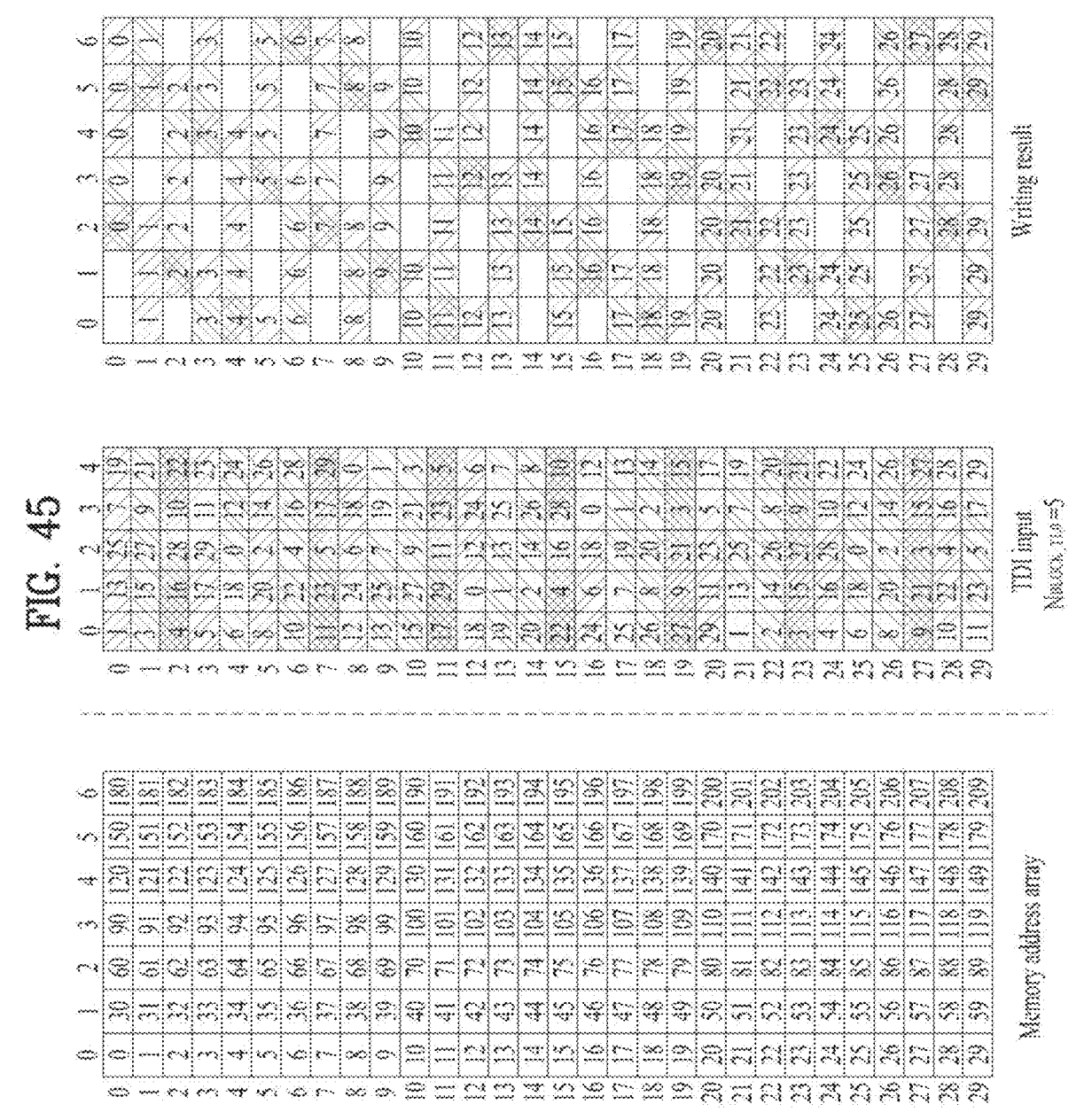

Specifically, FIG. 45 illustrates time deinterleaving for the first TI group and FIG. 46 illustrates time deinterleaving for the second TI group.

FIG. 45 shows a writing process of time deinterleaving according to an embodiment of the present invention.

A left block in the figure shows a TI memory address array, a middle block shows the first TI group input to a time deinterleaver and a right block shows a writing process performed in consideration of virtual FEC blocks that are skipped with respect to the first TI group.

As shown in the figure, two virtual FEC blocks skipped during TI can be restored for correct reading operation in the writing process. In this case, the positions and quantity of the skipped two virtual FEC blocks can be estimated through an arbitrary algorithm.

FIG. 46 illustrates a writing process of time deinterleaving according to another embodiment of the present invention.

A left block in the figure shows a TI memory address array, a middle block shows the second TI group input to the time deinterleaver and a right block shows a writing process performed in consideration of virtual FEC blocks that are skipped with respect to the second TI group.

As shown in the figure, one virtual FEC block skipped during TI can be restored for correct reading operation in the writing process. In this case, the position and quantity of the skipped one virtual FEC block can be estimated through an arbitrary algorithm.

FIG. 47 shows equations representing reading operation of time deinterleaving according to another embodiment of the present invention.

A TDI shift value used in the receiver can be determined by a shift value used in the transmitter, and skip operation can skip virtual FEC blocks in reading operation, similarly to skip operation performed in the transmitter.

FIG. 91 is a diagram showing the configuration of the binary format of a Service_Mapping_Table according to one embodiment of the present invention.

One embodiment of the present invention may provide a service signaling method when a ROUTE protocol and/or an MMP protocol for transmitting a real-time object based on a session is used. The service mapping table according to one embodiment of the present invention may include service signaling information in a broadcast system according to the ROUTE protocol and/or the MMT protocol. The service mapping table according to one embodiment of the present invention may be referred to as user service bundle description.

The service mapping table according to one embodiment of the present invention may include a Signaling_id field, a Signaling_length field, a Protocol_version field, a Broadcast_id field, a Version_number field, an Ip_version_flag field, a Signaling_data_type field, an expiration field, a Fragment_number field, a Last_fragment_number field, a Num_services field, a Service_id field, a Service_name_length field, a Service_name field, a Channel_number field, a service_category field, a Service_status field, an SP_indicator field, a Num_route_sessions field, a Source_ip field, a Destination_ip field, a Port field, a Num_Isid_tsi field and an Lsid_delivery_tsi field.

The Signaling_id field indicates the ID indicating that this table is a service mapping table (SMT).

The Signaling_length field indicates the length of the section after the SMT header.

The Protocol_version field indicates the version information of the signaling protocol.

The Broadcast_id field indicates a unique ID of the broadcast.

The Version_number field indicates the version number of the signaling data, that is, the version information of this table.

The Ip_version_flag field indicates the flag information indicating the IP described in this table is v4 or v6. When the value of this field is 0 by default, the IP is v4 and, when the value of this field 1, the IP is v6.

The Signaling_data_type field indicates whether the type of the signaling data included in this table is binary or xml.

The expiration field indicates the valid period of this table.

The Fragment_number field indicates the fragment number of this table when all signaling data is fragmented and transmitted. Here, the fragment number may be referred to as a section number.

The Last_fragment_number field indicates the number of the last fragment when all signaling data is fragmented and transmitted. Here, the last fragment number may be referred to as a last section number.

The Num_services field indicates the number of services transmitted in the SMT.

The Service_id field indicates the unique identifier of the service. According to one embodiment of the present invention, this field may identify the next generation broadcast service such as ATSC 3.0.

The Service_name_length field indicates the length of the service name.

The Service_name field indicates the name of the service.

The Channel_number field indicates the frequency actually used to transmit the service. This field may include a major channel number and/or a minor channel number.

The service_category field indicates the category of the service. According to one embodiment of the present invention, the category indicated by this field may include Basic TV, Basic Radio, RI service, Service Guide, Emergency Alert, etc. Here, the Basic TV may include a linear A/V service, the Basic radio may include a linear audio only service and the RI service may include an App-based service.

The service_status field indicates the status of the service. For example, when the value of this field is 0, this may indicate that the service is Inactive, and, when the value of this field is 1, this may indicate that the service is Active. When the value of this field is 3, this may indicate that the service is Shown and, when the value of this field is 4, this may indicate that the service is Hidden.

The SP_indicator field indicates whether service protection is applied to the service or one or more components in the service.

The Num_route_sessions field indicates the number of ROUTE sessions for transmitting the service.

The Source_ip field indicates the source IP address of the route session.

The Destination_ip field indicates the destination IP address of the route session.

The Port field indicates the destination port of the route session.

The Num_lsid_tsi field indicates the number of LCT session instance descriptions (LSIDs) transmitted within the route session. According to one embodiment of the present invention, the LSID may be referred to as Service-based transport session instance description (S-TSID).

The Lsid_delivery_tsi field indicates the value of the transport session identifier (TSI) for transmitting the LSID. According to one embodiment of the present invention, this field may include information for identifying the LSID having the information on the ROUTE session and/or the LCT session for transmitting the service.

FIG. 92 is a diagram showing the configuration of the XML format of a Service_Mapping_Table according to one embodiment of the present invention.

According to one embodiment of the present invention, a service mapping table (SMT) element which is a root element includes a service element and the service element includes a Name element, a Category element, a RouteSessionInfo element, a serviced attribute, an RFChan attribute, a serviceStatus attribute and an SPindicator attribute, a RouteSessionInfo element includes a sourceIPAddr element, a destinationIAddr element, a Port element and/or an lsid_delivery_tsi element, and the sourceIPAddr element and/or the destinationIPAddr element may include a version attribute. The above-described elements and/or attributes may have the same meanings as the corresponding fields of the above-described fields of the previous drawings.

Figure 93:
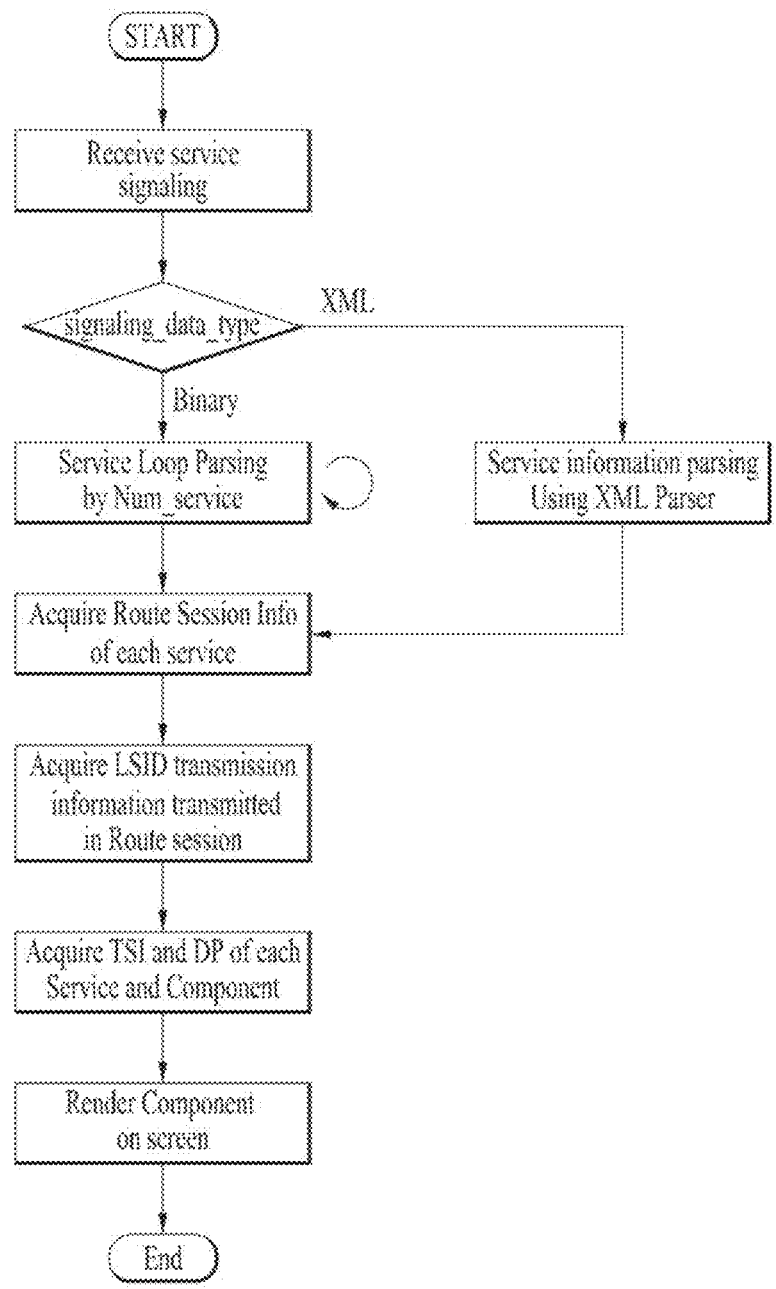
FIG. 93 is a diagram showing a process of receiving service signaling information included in a service mapping table according to one embodiment of the present invention.

FIG. 93 is a diagram showing a process of receiving service signaling information included in a service mapping table according to one embodiment of the present invention.

The reception apparatus according to one embodiment of the present invention may receive service signaling information included in the service mapping table (SL93010) and then check the signaling data type field included in the service signaling information to determine whether this information is in binary format or XML format (SL93020). When this information is in XML format, the reception apparatus may parse the service signaling information using an XML parser (SL93080) and, when this information is in binary format, the reception apparatus may parse the service signaling information by the number of services indicated by the Num_service field (SL93030). Thereafter, the reception apparatus may acquire the Route Session info field of each service (SL93040) and acquire LSID transmission information transmitted in the route session (SL93050). Hereinafter, the reception apparatus may acquire TSI and/or DP information of each service and/or component (SL93060) and render the components configuring the service on the display using the TSI and/or DP information (SL93070).

FIG. 94 is a diagram showing the configuration of service signaling according to one embodiment of the present invention.

One embodiment of the present invention may provide service signaling based on a ROUTE protocol and/or an MMT protocol. The service signaling according to one embodiment of the present invention may be provided in XML and/or binary format. Here, the service signaling may mean an SMT, a USD and/or an S-TSID.

The service signaling according to one embodiment of the present invention includes one or more service elements and one service element may include id, serviceType, serviceName, channelNumber, ROUTESessionInfo and/or TimebaseLocation information as attributes and/or sub elements. The id, the serviceType and/or the channelNumber information were described above.

The ROUTESessionInfo information according to one embodiment of the present invention may include id, version, sourceIP, destinationIP, port, DP_ID and/or LSIDInfo as attributes and/or sub elements. The id information indicates the identifier of the ROUTE session for transmitting the service. The version information indicates the version information of the ROUTE session for transmitting the. In one embodiment of the present invention, when the id is identical and the version information increases, it may be determined that the information on the ROUTE session has been changed. The sourceIP information indicates the source IP address of the ROUTE session. The destinationIP information indicates the destination IP address of the ROUTE session. The port information indicates the destination port of the ROUTE session. The DP_ID information indicates the identifier of the data pipeline via which the ROUTE session is transmitted. Here, the data pipeline may have the same meaning as the physical layer pipe. The LSIDInfo information may indicate the information on the LSID transmitted in the ROUTE session and will be described in detail below with respect to the next drawing.

According to one embodiment of the present invention, the ROUTESessioninfo information may be included in the LSID information.

The TimebaseLocation information may indicate the location where the timebase can be acquired. Here, the timebase may indicate metadata for setting a timeline for synchronizing the components included in the service. The TimebaseLocation information may include deliveryMode and/or BootstrapInfo information as attributes and/or sub elements. The deliveryMode information may indicate the delivery mode of the timebase. The BootstrapInfo information may include bootstrap information of the timebase according to the delivery mode.

FIG. 95 is a diagram showing the configuration of LSIDInfo information and DeliveryInfo information according to one embodiment of the present invention.

The DeliveryInfo information L95010 according to one embodiment of the present invention may include deliveryMode, DeliveryInfo and/or LSID information as attributes and/or sub elements. The deliveryMode information may indicate the mode in which the LSID is transmitted. The mode in which the LSID is transmitted according to one embodiment of the present invention may include embedded, via-broadcast and/or via-broadband modes. The DeliveryInfo information may indicate the transport mode of the LSID when the mode indicated by the deliveryMode information is not the embedded mode and a detailed description thereof will be given in the next paragraph. The LSID information may indicate the LSID information transmitted in the ROUTE session when the mode indicated by the deliveryMode information is the embedded mode.

The DeliveryInfo information L95020 according to one embodiment of the present invention may include ROUTE_session_id, sourceIP, destinationIP, destinationPort, tsi, URL and DP_ID information as attributes and/or sub elements. The ROUTE_session_id information may indicate the identifier of the ROUTE session via which the LSID is transmitted and the value of this information being 0 may indicate that the LSID is transmitted in the same session as the ROUTE session described in the high-level element of this information. The sourceIP information may indicate the sourceIP address of the ROUTE session via which the LSID is transmitted. The destinationIP information may indicate the destination IP address of the ROUTE session via which the LSID is transmitted. The destinationPort information may indicate the destination port number of the ROUTE session via which the LSID is transmitted. The tsi information may indicate information for identifying the LCT session via which the LSID is transmitted. The URL information may indicate the URL where the LSID information can be acquired. The DP_ID information may indicate the data pipeline identifier of the physical layer for transmitting the LSID information.

FIG. 96 is a diagram showing the configuration of service signaling according to another embodiment of the present invention.

Referring to this figure, one embodiment of the present invention may provide a service signaling method when the ROUTE session via which service components are transmitted is transmitted via different DPs according to components, unlike the embodiment shown in FIG. 94. In this case, the service signaling according to one embodiment of the present invention may not include DP_ID information included in the above-described embodiment.

FIG. 97 is a diagram showing the configuration of an LSID according to one embodiment of the present invention.

The LSID according to one embodiment of the present invention may be included under the ROUTESessionInfo information according to the above-described embodiment of the present invention.

The LSID according to one embodiment of the present invention may include version information, validFrom information, expiration information and/or TransportService information as attributes and/or sub elements.

The version information may indicate the version information of this LSID. When this LSID is updated, the version of the LSID may increase. The reception LSID having a highest version number may correspond to the LSID of the currently valid version.

The validFrom information may indicate the valid date and time of this LSID information. This information may not exist and, when this information does not exist, the reception apparatus according to one embodiment of the present invention may assume that this LSID is valid.

The expiration information indicates the expiration date and time of this LSID information. This information may not exist and, when this information does not exist, the reception apparatus according to one embodiment of the present invention may assume that this LSID is permanently valid or that this LSID is valid until a new LSID having related expiration information is received.

The TransportSession information may provide information on an LCT transport session. The TransportSession information according to one embodiment of the present invention may include tsi information, DP_ID information, SourceFlow information and/or RepairFlow information as attributes and/or sub elements. The tsi information may indicate the identifier of the transport session. The DP_ID information may indicate the identifier of the DP via which the transport session is transmitted and the DP may have the same meaning as the PLP. The SourceFlow information may provide information in the source flow transmitted in this transport session. The RepairFlow information may provide information on the repair flow transmitted in this transport session.

Figure 98:
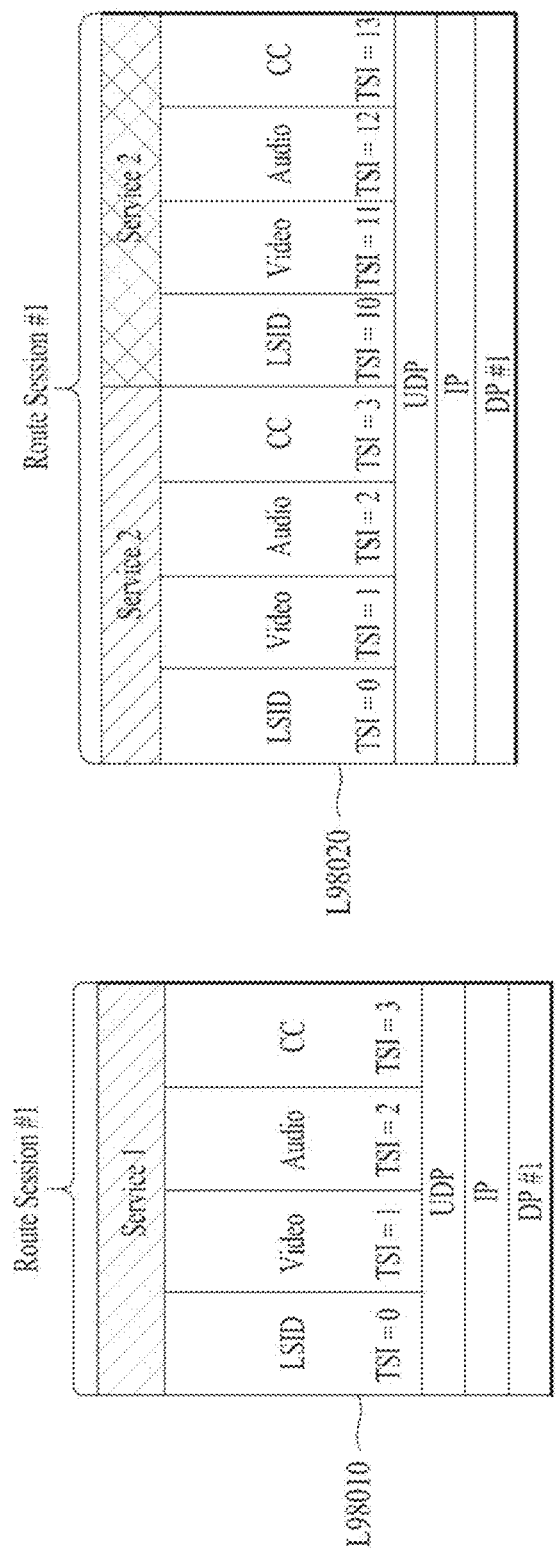
FIGS. 98 and 99 are diagrams showing a ROUTE session and a transmission method of an LSID according to one embodiment of the present invention.
Figure 99:
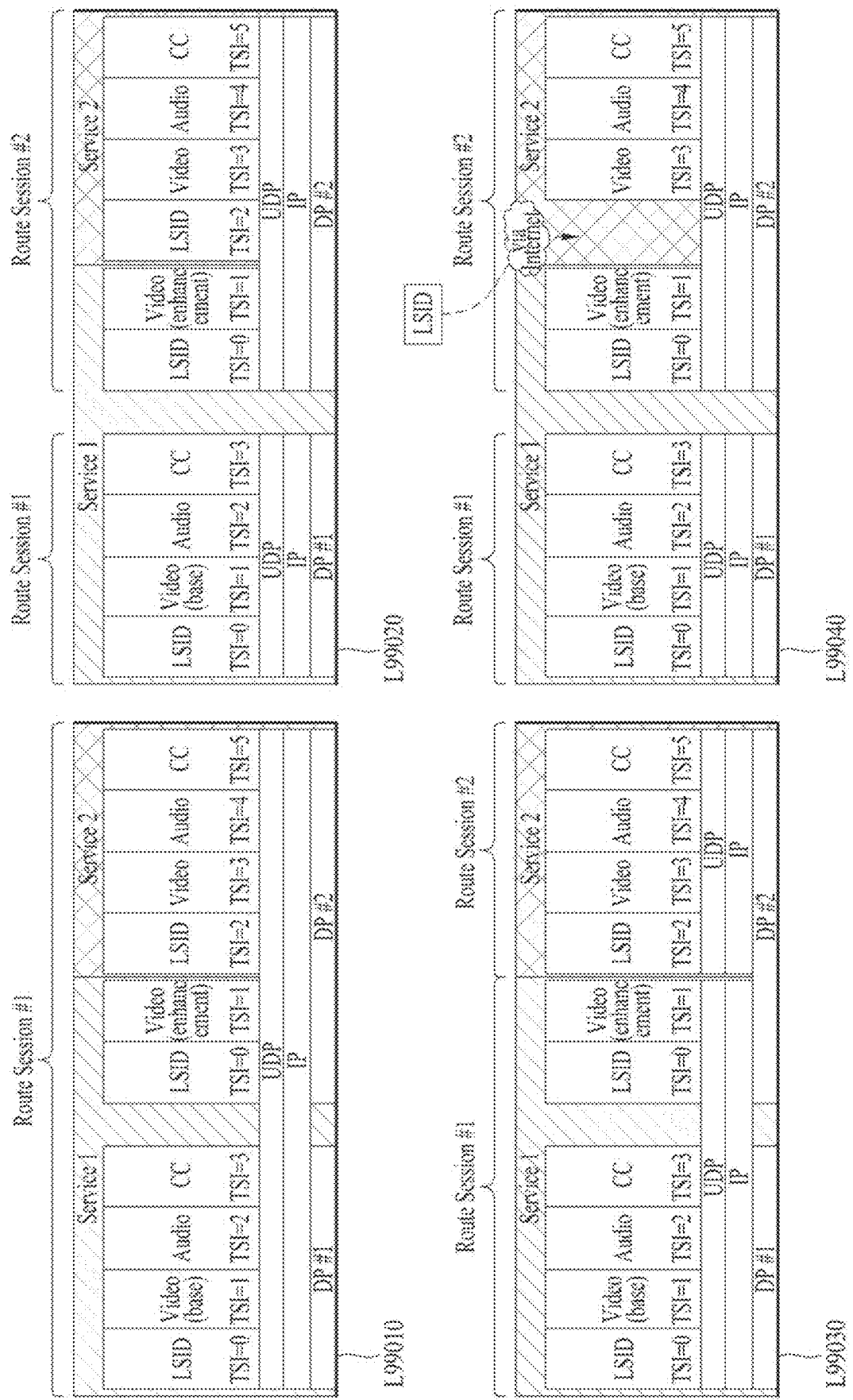

FIGS. 98 and 99 are diagrams showing a ROUTE session and a transmission method of an LSID according to one embodiment of the present invention.

According to one embodiment of the present invention, as shown in the drawing (L98010), Service 1 may be transmitted via ROUTE SESSION #1. Service 1 may include an LSID, a video component, an audio component and/or a CC component, each of which may be transmitted via an LCT session having TSI=0, 1, 2, 3. The LSID, video component, audio component and/or CC component included in Service 1 may be subjected to a UDP and IP packetization process and transmitted via DP #1.

According to another embodiment of the present invention, as shown in the drawing (L98020), Service 1 and Service 2 may be transmitted via ROUTE SESSION #1. Service 1 may include an LSID, a video component, an audio component and/or a CC component, each of which may be transmitted via an LCT session having TSI=0, 1, 2, 3. Service 2 may include an LSID, a video component, an audio component and/or a CC component, each of which may be transmitted via an LCT session having TSI=10, 11, 12, 13. The LSID, video component, audio component and/or CC component included in Service 1 and the LSID, video component, audio component and/or CC component included in Service 2 may be subjected to a UDP and IP packetization process and transmitted via DP #1.

According to another embodiment of the present invention, as shown in the drawing (L99010), Service 1 and Service 2 may be transmitted via ROUTE SESSION #1. Service 1 may include an LSID, a base video component, an enhancement video component, an audio component and/or a CC component. The LSID and the components may be transmitted via an LCT session having TSI=0, 1, 2, 3. Service 2 may include an LSID, a video component, an audio component and/or a CC component, each of which may be transmitted via an LCT session having TSI=2, 3, 4, 5. The LSID and the components may be packetized to packets having the same UDP port number and IP address. The IP packets including Service 1 may be transmitted via DP #1 and the IP packets including Service 2 may be transmitted DP #2. Here, the IP packets including the enhancement video component included in Service 1 may be transmitted via DP #2 and, at this time, the IP packet including the LSID for signaling Service 1 may be included in both DP #1 and DP #2 and transmitted.

According to another embodiment of the present invention, as shown in the drawing (L99020), the LSID, the base video component, the audio component and/or the CC component included in Service 1 may be transmitted via ROUTE SESSION #1. The LSID and the enhancement video component included in Service 1 and the LSID, the video component, the audio component and/or the CC component included in Service 2 may be transmitted via ROUTE SESSION #2. Accordingly, the LSID and the components transmitted via ROUTE SESSION #1 may be packetized to packets having the same UDP port number and IP address and transmitted via DP #1. The LSID and the components transmitted via ROUTE SESSION #2 may be packetized to packets having the same UDP port number and IP address and transmitted via DP #2.

According to another embodiment of the present invention, as shown in the drawing (L99030), the LSID, the base video component, the enhancement video component, the audio component and/or the CC component included in Service 1 may be transmitted via ROUTE SESSION #1. The LSID, the video component, the audio component and/or the CC component included in Service 2 may be transmitted via ROUTE SESSION #2. Accordingly, the LSID and the components transmitted via ROUTE SESSION #1 may be packetized to packets having the same UDP port number and IP address and the LSID and the components transmitted via ROUTE SESSION #2 may be packetized to packets having the same UDP port number and IP address. The LSID, the base video component, the audio component and/or CC component included in Service 1 may be transmitted via DP #1. The LSID and the enhancement video component included in Service 1 and the LSID, the video component, the audio component and/or the CC component included in Service 2 may be transmitted via DP #2.

Another embodiment of the present invention shown in the drawing L99040 is equal to the embodiment of the drawing (L99020) except that the LSID for signaling Service 2 may be transmitted via the Internet.

Figure 100:
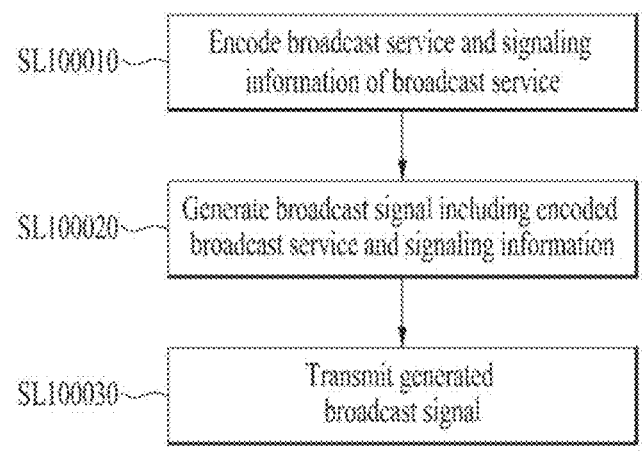
FIG. 100 is a diagram showing a method for transmitting broadcast signals according to one embodiment of the present invention.

FIG. 100 is a diagram showing a method for transmitting broadcast signals according to one embodiment of the present invention.

The broadcast signal transmission method according to one embodiment of the present invention may include encoding (SL100010) a broadcast service and signaling information of the broadcast service, generating (SL100020) a broadcast signal including the encoded broadcast service and signaling information and/or transmitting (SL100030) the generated broadcast signal. Here, the signaling information may have the same meaning as the above-described service signaling information. The transport session may mean a ROUTE session, an LCT session and/or a generic transport session. This was described above with reference to FIGS. 91, 92, 94 and 95.

According to another embodiment of the present invention, the signaling information may include service identification information for identifying the broadcast service, information indicating the name of the broadcast service and/or information indicating whether the broadcast service is active or inactive. Here, the information indicating whether the broadcast service is active or inactive may mean service_status information. This was described above with reference to FIGS. 91, 92, 94 and 95.

According to another embodiment of the present invention, the signaling information may include information for identifying information on a transport session for transmitting the broadcast service. Here, the information for identifying information on a transport session for transmitting the broadcast service may mean the above-described ROUTESessionInfo information, source_ip information, destination IP information, port information, lsid_delivery_tsi information, DeliveryInfo information, DeliveryInfo information, tsi information, URL information and/or DP_ID information. This was described above with reference to FIGS. 91, 92, 94 and 95.

According to another embodiment of the present invention, the signaling information may include information indicating the channel number of the broadcast service. This was described above with reference to FIGS. 91 and 92.

According to another embodiment of the present invention, the signaling information may include information indicating whether the format of the signaling information is binary or XML. This was described above with reference to FIGS. 91 and 93.

According to another embodiment of the present invention, the signaling information may include information on a transport session for transmitting the broadcast service, and the information on the transport session may include source IP address information of the transport session, destination IP address information of the transport session and/or destination port number information of the transport session. Here, the information on the transport session may mean the above-described ROUTESessionInfo information. This was described above with reference to FIGS. 91, 92, 94, 95 and 96.

Figure 101:
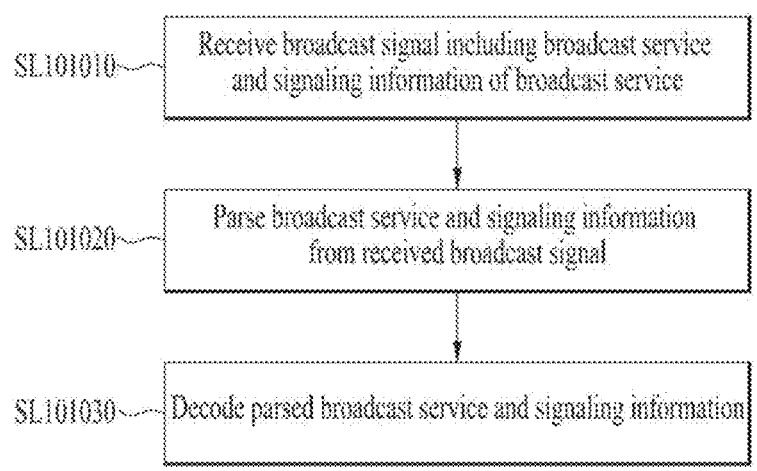
FIG. 101 is a diagram showing a method for receiving broadcast signals according to one embodiment of the present invention.

FIG. 101 is a diagram showing a method for receiving broadcast signals according to one embodiment of the present invention.

The broadcast signal reception method according to one embodiment of the present invention may include receiving (SL101010) a broadcast signal including a broadcast service and signaling information of the broadcast service, parsing (SL101020) the broadcast service and signaling information from the received broadcast signal and/or decoding (SL101030) the parsed broadcast service and signaling information. Here, the signaling information may have the same meaning as the above-described service signaling information. This was described above with reference to FIGS. 91, 92, 94 and 95.

According to another embodiment of the present invention, the signaling information may include service identification information for identifying the broadcast service, information indicating the name of the broadcast service and/or information indicating whether the broadcast service is active or inactive. Here, the information indicating whether the broadcast service is active or inactive may mean service_status information. This was described above with reference to FIGS. 91, 92, 94 and 95.

According to another embodiment of the present invention, the signaling information may include information for identifying information on a transport session for transmitting the broadcast service. Here, the information for identifying information on a transport session for transmitting the broadcast service may mean the above-described ROUTE-SessionInfo information, source_ip information, destination_IP information, port information, lsid_delivery_tsi information, DeliveryInfo information, DeliveryInfo information, tsi information, URL information and/or DP_ID information. This was described above with reference to FIGS. 91, 92, 94 and 95.

According to another embodiment of the present invention, the signaling information may include information indicating the channel number of the broadcast service. This was described above with reference to FIGS. 91 and 92.

According to another embodiment of the present invention, the signaling information may include information indicating whether the format of the signaling information is binary or XML. This was described above with reference to FIGS. 91 and 93.

According to another embodiment of the present invention, the signaling information may include information on a transport session for transmitting the broadcast service, and the information on the transport session may include source IP address information of the transport session, destination_IP address information of the transport session and/or destination port number information of the transport session. Here, the information on the transport session may mean the above-described ROUTESessionInfo information. This was described above with reference to FIGS. 91, 92, 94, 95 and 96.

Figure 102:
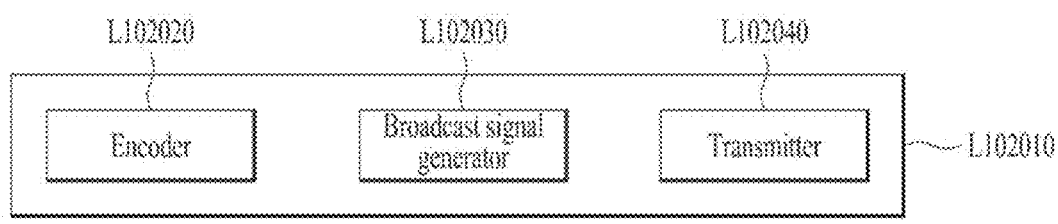
FIG. 102 is a diagram showing the configuration of an apparatus for transmitting broadcast signals according to one embodiment of the present invention.

FIG. 102 is a diagram showing the configuration of an apparatus for transmitting broadcast signals according to one embodiment of the present invention.

The broadcast signal transmission apparatus L102010 according to one embodiment of the present invention may include an encoder L102020, a broadcast signal generator L102030 and/or a transmitter L102040. The encoder may encode a broadcast service and signaling information of the broadcast service. The broadcast signal generator may generate a broadcast signal including the encoded broadcast service and signaling information. The transmitter may transmit the generated broadcast signal.

According to another embodiment of the present invention, the signaling information may include service identification information for identifying the broadcast service, information indicating the name of the broadcast service and/or information indicating whether the broadcast service is active or inactive.

Figure 103:
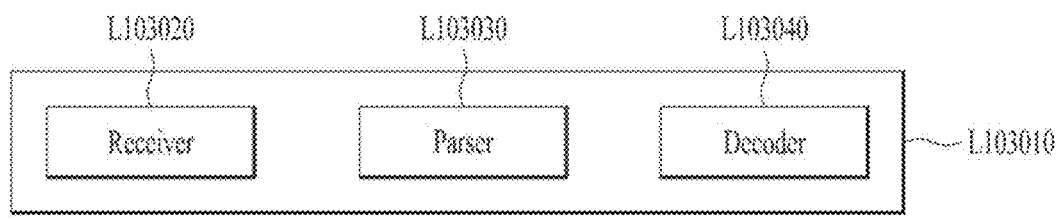
FIG. 103 is a diagram showing the configuration of an apparatus for receiving broadcast signals according to one embodiment of the present invention.

FIG. 103 is a diagram showing the configuration of an apparatus for receiving broadcast signals according to one embodiment of the present invention.

The broadcast signal reception apparatus L103010 according to one embodiment of the present invention may include a receiver L103020, a parser L103030 and/or a decoder L103040. The receiver may receive a broadcast signal including a broadcast service and signaling information of the broadcast service. The parser may parse the broadcast service and signaling information from the received broadcast signal. The decoder may decode the parsed broadcast service and signaling information.

The modules or units may be processors for executing consecutive processes stored in a memory (or a storage unit). The steps described in the above-described embodiments may be performed by hardware/processors. The modules/blocks/units described in the above-described embodiments may operate as hardware/processors. The methods proposed by the present invention may be executed as code. This code may be written in a processor-readable storage medium and may be read by the processor provided by an apparatus.

Although the description of the present invention is explained with reference to each of the accompanying drawings for clarity, it is possible to design new embodiment(s) by merging the embodiments shown in the accompanying drawings with each other. In addition, if a recording medium readable by a computer, in which programs for executing the embodiments mentioned in the foregoing description are recorded, is designed in necessity of those skilled in the art, it may belong to the scope of the appended claims and their equivalents.

An apparatus and method according to the present invention may be non-limited by the configurations and methods of the embodiments mentioned in the foregoing description. In addition, the embodiments mentioned in the foregoing description can be configured in a manner of being selectively combined with one another entirely or in part to enable various modifications.

In addition, a method according to the present invention can be implemented with processor-readable codes in a processor-readable recording medium provided to a network device. The processor-readable medium may include all kinds of recording devices capable of storing data readable by a processor. The processor-readable medium may include one of ROM, RAM, CD-ROM, magnetic tapes, floppy discs, optical data storage devices, and the like for example and also include such a carrier-wave type implementation as a transmission via Internet. Furthermore, as the processor-readable recording medium is distributed to a computer system connected via network, processor-readable codes can be saved and executed according to a distributive system.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Such modifications should not be individually understood from the technical spirit or prospect of the present invention.

Both apparatus and method inventions are mentioned in this specification and descriptions of both of the apparatus and method inventions may be complementarily applicable to each other.

Those skilled in the art will appreciate that various modifications and variations can be made in the present invention without departing from the spirit or scope of the invention described in the appended claims. Accordingly, the present invention are intended to include the modifications and variations of the present invention provided within the appended claims and equivalents thereof.

Both apparatus and method inventions are mentioned in this specification and descriptions of both of the apparatus and method inventions may be complementarily applicable to each other.

Various embodiments have been described in the best mode for carrying out the invention.

The present invention is available in a series of broadcast signal provision fields.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for transmitting a broadcast signal in a digital broadcast transmitter, the method comprising:
generating components of a service;
generating first signaling information including session instance description information for at least one Real-Time Object Delivery over Unidirectional Transport (ROUTE) session and at least one Layered Coding Transport (LCT) channel in which the components of the service are delivered,
wherein the session instance description information includes first source Internet Protocol (IP) address information of the at least one ROUTE session, first destination IP address information of the at least one ROUTE session, first destination port information of the at least one ROUTE session, and transport session identification information for the at least one LCT channel;
generating second signaling information
including channel number information for the service,
wherein the second signaling information further includes bootstrap information and transport mode information for indicating a type of delivery protocol of the first signaling information, and
wherein the bootstrap information included in the second signaling information includes second source IP address information, second destination IP address information, and second destination port information for the first signaling information; and
transmitting the broadcast signal including the components of the service, the first signaling information, and the second signaling information based on Physical Layer Pipes (PLPs).

2. The method according to claim 1, wherein the session instance description information includes service identification information for identifying the service.

3. The method according to claim 1, wherein the second signaling information includes information for indicating whether a format of the second signaling information is binary or extensible markup language (XML).

4. The method according to claim 1, wherein the session instance description information includes identification information for identifying the at least one PLP in which the at least one LCT channel is delivered.

5. A method for receiving a broadcast signal in a digital broadcast receiver, the method comprising:
receiving the broadcast signal based on Physical Layer Pipes (PLPs);
parsing at least one signal frame from the broadcast signal;
parsing packets carrying components of a service, first signaling information and second signaling information from the at least one signal frame,
wherein the first signaling information includes session instance description information for at least one Real-Time Object Delivery over Unidirectional Transport (ROUTE) session and at least one Layered Coding Transport (LCT) channel in which the components of the service are delivered,
wherein the session instance description information includes first source Internet Protocol (IP) address information of the at least one ROUTE session, first destination IP address information of the at least one ROUTE session, first destination port information of the at least one ROUTE session, and transport session identification information for the at least one LCT channel,
wherein the second signaling information includes channel number information for the service,
wherein the second signaling information further includes bootstrap information and transport mode information for indicating a type of delivery protocol of the first signaling information, and
wherein the bootstrap information included in the second signaling information includes second source IP address information, second destination IP address information, and second destination port information for the first signaling information.

6. The method according to claim 5, wherein the session instance description information includes service identification information for identifying the service.

7. The method according to claim 5, wherein the second signaling information includes information for indicating whether a format of the second signaling information is binary or extensible markup language (XML).

8. The method according to claim 5, wherein the session instance description information includes identification information for identifying the at least one PLP in which the at least one LCT channel is delivered.

9. A digital broadcast transmitter for transmitting a broadcast signal, the digital broadcast transmitter comprising:
a generator configured to generate components of a service,
wherein the generator is further configured to generate first signaling information including session instance description information for at least one Real-Time Object Delivery over Unidirectional Transport (ROUTE) session and at least one Layered Coding Transport (LCT) channel in which the components of the service are delivered,
wherein the session instance description information includes first source Internet Protocol (IP) address information of the at least one ROUTE session, first destination IP address information of the at least one ROUTE session, first destination port information of the at least one ROUTE session, and transport session identification information for the at least one LCT channel,
wherein the generator is further configured to generate second signaling information
including channel number information for the service,
wherein the second signaling information further includes bootstrap information and transport mode information for indicating a type of delivery protocol of the first signaling information, and
wherein the bootstrap information included in the second signaling information includes second source IP address information, second destination IP address information, and second destination port information for the first signaling information; and
a transmitting module configured to transmit the broadcast signal including the components of the service, the first signaling information, and the second signaling information based on Physical Layer Pipes (PLPs).

10. The digital broadcast transmitter according to claim 9, wherein the session instance description information includes service identification information for identifying the service.

11. The digital broadcast transmitter according to claim 9, wherein the second signaling information includes information for indicating whether a format of the second signaling information is binary or extensible markup language (XML).

12. The digital broadcast transmitter according to claim 9, wherein the session instance description information includes identification information for identifying the at least one PLP in which the at least one LCT channel is delivered.

13. A digital broadcast receiver for receiving a broadcast signal, the broadcast receiver comprising:
- a tuner configured to receive the broadcast signal based on Physical Layer Pipes (PLPs); and
- a processor configured to parse at least one signal frame from the broadcast signal,
- wherein the processor is further configured to parse packets carrying components of a service, first signaling information and second signaling information from the at least one signal frame,
- wherein the first signaling information includes session instance description information for at least one Real-Time Object Delivery over Unidirectional Transport (ROUTE) session and at least one Layered Coding Transport (LCT) channel in which the components of the service are delivered,
- wherein the session instance description information includes first source Internet Protocol (IP) address information of the at least one ROUTE session, first destination IP address information of the at least one ROUTE session, first destination port information the at least one ROUTE session, and transport session identification information for the at least one LCT channel,
- wherein the second signaling information includes channel number information for the service,
- wherein the second signaling information further includes bootstrap information and transport mode information for indicating a type of delivery protocol of the first signaling information, and
- wherein the bootstrap information included in the second signaling information includes second source IP address information, second destination IP address information, and second destination port information for the first signaling information.

14. The digital broadcast receiver according to claim 13, wherein the session instance description information includes service identification information for identifying the service.

15. The digital broadcast receiver according to claim 13, wherein the second signaling information includes information for indicating whether a format of the second signaling information is binary or extensible markup language (XML).

16. The digital broadcast receiver according to claim 13, wherein the session instance description information includes identification information for identifying the at least one PLP in which the at least one LCT channel is delivered.

* * * * *